United States Patent
Hsiao et al.

(10) Patent No.: US 10,700,950 B2
(45) Date of Patent: Jun. 30, 2020

(54) ADJUSTING NETWORK DATA STORAGE BASED ON EVENT STREAM STATISTICS

(71) Applicant: Splunk Inc., San Francisco, CA (US)

(72) Inventors: Fang I. Hsiao, Berkeley, CA (US); Wei Jiang, San Francisco, CA (US); Vladimir A. Shcherbakov, Pleasanton, CA (US); Ramkumar Chandrasekharan, San Jose, CA (US); Clayton S. Ching, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 427 days.

(21) Appl. No.: 14/699,787

(22) Filed: Apr. 29, 2015

(65) Prior Publication Data
US 2015/0295796 A1 Oct. 15, 2015

Related U.S. Application Data

(63) Continuation-in-part of application No. 14/610,408, filed on Jan. 30, 2015, now Pat. No. 10,360,196,
(Continued)

(51) Int. Cl.
*G06F 15/16* (2006.01)
*H04L 12/26* (2006.01)
*H04L 12/24* (2006.01)

(52) U.S. Cl.
CPC ........ *H04L 43/045* (2013.01); *H04L 41/0813* (2013.01); *H04L 43/0894* (2013.01); *H04L 41/142* (2013.01)

(58) Field of Classification Search
CPC ................................................ H04L 43/045
(Continued)

(56) References Cited

U.S. PATENT DOCUMENTS 5,436,618 A 7/1995 Van Steenbrugge
5,787,253 A 7/1998 McCreery et al.
(Continued)

FOREIGN PATENT DOCUMENTS

WO 2011134739 A1 11/2011

OTHER PUBLICATIONS

Final Office Action from U.S. Appl. No. 14/253,744, dated Feb. 21, 2017, 41 pages.
(Continued)

*Primary Examiner* — Kevin T Bates
*Assistant Examiner* — Clarence D McCray
(74) *Attorney, Agent, or Firm* — Nicholson De Vos Webster & Elliott LLP

(57) ABSTRACT

The disclosed embodiments provide a system that facilitates the processing of network data. During operation, the system causes for display a graphical user interface (GUI) for configuring the generation of time-series event data from network packets captured by one or more remote capture agents. Next, the system causes for display, in the GUI, a first set of user-interface elements for managing one or more event streams containing the time-series event data, wherein managing the one or more event streams includes enabling the generation of a set of statistics from an event stream without subsequently storing and processing at least a first portion of the event stream by one or more components on a network. The GUI then updates the configuration information based on input received through the first set of user-interface elements.

30 Claims, 49 Drawing Sheets

Related U.S. Application Data which is a continuation-in-part of application No. 14/253,713, filed on Apr. 15, 2014, now Pat. No. 10,127,273, which is a continuation-in-part of application No. 14/528,898, filed on Oct. 30, 2014, now Pat. No. 9,838,512.

(58) Field of Classification Search
USPC ............................................. 709/248
See application file for complete search history.

(56) References Cited

U.S. PATENT DOCUMENTS

| | | |
|---|---|---|
| 5,796,942 A | 8/1998 | Esbensen |
| 5,892,903 A | 4/1999 | Klaus |
| 5,920,711 A | 7/1999 | Seawright et al. |
| 5,983,270 A | 11/1999 | Abraham et al. |
| 6,044,401 A | 3/2000 | Harvey |
| 6,418,471 B1 | 7/2002 | Shelton et al. |
| 6,542,861 B1 | 4/2003 | Lyles, Jr. et al. |
| 6,584,501 B1 | 6/2003 | Cartsonis et al. |
| 6,587,969 B1 | 7/2003 | Weinberg et al. |
| 6,594,634 B1 | 7/2003 | Hampton et al. |
| 6,748,343 B2 | 6/2004 | Alexander et al. |
| 6,792,460 B2 | 9/2004 | Oulu et al. |
| 6,810,494 B2 | 10/2004 | Weinberg et al. |
| 6,892,167 B2 | 5/2005 | Polan et al. |
| 6,898,556 B2 | 5/2005 | Smocha et al. |
| 6,915,308 B1 | 7/2005 | Evans et al. |
| 6,973,489 B1 | 12/2005 | Levy |
| 6,985,944 B2 | 1/2006 | Aggarwal |
| 6,988,141 B1 | 1/2006 | Motoyama et al. |
| 7,016,813 B2 | 3/2006 | Alexander et al. |
| 7,080,399 B1 | 7/2006 | Yanagawa et al. |
| 7,100,091 B2 | 8/2006 | Nakamoto et al. |
| 7,171,689 B2 | 1/2007 | Beavers |
| 7,177,441 B2 | 2/2007 | Condon et al. |
| 7,197,559 B2 | 3/2007 | Goldstein et al. |
| 7,219,138 B2 | 5/2007 | Straut et al. |
| 7,228,348 B1 | 6/2007 | Farley et al. |
| 7,228,564 B2 | 6/2007 | Raikar et al. |
| 7,231,445 B1 | 6/2007 | Aweya et al. |
| 7,246,101 B2 | 7/2007 | Fu et al. |
| 7,246,162 B2 | 7/2007 | Tindal |
| 7,257,719 B2 | 8/2007 | Pandit et al. |
| 7,260,846 B2 | 8/2007 | Day |
| 7,277,957 B2 | 10/2007 | Rowley et al. |
| 7,299,277 B1 | 11/2007 | Moran et al. |
| 7,376,896 B2 | 5/2008 | Ullmann et al. |
| 7,380,272 B2 | 5/2008 | Sharp et al. |
| 7,444,263 B2 | 10/2008 | White et al. |
| 7,490,066 B2 | 2/2009 | Kronenberg et al. |
| 7,519,964 B1 | 4/2009 | Islam et al. |
| 7,543,051 B2 | 6/2009 | Greifeneder et al. |
| 7,552,238 B2 | 6/2009 | Gulland |
| 7,577,623 B2 | 8/2009 | Genty et al. |
| 7,594,011 B2 | 9/2009 | Chandra |
| 7,594,269 B2 | 9/2009 | Durham et al. |
| 7,607,170 B2 | 10/2009 | Chesla |
| 7,610,344 B2 | 10/2009 | Mehr et al. |
| 7,623,463 B2 | 11/2009 | Chavda |
| 7,644,365 B2 | 1/2010 | Bhattacharya et al. |
| 7,644,438 B1 | 1/2010 | Dash et al. |
| 7,650,396 B2 | 1/2010 | Tindal |
| 7,650,634 B2 | 1/2010 | Zuk |
| 7,660,892 B2 | 2/2010 | Choong et al. |
| 7,702,806 B2 | 4/2010 | Gil et al. |
| 7,729,240 B1 | 6/2010 | Crane et al. |
| 7,735,063 B2 | 6/2010 | Herzog et al. |
| 7,738,396 B1 | 6/2010 | Turner et al. |
| 7,761,918 B2 | 6/2010 | Gula et al. |
| 7,751,393 B2 | 7/2010 | Chaskar et al. |
| 7,774,369 B2 | 8/2010 | Herzog et al. |
| 7,797,443 B1 | 9/2010 | Pettigrew et al. |
| RE41,903 E | 10/2010 | Wenig et al. |
| 7,814,218 B1 | 10/2010 | Knee et al. |
| 7,818,370 B2 | 10/2010 | Piper et al. |
| 7,836,498 B2 | 11/2010 | Poletto et al. |
| 7,869,352 B1 | 1/2011 | Turner et al. |
| 7,886,054 B1 | 2/2011 | Nag et al. |
| 7,899,444 B2 | 3/2011 | Hans et al. |
| 7,921,459 B2 | 4/2011 | Houston et al. |
| 7,948,889 B2 | 5/2011 | Lalonde et al. |
| 7,953,425 B2 | 5/2011 | Jordan |
| 7,954,109 B1 | 5/2011 | Durham et al. |
| 7,962,616 B2 | 6/2011 | Kupferman et al. |
| 7,979,555 B2 | 7/2011 | Rothstein et al. |
| 8,019,064 B2 | 9/2011 | Bedingfield et al. |
| 8,020,211 B2 | 9/2011 | Keanini et al. |
| 8,032,564 B2 | 10/2011 | Muret et al. |
| 8,037,175 B1 | 10/2011 | Apte et al. |
| 8,042,055 B2 | 10/2011 | Wenig et al. |
| 8,046,443 B2 | 10/2011 | Parker et al. |
| 8,056,130 B1 | 11/2011 | Njemanze et al. |
| 8,064,350 B2 | 11/2011 | Peterman et al. |
| 8,068,986 B1 | 11/2011 | Shahbazi et al. |
| 8,095,640 B2 | 1/2012 | Guingo et al. |
| 8,103,765 B2 | 1/2012 | Greifeneder et al. |
| 8,122,006 B2 | 2/2012 | Alves et al. |
| 8,125,908 B2 | 2/2012 | Rothstein et al. |
| 8,127,000 B2 | 2/2012 | Wenig et al. |
| 8,140,665 B2 | 3/2012 | Malloy et al. |
| 8,144,609 B2 | 3/2012 | Rao |
| 8,185,953 B2 | 5/2012 | Rothstein et al. |
| 8,191,136 B2 | 5/2012 | Dudfield et al. |
| 8,195,661 B2 | 6/2012 | Kalavade |
| 8,248,958 B1 | 8/2012 | Tulasi et al. |
| 8,255,511 B1 | 8/2012 | Moore et al. |
| 8,266,271 B2 | 9/2012 | Oyadomari et al. |
| 8,301,745 B1 | 10/2012 | Wohlgemuth et al. |
| 8,335,848 B2 | 12/2012 | Wenig et al. |
| 8,385,532 B1 | 2/2013 | Geist et al. |
| 8,386,371 B2 | 2/2013 | Kittelsen et al. |
| 8,386,598 B2 | 2/2013 | Robinson |
| 8,387,076 B2 | 2/2013 | Thatte et al. |
| 8,392,553 B2 | 3/2013 | Petropoulakis et al. |
| 8,423,894 B2 | 4/2013 | Bhattacharya et al. |
| 8,473,606 B2 | 6/2013 | Kronenberg et al. |
| 8,473,620 B2 | 6/2013 | Demmer et al. |
| 8,498,956 B2 | 7/2013 | Srinivasan et al. |
| 8,522,219 B2 | 8/2013 | Schwarzbauer et al. |
| 8,533,532 B2 | 9/2013 | Wenig et al. |
| 8,543,534 B2 | 9/2013 | Alves et al. |
| 8,549,650 B2 | 10/2013 | Hanson |
| 8,583,772 B2 | 11/2013 | Wenig et al. |
| 8,589,375 B2 | 11/2013 | Zhang et al. |
| 8,589,436 B2 | 11/2013 | Srinivasan et al. |
| 8,589,876 B1 | 11/2013 | Neeman |
| 8,601,122 B2 | 12/2013 | Malloy et al. |
| 8,676,841 B2 | 3/2014 | Srinivasan et al. |
| 8,705,639 B2 | 4/2014 | Salinger |
| 8,749,553 B1 | 6/2014 | Krasovsky et al. |
| 8,779,921 B1 | 7/2014 | Curtiss |
| 8,782,787 B2 | 7/2014 | Willebeek-Lemair et al. |
| 8,806,361 B1 | 8/2014 | Noel et al. |
| 8,842,548 B2 | 9/2014 | Pleshek et al. |
| 8,850,064 B2 | 9/2014 | Mann et al. |
| 8,918,430 B2 | 12/2014 | Fischer |
| 8,958,318 B1 | 2/2015 | Hastwell et al. |
| 8,978,034 B1 | 3/2015 | Goodson et al. |
| 8,984,101 B1 | 3/2015 | Viswanath et al. |
| 9,043,439 B2 | 5/2015 | Bicket et al. |
| 9,098,587 B2 | 8/2015 | Deshmukh et al. |
| 9,110,101 B2 | 8/2015 | Pietrowicz et al. |
| 9,112,915 B2 | 8/2015 | Su |
| 9,122,786 B2 * | 9/2015 | Cammert ............ G06F 11/3471 |
| 9,189,449 B2 | 11/2015 | Branson et al. |
| 9,244,978 B2 | 1/2016 | Alves et al. |
| 9,270,545 B2 | 2/2016 | Salinger |
| 9,305,238 B2 | 4/2016 | Srinivasan et al. |
| 9,330,395 B2 | 5/2016 | Hauser |
| 9,405,854 B2 | 8/2016 | Jerzak et al. |
| 9,509,553 B2 | 11/2016 | Levy et al. |
| 9,542,708 B2 | 1/2017 | Piper et al. |
| 9,558,225 B2 | 1/2017 | Skrzypczak et al. |

(56) References Cited

U.S. PATENT DOCUMENTS

| | | |
|---|---|---|
| 9,680,846 B2 | 6/2017 | Haugsnes |
| 9,762,443 B2 | 9/2017 | Dickey |
| 9,906,607 B2 | 2/2018 | Lawson et al. |
| 9,923,767 B2 | 3/2018 | Dickey |
| 2002/0015387 A1 | 2/2002 | Houh |
| 2003/0061506 A1 | 3/2003 | Cooper et al. |
| 2003/0101449 A1 | 5/2003 | Bentolila et al. |
| 2003/0120619 A1 | 6/2003 | Osborn |
| 2003/0135612 A1 | 7/2003 | Huntington et al. |
| 2003/0191599 A1 | 10/2003 | Bartsch |
| 2003/0221000 A1 | 11/2003 | Cherkasova et al. |
| 2004/0015579 A1 | 1/2004 | Cooper et al. |
| 2004/0030796 A1 | 2/2004 | Cooper et al. |
| 2004/0042470 A1 | 3/2004 | Cooper et al. |
| 2004/0044912 A1 | 3/2004 | Connary et al. |
| 2004/0088405 A1 | 5/2004 | Aggarwal |
| 2004/0109453 A1 | 6/2004 | Wirth |
| 2004/0152444 A1 | 8/2004 | Lialiamou et al. |
| 2004/0215747 A1 | 10/2004 | Maron |
| 2005/0021715 A1 | 1/2005 | Dugatkin et al. |
| 2005/0060402 A1 | 3/2005 | Oyadomari et al. |
| 2005/0076136 A1* | 4/2005 | Cho ............... H04L 29/06027 709/231 |
| 2005/0120160 A1 | 6/2005 | Plouffe et al. |
| 2005/0131876 A1 | 6/2005 | Ahuja et al. |
| 2005/0138013 A1 | 6/2005 | Walker et al. |
| 2005/0138426 A1 | 6/2005 | Styslinger |
| 2005/0273593 A1 | 12/2005 | Seminaro et al. |
| 2005/0278731 A1 | 12/2005 | Cameron et al. |
| 2006/0047721 A1 | 3/2006 | Narang et al. |
| 2006/0077895 A1 | 4/2006 | Wright |
| 2006/0101101 A1 | 5/2006 | Pandit et al. |
| 2006/0198318 A1* | 9/2006 | Schondelmayer ...... H04L 43/00 370/252 |
| 2006/0242694 A1 | 10/2006 | Gold et al. |
| 2006/0256735 A1 | 11/2006 | Borowski |
| 2006/0279628 A1 | 12/2006 | Fleming et al. |
| 2007/0011309 A1 | 1/2007 | Brady, Jr. et al. |
| 2007/0033408 A1 | 2/2007 | Morten |
| 2007/0043861 A1 | 2/2007 | Baron et al. |
| 2007/0050846 A1 | 3/2007 | Xie et al. |
| 2007/0067450 A1 | 3/2007 | Malloy et al. |
| 2007/0076312 A1 | 4/2007 | Jordan |
| 2007/0083644 A1 | 4/2007 | Miller et al. |
| 2007/0106692 A1 | 5/2007 | Klein |
| 2007/0121872 A1 | 5/2007 | Hans et al. |
| 2007/0150584 A1 | 6/2007 | Srinivasan |
| 2007/0156916 A1 | 7/2007 | Schiefer |
| 2007/0208852 A1 | 9/2007 | Wexler et al. |
| 2007/0260932 A1 | 11/2007 | Prichard et al. |
| 2008/0056139 A1 | 3/2008 | Liaqat |
| 2008/0082679 A1 | 4/2008 | Dobtchev |
| 2008/0159146 A1 | 7/2008 | Claudatos et al. |
| 2008/0209505 A1 | 8/2008 | Ghai et al. |
| 2008/0259910 A1 | 10/2008 | Bodin et al. |
| 2008/0281963 A1 | 11/2008 | Fletcher et al. |
| 2009/0070786 A1 | 3/2009 | Alves et al. |
| 2009/0122699 A1 | 5/2009 | Alperovitch et al. |
| 2009/0129316 A1 | 5/2009 | Ramanathan et al. |
| 2009/0228474 A1 | 9/2009 | Chiu et al. |
| 2009/0238088 A1 | 9/2009 | Tan |
| 2009/0271504 A1 | 10/2009 | Ginter et al. |
| 2009/0319247 A1 | 12/2009 | Ratcliffe, III et al. |
| 2010/0031274 A1 | 2/2010 | Sim-Tang |
| 2010/0064307 A1 | 3/2010 | Malhotra et al. |
| 2010/0070929 A1 | 3/2010 | Behl et al. |
| 2010/0095370 A1 | 4/2010 | Lee et al. |
| 2010/0136943 A1 | 6/2010 | Hirvela et al. |
| 2010/0153316 A1 | 6/2010 | Duffield et al. |
| 2010/0318665 A1 | 12/2010 | Demmer et al. |
| 2010/0318836 A1 | 12/2010 | Ness et al. |
| 2011/0026521 A1 | 2/2011 | Gamage et al. |
| 2011/0029665 A1 | 2/2011 | Wenig et al. |
| 2011/0106935 A1 | 5/2011 | Srinivasan |
| 2011/0119226 A1 | 5/2011 | Ruhl et al. |
| 2011/0166982 A1 | 7/2011 | Cole et al. |
| 2011/0178775 A1 | 7/2011 | Schoning et al. |
| 2011/0231935 A1 | 9/2011 | Gula et al. |
| 2011/0238723 A1 | 9/2011 | Weintraub et al. |
| 2011/0246134 A1 | 10/2011 | Frishberg et al. |
| 2011/0292818 A1 | 12/2011 | Zhytar et al. |
| 2011/0296015 A1 | 12/2011 | Chakravarty et al. |
| 2011/0302305 A1 | 12/2011 | Morimura et al. |
| 2012/0017270 A1 | 1/2012 | Bartholomay et al. |
| 2012/0054246 A1 | 3/2012 | Fischer |
| 2012/0084437 A1 | 4/2012 | Wenig et al. |
| 2012/0106354 A1 | 5/2012 | Pleshek et al. |
| 2012/0137018 A1 | 5/2012 | Uhlig et al. |
| 2012/0158987 A1 | 6/2012 | Greifeneder et al. |
| 2012/0173966 A1 | 7/2012 | Powell et al. |
| 2012/0197934 A1 | 8/2012 | Zhang et al. |
| 2012/0198047 A1 | 8/2012 | Steuer et al. |
| 2012/0239681 A1* | 9/2012 | Zhang ............... G06F 17/30486 707/769 |
| 2012/0250610 A1 | 10/2012 | Budampati et al. |
| 2012/0278455 A1 | 11/2012 | Peng et al. |
| 2012/0314616 A1 | 12/2012 | Hong et al. |
| 2013/0024431 A1 | 1/2013 | Parthasarathy et al. |
| 2013/0067034 A1 | 3/2013 | Degioanni et al. |
| 2013/0070622 A1 | 3/2013 | Degioanni et al. |
| 2013/0080620 A1 | 3/2013 | Cook |
| 2013/0091278 A1 | 4/2013 | Ludwig et al. |
| 2013/0111011 A1 | 5/2013 | Moulhaud et al. |
| 2013/0111014 A1 | 5/2013 | Lawrie et al. |
| 2013/0114456 A1 | 5/2013 | Dahod |
| 2013/0128742 A1 | 5/2013 | Yu |
| 2013/0132833 A1 | 5/2013 | White et al. |
| 2013/0136253 A1 | 5/2013 | Ben-Ami et al. |
| 2013/0173782 A1 | 7/2013 | Ragutski et al. |
| 2013/0179855 A1 | 7/2013 | Elliott |
| 2013/0182577 A1 | 7/2013 | Ivanyi et al. |
| 2013/0182700 A1 | 7/2013 | Figura et al. |
| 2013/0198391 A1 | 8/2013 | Weissblum |
| 2013/0212689 A1 | 8/2013 | Ben-Natan et al. |
| 2013/0227689 A1 | 8/2013 | Pietrowicz et al. |
| 2013/0232137 A1 | 9/2013 | Knott et al. |
| 2013/0246925 A1 | 9/2013 | Ahuja et al. |
| 2013/0258995 A1 | 10/2013 | Skov et al. |
| 2013/0276000 A1 | 10/2013 | Neeman |
| 2013/0304531 A1 | 11/2013 | Barber et al. |
| 2013/0318236 A1* | 11/2013 | Coates ................ H04L 41/22 709/224 |
| 2013/0318514 A1 | 11/2013 | Neeman |
| 2013/0318536 A1 | 11/2013 | Fletcher et al. |
| 2013/0318603 A1 | 11/2013 | Merza |
| 2013/0318604 A1 | 11/2013 | Coates et al. |
| 2013/0326620 A1 | 12/2013 | Merza et al. |
| 2014/0012864 A1 | 1/2014 | Nakagawa et al. |
| 2014/0013309 A1 | 1/2014 | Gounares |
| 2014/0046645 A1 | 2/2014 | White et al. |
| 2014/0068102 A1 | 3/2014 | Mann et al. |
| 2014/0173512 A1 | 6/2014 | Karpov et al. |
| 2014/0201375 A1 | 7/2014 | Beereddy et al. |
| 2014/0230062 A1 | 8/2014 | Kumaran |
| 2014/0237292 A1 | 8/2014 | Chan |
| 2014/0280737 A1 | 9/2014 | Bicket et al. |
| 2014/0317228 A1 | 10/2014 | Dharmasanam |
| 2014/0317684 A1 | 10/2014 | Porras et al. |
| 2014/0325058 A1 | 10/2014 | Fletcher et al. |
| 2014/0325363 A1 | 10/2014 | Fletcher et al. |
| 2014/0328189 A1 | 11/2014 | Fallon et al. |
| 2014/0351415 A1 | 11/2014 | Harrigan et al. |
| 2015/0013006 A1 | 1/2015 | Shulman et al. |
| 2015/0062113 A1 | 3/2015 | Cannon et al. |
| 2015/0095359 A1 | 4/2015 | Duxbury |
| 2015/0125807 A1 | 5/2015 | Shipley |
| 2015/0156170 A1 | 6/2015 | Gurbani |
| 2015/0178342 A1 | 6/2015 | Seering et al. |
| 2015/0180891 A1 | 6/2015 | Seward et al. |
| 2015/0295766 A1 | 10/2015 | Dickey et al. |
| 2015/0319058 A1 | 11/2015 | Molinero et al. |
| 2015/0358391 A1 | 12/2015 | Moon et al. |
| 2016/0028758 A1 | 1/2016 | Ellis et al. |

(56) References Cited

U.S. PATENT DOCUMENTS

| | | | |
|---|---|---|---|
| 2016/0112287 A1* | 4/2016 | Farmer | H04L 43/106 709/224 |
| 2016/0127180 A1 | 5/2016 | Shcherbakov et al. | |
| 2016/0127517 A1 | 5/2016 | Shcherbakov et al. | |
| 2016/0155314 A1 | 6/2016 | Snyder | |
| 2016/0182283 A1 | 6/2016 | Mann et al. | |
| 2016/0323172 A1 | 11/2016 | Friend | |
| 2016/0330086 A1 | 11/2016 | Oda et al. | |
| 2017/0237634 A1 | 8/2017 | Dickey | |

OTHER PUBLICATIONS

Final Office Action from U.S. Appl. No. 14/253,767, dated Apr. 18, 2017, 34 pages.
Final Office Action from U.S. Appl. No. 14/528,932, dated May 5, 2017, 38 pages.
Fiodin, et al., "Processing Object-Oriented Queries with Invertible Late Bound Functions," Proceedings of the 21st VLDB Conference, 1995, pp. 335-344.
Non-Final Office Action from U.S. Appl. No. 14/253,713 dated Jan. 19, 2017, 31 pages.
Non-Final Office Action from U.S. Appl. No. 14/609,292, dated Apr. 12, 2017, 43 pages.
Notice of Allowance from U.S. Appl. No. 14/253,753, dated Feb. 27, 2017, 19 pages.
Notice of Allowance from U.S. Appl. No. 14/253,753, dated May 23, 2017, 2 pages.
Notice of Allowance from U.S. Appl. No. 14/528,898, dated May 8, 2017, 29 pages.
Notice of Allowance from U.S. Appl. No. 14/528,918, dated Dec. 21, 2016, 26 pages.
Advisory Action from U.S. Appl. No. 14/253,753 dated Apr. 29, 2016, 2 pages.
Advisory Action from U.S. Appl. No. 14/253,753 dated May 7, 2015, 2 pages.
Advisory Action from U.S. Appl. No. 14/253,767 dated Mar. 1, 2016, 3 pages.
Final Office Action from U.S. Appl. No. 14/253,713 dated Feb. 10, 2015, 15 pages.
Final Office Action from U.S. Appl. No. 14/253,713 dated Feb. 12, 2016, 17 pages.
Final Office Action from U.S. Appl. No. 14/253,744 dated Jan. 9, 2015, 29 pages.
Final Office Action from U.S. Appl. No. 14/253,744 dated Oct. 23, 2015, 51 pages.
Final Office Action from U.S. Appl. No. 14/253,753 dated Feb. 4, 2016, 17 pages.
Final Office Action from U.S. Appl. No. 14/253,753 dated Mar. 2, 2015, 19 pages.
Final Office Action from U.S. Appl. No. 14/253,767 dated Dec. 16, 2015, 21 pages.
Final Office Action from U.S. Appl. No. 14/253,767 dated Jan. 7, 2015, 14 pages.
Final Office Action from U.S. Appl. No. 14/528,898 dated Jun. 29, 2016, 18 pages.
Non-Final Office Action from U.S. Appl. No. 14/253,713 dated Aug. 12, 2015, 17 pages.
Non-Final Office Action from U.S. Appl. No. 14/253,713 dated Sep. 3, 2014, 26 pages.
Non-Final Office Action from U.S. Appl. No. 14/253,744 dated Jul. 5, 2016, 31 pages.
Non-Final Office Action from U.S. Appl. No. 14/253,744 dated Jun. 10, 2015, 50 pages.
Non-Final Office Action from U.S. Appl. No. 14/253,744 dated Oct. 6, 2014, 34 pages.
Non-Final Office Action from U.S. Appl. No. 14/253,753 dated Jul. 1, 2016, 21 pages.
Non-Final Office Action from U.S. Appl. No. 14/253,753 dated Jul. 28, 2015, 14 pages.
Non-Final Office Action from U.S. Appl. No. 14/253,753 dated Sep. 5, 2014, 16 pages.
Non-Final Office Action from U.S. Appl. No. 14/253,767 dated Jul. 15, 2015, 17 pages.
Non-Final Office Action from U.S. Appl. No. 14/253,767 dated Jun. 19, 2014, 13 pages.
Non-Final Office Action from U.S. Appl. No. 14/253,767 dated Sep. 19, 2016, 21 pages.
Non-Final Office Action from U.S. Appl. No. 14/528,898 dated Mar. 31, 2016, 17 pages.
Non-Final Office Action from U.S. Appl. No. 14/528,918 dated Feb. 17, 2016, 17 pages.
Non-Final Office Action from U.S. Appl. No. 14/528,932 dated Dec. 14, 2016, 19 pages.
Notice of Allowance from U.S. Appl. No. 14/253,753 dated Nov. 8, 2016, 7 pages.
Notice of Allowance from U.S. Appl. No. 14/528,898 dated Nov. 28, 2016, 8 pages.
Notice of Allowance from U.S. Appl. No. 14/528,918 dated Aug. 18, 2016, 5 pages.
Wireshark User's Guide for Wireshark 1.9 (Oct. 18, 2012) http://wayback.archive.org/web/20121018193345/http://www.wireshark.org/download/docs/user-guide-us.pdf; dated Oct. 18, 2012; last accessed Nov. 29, 2016).
Zabbix Network Monitoring Essentials Tutorial Video (https://www.youtube.com/watch?v=NLt_qR6yKWM&list=PLYoq8isOGa_N7mT7t4k2191CFdg2064wj&index=17; pub date:Oct. 22, 2013).
Advisory Action from U.S. Appl. No. 14/528,932, dated Jul. 14, 2017, 8 pages.
Non-Final Office Action from U.S. Appl. No. 14/253,744, dated Jun. 16, 2017, 31 pages.
Non-Final Office Action from U.S. Appl. No. 14/610,457, dated Aug. 4, 2017, 79 pages.
Non-Final Office Action from U.S. Appl. No. 15/421,269, dated Jul. 10, 2017, 39 pages.
Notice of Allowance from U.S. Appl. No. 14/253,753, dated Jun. 12, 2017, 16 pages.
Final Office Action from U.S. Appl. No. 14/609,292, dated Aug. 25, 2017, 39 pages.
Non-Final Office Action from U.S. Appl. No. 15/582,309, dated Sep. 22, 2017, 46 pages.
Notice of Allowance from U.S. Appl. No. 14/528,898, dated Sep. 13, 2017, 22 pages.
Notice of Allowance from U.S. Appl. No. 15/421,269, dated Sep. 8, 2017, 12 pages.
Advisory Action from U.S. Appl. No. 14/609,292, dated Dec. 8, 2017, 5 pages.
Final Office Action from U.S. Appl. No. 14/253,713, dated Dec. 22, 2017, 46 pages.
Final Office Action from U.S. Appl. No. 14/610,457, dated Jan. 22, 2018, 51 pages.
Non-Final Office Action from U.S. Appl. No. 14/699,807, dated Dec. 28, 2017, 60 pages.
Notice of Allowance from U.S. Appl. No. 14/253,744, dated Nov. 15, 2017, 12 pages.
Notice of Allowance from U.S. Appl. No. 14/253,744, dated Nov. 27, 2017, 12 pages.
Notice of Allowance from U.S. Appl. No. 15/421,269, dated Nov. 13, 2017, 9 pages.
Advisory Action from U.S. Appl. No. 14/699,807, dated Jul. 12, 2018, 2 pages.
Final Office Action from U.S. Appl. No. 14/609,223, dated Nov. 1, 2018, 33 pages.
Final Office Action from U.S. Appl. No. 15/885,712, dated Dec. 10, 2018, 18 pages.
Non-Final Office Action from U.S. Appl. No. 15/709,343, dated Jul. 13, 2018, 47 pages.
Non-Final Office Action from U.S. Appl. No. 14/699,807, dated Sep. 21, 2018, 28 pages.
Non-Final Office Action from U.S. Appl. No. 15/582,309, dated Sep. 6, 2018, 12 pages.
Notice of Allowance from U.S. Appl. No. 15/709,343, dated Nov. 19, 2018, 10 pages.

(56) References Cited

OTHER PUBLICATIONS

Advisory Action from U.S. Appl. No. 14/253,713, dated Feb. 20, 2018, 3 pages.
Advisory Action from U.S. Appl. No. 14/610,457, dated Apr. 16, 2018, 3 pages.
Advisory Action from U.S. Appl. No. 15/582,309, dated Aug. 2, 2018, 2 pages.
Corrected Notice of Allowance from U.S. Appl. No. 14/253,744, dated Feb. 15, 2018, 12 pages.
Final Office Action from U.S. Appl. No. 14/699,807, dated Apr. 27, 2018, 31 pages.
Final Office Action from U.S. Appl. No. 15/582,309, dated May 11, 2018, 26 pages.
Non-Final Office Action from U.S. Appl. No. 14/609,223, dated Mar. 14, 2018, 78 pages.
Non-Final Office Action from U.S. Appl. No. 14/610,408, dated May 21, 2018, 80 pages.
Non-Final Office Action from U.S. Appl. No. 14/610,438, dated Jun. 1, 2018, 91 pages.
Non-Final Office Action from U.S. Appl. No. 14/610,457, dated Jun. 1, 2018, 63 pages.
Non-Final Office Action from U.S. Appl. No. 15/885,712, dated Jun. 28, 2018, 50 pages.
Notice of Allowance from U.S. Appl. No. 14/253,713, dated Jun. 18, 2018, 17 pages.
Final Office Action from U.S. Appl. No. 14/610,408, dated Feb. 8, 2019, 16 pages.
Final Office Action from U.S. Appl. No. 14/610,438, dated Dec. 20, 2018, 7 pages.
Final Office Action from U.S. Appl. No. 14/610,457, dated Feb. 8, 2019, 49 pages.
Notice of Allowance from U.S. Appl. No. 14/610,408, dated Mar. 8, 2019, 12 pages.
Notice of Allowance from U.S. Appl. No. 15/582,309, dated Feb. 20, 2019, 12 pages.
Advisory Action from U.S. Appl. No. 14/610,457, dated Jun. 12, 2019, 3 pages.
Notice of Allowance from U.S. Appl. 14/610,408, dated Jun. 10, 2019, 8 pages.
Notice of Allowance from U.S. Appl. No. 14/610,438, dated Mar. 14, 2019, 14 pages.
Notice of Allowance from U.S. Appl. No. 15/582,309, dated Apr. 5, 2019, 6 pages.
Notice of Allowance from U.S. Appl. No. 15/885,712, dated Mar. 18, 2019, 9 pages.
Notice of Allowance from U.S. Appl. No. 14/699,807, dated Jun. 17, 2019, 23 pages.

* cited by examiner

Original Search: 501
search "error | stats count BY host

Sent to peers: 502
search "error | prestats count BY host (map)

Executed by search head: 503
Merge prestats results received from peers (reduce)

Streams

| Name | Description | Enabled | Cloned |
|---|---|---|---|
| AggregateHTTP | Aggregated HTTP Event Stream | ✓ | ✓ |
| DemoHTTP | Demo HTTP Stream with full content | ✓ | ✓ |
| dhcp | DHCP Protocol Events | ✓ | |
| dns | DNS Protocol Events | | |
| ftp | FTP Protocol Events | ✓ | |
| http | HTTP Protocol Events | ✓ | |
| imap | IMAP Protocol Events | | |
| irc | IRC Protocol Events | | |
| ldap | LDAP Protocol Events | | |
| mysql-command | MySQL Database Commands | ✓ | |
| mysql-login | MySQL Database Logins | | |
| mysql-query | MySQL Database Queries | | |
| nfs | NFS Protocol Events | | |
| pop3 | POP3 Protocol Events | | |
| postgres | PostgreSQL Database Events | ✓ | |
| radius | Radius Protocol Events | | |
| sip | SIP Protocol Events | | |
| smb | SMB Protocol Events | ✓ | |
| smtp | SMTP Protocol Events | | |
| tcp | TCP Flow Events | | |
| tds | Sybase/SQL Server Database Events | | |
| tns | Oracle (TNS) Protocol Events | | |
| udp | UDP Flow Events | ✓ | |

1102 — 1104 — 1106 — 1108 — 1110 (Clone Stream)

FIG. 11A

| Configure Stream: | DemoHTTP | | | | | |
|---|---|---|---|---|---|---|
| Aggregated: | ☐ 1136 | | Enabled | Disabled | | |
| Event Type: | http.event | | 1124 | 1126 | | |
| Filters: | 0 filters configured | | Clone | Delete | Cancel | Save |
| | | | 1128 | 1130 | 1132 | 1134 |

| Enable | Name | Description | Term | Add to filter |
|---|---|---|---|---|
| ☑ | dest_port | Server port number | flow.s-port | Add |
| ☑ | http_content_length | HTTP response content length | http.content-length | Add |
| ☑ | http_method | The HTTP method of the request (GET, POST, etc.) | http.method | Add |
| ☑ | http_referer | The Referer HTTP request header | http.referer | Add |
| ☑ | http_user_agent | The User-Agent HTTP request header | http.useragent | Add |
| ☑ | server | The Server HTTP response header | http.server | Add |
| ☑ | site | The Host HTTP request header | http.host | Add |
| ☑ | src_ip | IP address of the client in dot-quad notation. Contains the value of X-Forwarded-For header or equal to flow.c-ip is X-Forwarded-For is not set. | http.c-ip | Add |
| ☑ | src_port | Client port number | flow.c-port | Add |
| ☑ | status | The HTTP status code returned to the client | http.status | Add |
| ☑ | time_taken | Number of microseconds that it took to complete a flow event from the end user's perspective | flow.timetaken | Add |
| ☑ | uri_parm | The parameters portion of the requested resource | http.uri-parm | Add |
| ☑ | uri_path | The requested resource (excluding query) | http.uri-stem | Add |
| ☑ | uri_query | The query portion of the requested resource | http.uri-query | Add |
| ☐ | accept | The Accept HTTP request header | http.accept | Add |
| ☐ | ack_packets_in | The number of acknowledgement packets sent from client to server | flow.cs-ack-packets | Add |

Configure Stream: DemoHTTP — 1136
Aggregated: ☑
Time Interval (s): 60 — 1140
Event Type: http.event
Filters: 0 filters configured

| Enable | Agg. Type | Name | Description | Term | Add to filter |
|---|---|---|---|---|---|
| ☑ | Key | dest_ip | IP address of the server in dot-quad notation | flow.s-ip | Add |
| ☑ | Key  Sum | dest_port | Server port number | flow.s-port | Add |
| ☑ | Key  Sum | src_ip | IP address of the client in dot-quad notation. Contains the value of X-Forwarded-For header or equal to flow.c-ip is X-Forwarded-For is not set. | http.c-ip | Add |
| ☑ | Key | status | The HTTP status code returned to the client | http.status | Add |
| ☑ | Key  Sum | uri_path | The requested resource (excluding query) | http.uri-stem | Add |
| ☑ | Key  Sum | bytes | The total number of bytes transferred | flow.bytes | Add |
| ☑ | Key  Sum | bytes_in | The number of bytes sent from client to server | flow.cs-bytes | Add |
| ☑ | Key  Sum | bytes_out | The number of bytes sent from server to client | flow.sc-bytes | Add |
| ☑ | Key  Sum | time_taken | Number of microseconds that it took to complete a flow event, from the end user's perspective | flow.time-taken | Add |
| ☐ | Key | accept | The Accept HTTP request header | http.accept | Add |
| ☐ | Key | ack_packets_in | The number of acknowledgement packets sent from client to server | flow.cs-ack-packets | Add |
| ☐ | Key | ack_packets_out | The number of acknowledgement packets sent from server to client | flow.sc-ack-packets | Add |
| ☐ | Key | allow | The Allow HTTP response header | http.allow | Add |
| ☐ | Key | c_ip | IP address of the client in dot-quad notation | flow.c-ip | Add |
| ☐ | Key | cached | If the response was cached, 0 if it was not | http.cached | Add |
| ☐ | Key | cancelled | Number of HTTP responses that were cancelled early by the client | flow.cancelled | Add |

Enabled | Disabled     Clone  Delete  Cancel  Save

FIG. 11C

| Time | Event |
|---|---|
| 9/27/14 9:25:07.566 AM | { [-]<br>  bytes: 58516<br>  bytes_in: 461<br>  bytes_out: 58055<br>  count: 1<br>  dest_ip: 69.192.196.160<br>  dest_port: 80<br>  src_ip: 10.0.0.3<br>  status: 200<br>  time_taken: 408510<br>  timestamp: 2014-09-27T16:25:07.566163Z<br>  uri_path: /splunk/test.jpg<br>} |

Correlation Search Name

Brute Force Access Behavior Detected

Domain

Access

Application Context

SA-AccessProtection

Correlation Search Description (optional)

Detects excessive number of failed login attempts along with a successf

Search

1206
```
`authentication` | tags outputfield=tag |
stats values(tag) as
tag,count(eval(action=="failure")) as
failure,count(eval(action=="success")) as
success by src | search failure>6 success>0 |
```

*Note that this search will be extended with a call to the custom search command "aggregate" when it is saved. See the documentation for further details.*

Time range

Start time (optional)            Finish time (optional)

rt-65m@m                         rt+5m@m

*Time specifiers: y, mon, d, h, m, s*
*Learn more*

Search Type

Cron schedule

*/5 * * * *

Actions

Include in RSS feed ☐

Send email ☐

Run a script ☐

1208

Trigger network capture ☐  on  [× Email] [× HTTP]

All
DNS
NFS & SMB

For the next: 4 Hours

Cancel — 1212                    Save — 1210

FIG. 12B

Stream Config - Stream_sip
SIP Protocol Events
< Back to streams

Stream Type: event
Status: Enabled | Disabled | Stats Only — 2344 / 2346 / 2348
Splunk Index:
Event Type: sip event
Filters: 0 filters configured — View Filters Clone | Cancel

Fields

| Enable | Name | Description | Type | Term | Actions |
|---|---|---|---|---|---|
| ○ | accept_language | Indicates the preferred languages | Original | sip.accept-language | ∨ |
| ○ | alert_info | Specifies an alternative ring tone | Original | sip.alert-info | ∨ |
| ○ | bytes | The total number of bytes transferred | Original | flow.bytes | ∨ |
| ○ | bytes_in | The number of bytes sent from client to server | Original | flow.cs-bytes | ∨ |
| ○ | bytes_out | The number of bytes sent from server to client | Original | flow.sc-bytes | ∨ |

2350 {
Stream id: tcp
Total events: 15764
Total incoming traffic (MB): 6.31
Total outgoing traffic (MB): 44.13
Total traffic (MB): 50.44
Splunk Index Volume (MB): 17.52

2352 { How much of this stream would you like to index?

40%
7MB

2354 — You have an average of 25MB unused in your 1GB daily index volume limit.

2356 — Based on fluctuations in the index volume of the stream and your average unused index volume limit, we recommend indexing up to 85% of this stream.

2358 — Increase your daily index volume limit to 2GB for $1800 more per year or to 10GB for $8200 more per year.

2360 — ☐ Automatically adjust indexing of this stream based on the daily unused index volume limit 2362 — ☐ Index entire stream during high traffic volume 2364 — ☐ Index sample of stream during high traffic volume 2366 — ☐ Index entire stream during low traffic volume 2368 — ☐ Index stream daily from [6:30pm] to [7:30pm]

2370 — ☐ Index stream during public holidays and retail shopping days

2372 — ☐ Index stream during custom days — 2376

2374 — ☐ Index events based on compliance standards

— 2378

[Cancel]  [Save]

2380 —  FIG. 23C  — 2382

ADJUSTING NETWORK DATA STORAGE BASED ON EVENT STREAM STATISTICS

RELATED APPLICATION

This application is a continuation-in-part application of U.S. patent application Ser. No. 14/610,408, entitled "Grouping and Managing Event Streams Generated from Captured Network Data," by inventors Fang I. Hsiao, Clayton S. Ching, Michael R. Dickey, Vladimir A. Shcherbakov, Nishant Teredesai and Cary Glen Noel, filed 30 Jan. 2015, issued as U.S. Pat. No. 10,360,196. U.S. patent application Ser. No. 14/610,408 is itself a continuation-in-part application of application Ser. No. 14/253,713, entitled "Distributed Processing of Network Data Using Remote Capture Agents," by inventor Michael R. Dickey, filed 15 Apr. 2014, issued as U.S. Pat. No. 10,127,273. U.S. patent application Ser. No. 14/610,408 is also a continuation-in-part application of U.S. patent application Ser. No. 14/528,898, entitled "Protocol-Based Capture of Network Data Suing Remote Capture Agents," by inventors Vladimir A. Shcherbakov and Michael R. Dickey, filed 30 Oct. 2014, issued as U.S. Pat. No. 9,838,512.

The subject matter of this application is also related to the subject matter in a co-pending non-provisional application by the same inventors as the instant application and filed on the same day as the instant application, entitled "Visualizations of Statistics Associated with Captured Network Data," having Ser. No. 14/699,807, and filed on 29 Apr. 2015, issued as U.S. Pat. No. 10,462,004.

BACKGROUND

Field

The disclosed embodiments relate to techniques for processing network data. More specifically, the disclosed embodiments relate to techniques for adjusting network data capture based on event stream statistics.

Related Art

Over the past decade, the age of virtualization has triggered a sea change in the world of network data capture. Almost every network capture product available today is a physical hardware appliance that customers have to purchase and configure. In addition, most network data capture technologies are built from scratch to serve a specific purpose and address the needs of a particular vertical market. For example, network capture systems may be customized to extract data for security and intrusion-detection purposes, collect network performance data, perform Quality of Service (QoS), redirect data, block network traffic, and/or perform other analysis or management of network traffic. Such targeted and/or fixed implementation and use of network capture technologies may preclude modification of the network capture technologies to address different and changing business needs.

Moreover, customers using conventional hardware-based network capture devices typically connect the devices to other hardware devices in a network. The connections may allow the network capture devices to access the network and monitor network traffic between two or more points in the network. Examples of such devices include a network Test Access Point (TAP) or Switched Port Analyzer (SPAN) port. After the network traffic is captured, cumbersome Extraction, Transform, and Load (ETL) processes may be performed to filter, transform, and/or aggregate data from the network traffic and enable the extraction of business value from the data.

However, customers are moving away from managing physical servers and data centers and toward public and private cloud computing environments that provide software, hardware, infrastructure, and/or platform resources as hosted services using computing, storage, and/or network devices at remote locations. For these customers, it is either impossible, or at best extremely challenging, to deploy physical network capture devices and infrastructure in the cloud computing environments.

Consequently, network data capture may be facilitated by mechanisms for streamlining the deployment and configuration of network capture technology at distributed and/or remote locations.

SUMMARY

Large volumes of performance and log data may be captured as "events," wherein each event includes a collection of performance data and/or diagnostic information that is generated by a computer system and is correlated with a specific point in time. Events can be derived from "time-series event data," wherein time-series data comprises a sequence of data points (e.g., performance measurements from a computer system) that are associated with successive points in time and are typically spaced at uniform time intervals. More specifically, an event stream of time-series event data may be generated from wire data, such as network packets, captured by a number of remote capture agents deployed across a network. The remote capture agents may be installed on physical servers and/or virtual machines on the network. As a result, the remote capture agents may avert the need to deploy and connect physical hardware to network TAPS or SPAN ports, thus allowing users to configure and change their data capture configuration on-the-fly rather than in fixed formats.

Configuration or management of event streams generated from network packets captured by the remote capture agents may be performed through a configuration server and/or GUI. The configuration server and/or GUI may allow a user (e.g., an administrator) to specify a protocol used by network packets from which an event stream is created. Because such protocol-based capture and analysis of network data may result in the capture of multiple protocols in a large number of event streams, event stream information for the event streams may be grouped by one or more event stream attributes (e.g., protocol, application, category, event stream lifecycle) in the GUI. Such grouping(s) of the event stream information may facilitate analysis, understanding, and management of the event streams by the user.

The configuration server and/or GUI may also include a number of mechanisms or user-interface elements that further assist the user with management and use of the event streams. First, the configuration server and/or GUI may enable the generation of a set of statistics from an event stream without subsequently storing and processing the event stream by one or more components on a network. Alternatively, the GUI may enable the selective storage and/or processing of at least a portion of the event stream based on the statistics, a storage limit associated with the time-series event data, and/or user input through the GUI.

Second, the GUI may display the statistics and/or one or more graphs containing values from the statistics, along with a value of a statistic based on a position of a cursor over the graph(s). For example, the GUI may display a bar chart and/or pie chart of index volume for one or more event streams across a pre-specified time range. The GUI may also display the value of the index volume represented by a segment of the bar chart and/or a slice of the pie chart over which the cursor is positioned. The GUI may further highlight the segment and/or slice and dim other portions of the chart. Consequently, the configuration server and/or GUI may improve user understanding and/or decision-making related to partial or complete storage, indexing, and/or processing of event streams.

Thus, the disclosed embodiments provide a system that facilitates the processing of network data. During operation, the system causes for display a graphical user interface (GUI) for configuring the generation of time-series event data from network packets captured by one or more remote capture agents. Next, the system causes for display, in the GUI, a first set of user-interface elements for managing one or more event streams containing the time-series event data, wherein managing the one or more event streams includes enabling the generation of a set of statistics from an event stream without subsequently storing and processing at least a first portion of the event stream by one or more components on a network. The GUI then updates the configuration information based on input received through the first set of user-interface elements.

In some embodiments, the system also provides the configuration information over a network to the one or more remote capture agents, wherein the configuration information is used to configure the generation of the time-series event data at the one or more remote capture agents during runtime of the one or more remote capture agents.

In some embodiments, the system also generates the set of statistics from the time-series event data.

In some embodiments, the system also causes for display, in the GUI, a second set of user-interface elements containing the set of statistics generated from the event stream.

In some embodiments, the system also provides, in the GUI, a second set of user-interface elements for storing at least a second portion of the event stream based on the set of statistics.

In some embodiments, the system also updates the configuration information to trigger the subsequent storage and processing of at least a second portion of the event stream by the one or more components on the network based on the set of statistics.

In some embodiments, the system also provides, in the GUI, a second set of user-interface elements for storing at least a second portion of the event stream based on the set of statistics and a storage limit associated with the time-series event data.

In some embodiments, the system also causes for display, in the GUI, a suggestion for setting the amount of storage of the event stream based on the set of statistics and the storage limit.

In some embodiments, the system also causes for display, in the GUI, a price associated with storing the event stream above the storage limit.

In some embodiments, the first set of user-interface elements is displayed in the GUI with event stream information for a set of event streams comprising the event stream, a first graph of a metric associated with the time-series event data in the event stream, and/or a second graph of an aggregated metric across the set of event streams.

In some embodiments, the first set of user-interface elements is displayed in the GUI with a second set of user-interface elements for including one or more event attributes in the time-series event data of the event stream.

In some embodiments, the GUI also includes a second set of user-interface elements containing the time-series event data.

In some embodiments, managing the one or more event streams also includes enabling the event stream, disabling the event stream, or deleting the event stream.

In some embodiments, the set of statistics includes at least one of a total number of events, a total incoming traffic, a total outgoing traffic, a total traffic, and an index volume.

In some embodiments, the system also causes for display, in the GUI, a second set of user-interface elements containing the set of statistics generated from the event stream. Next, the system updates the set of statistics in real-time with the time-series event data by the one or more remote capture agents.

In some embodiments, upon determining that a size of the one or more event streams does not exceed a storage limit associated with the time-series event data, the system updates the configuration information to trigger the subsequent storage and processing of the event stream.

In some embodiments, the system also updates the configuration information to trigger the subsequent storage and processing of at least a second portion of the event stream by the one or more components on the network based on an index volume of the event stream.

In some embodiments, the system also updates the configuration information to trigger the subsequent storage and processing of at least a second portion of the event stream upon detecting a high traffic volume associated with the event stream.

In some embodiments, the system also causes for display, in the GUI, a second set of user-interface elements containing the set of statistics generated from the event stream and one or more additional sets of statistics generated from one or more additional event streams captured by the one or more remote capture agents.

In some embodiments, the system also causes for display, in the GUI, a second set of user-interface elements containing the set of statistics generated from the event stream and one or more additional sets of statistics generated from one or more additional event streams that are not subsequently stored and processed by the one or more components on the network.

In some embodiments, the system also causes for display, in the GUI, a second set of user-interface elements containing the set of statistics generated from the event stream.

In some embodiments, the system also causes for display, in the GUI, a third set of user-interface elements containing the set of statistics generated from an additional event stream, wherein at least a second portion of the additional event stream is subsequently stored and processed by the one or more components on the network.

In some embodiments, the system also updates the configuration information to trigger the subsequent storage and processing of at least a second portion of the event stream by the one or more components on the network based on a remaining storage limit associated with the time-series event data.

In some embodiments, the system also updates the configuration information to trigger the subsequent storage and processing of at least a second portion of the event stream by the one or more components on the network based on a historical trend associated with the set of statistics.

In some embodiments, the system also updates the configuration information to trigger the subsequent storage and processing of the event stream upon detecting a high traffic volume associated with the event stream.

In some embodiments, the system also updates the configuration information to trigger the subsequent storage and processing of at least a second portion of the event stream upon detecting a light traffic volume associated with the event stream.

In some embodiments, the system also generates the set of statistics from the time-series event data for the event stream and one or more additional event streams. Next, the system aggregates the set of statistics across the event stream and the one or more additional event streams.

In some embodiments, the system causes for display, in the GUI, a second set of user-interface elements containing the aggregated set of statistics.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 11A shows an exemplary screenshot in accordance with the disclosed embodiments.

FIG. 11B shows an exemplary screenshot in accordance with the disclosed embodiments.

FIG. 11C shows an exemplary screenshot in accordance with the disclosed embodiments.

FIG. 11F shows an exemplary screenshot in accordance with the disclosed embodiments.

FIG. 12B shows an exemplary screenshot in accordance with the disclosed embodiments.

FIG. 23B shows an exemplary screenshot in accordance with the disclosed embodiments.

FIG. 23C shows an exemplary screenshot in accordance with the disclosed embodiments.

In the figures, like reference numerals refer to the same figure elements.

DETAILED DESCRIPTION

Figure 1:
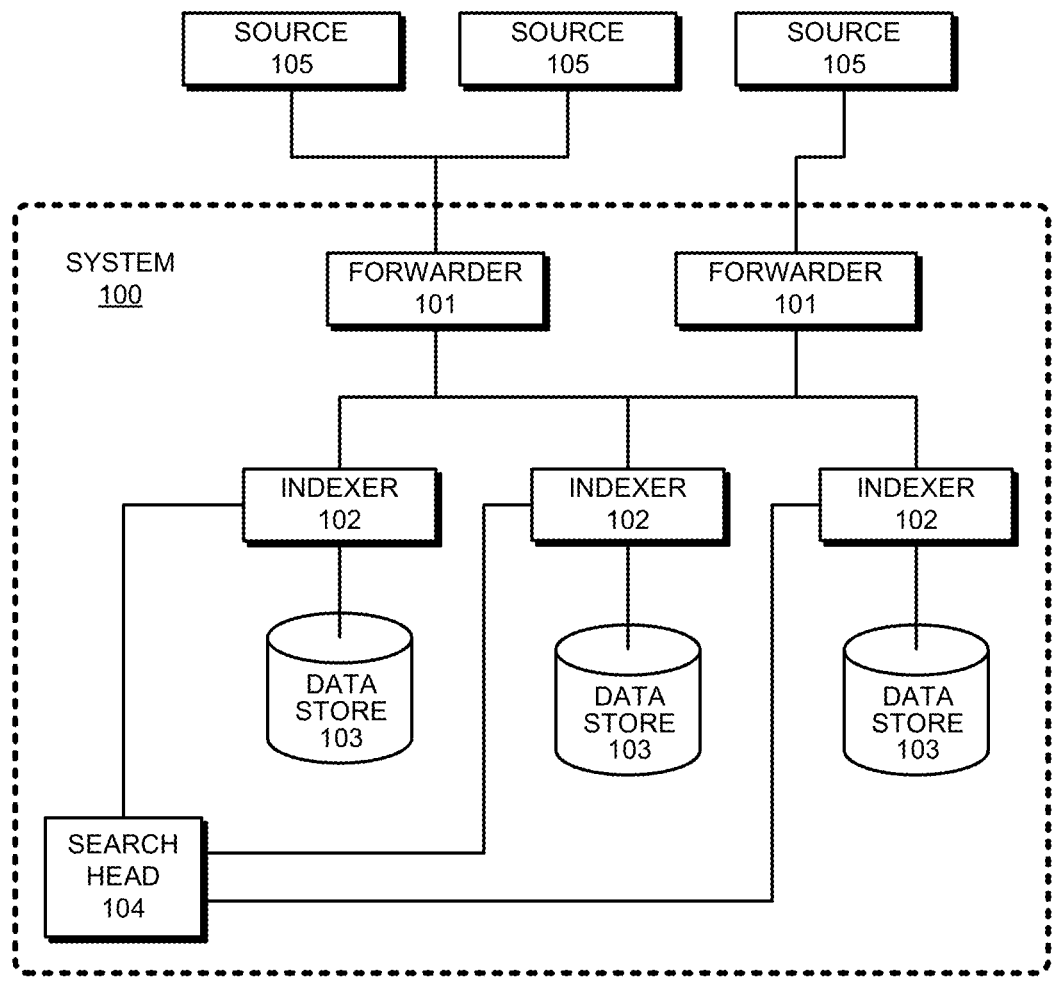
FIG. 1 shows a block diagram of an exemplary event-processing system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time-series data," wherein time-series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time at which a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 shows a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, forwarders 101 identify which indexers 102 will receive the collected data and then forward the data to the identified indexers 102. Forwarders 101 can also perform operations to strip extraneous data and detect timestamps in the data. Forwarders 101 may next determine which indexers 102 will receive each data item and forward the data items to the determined indexers 102. Indexers 102 may then provide the data for storage in one or more data stores 103.

As mentioned above, the data may include streams, logs, database records, messages, archives, and/or other records containing time-series data. Time-series data refers to any data that can be associated with a timestamp. The data can be structured, unstructured, or semi-structured and come from files or directories. Unstructured data may include data, such as machine data and web logs, that is not organized to facilitate extraction of values for fields from the data.

Note that distributing data across different indexers facilitates parallel processing. This parallel processing can take place at data ingestion time, because multiple indexers can process the incoming data in parallel. The parallel processing can also take place at search time, because multiple indexers can search the data in parallel.

System 100 and the processes described below with respect to FIGS. 1-5 are further described in "Exploring Splunk Search Processing Language (SPL) Primer and Cookbook," by David Carasso, CITO Research, 2012, and in "Optimizing Data Analysis With a Semi-Structured Time-series Database," by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
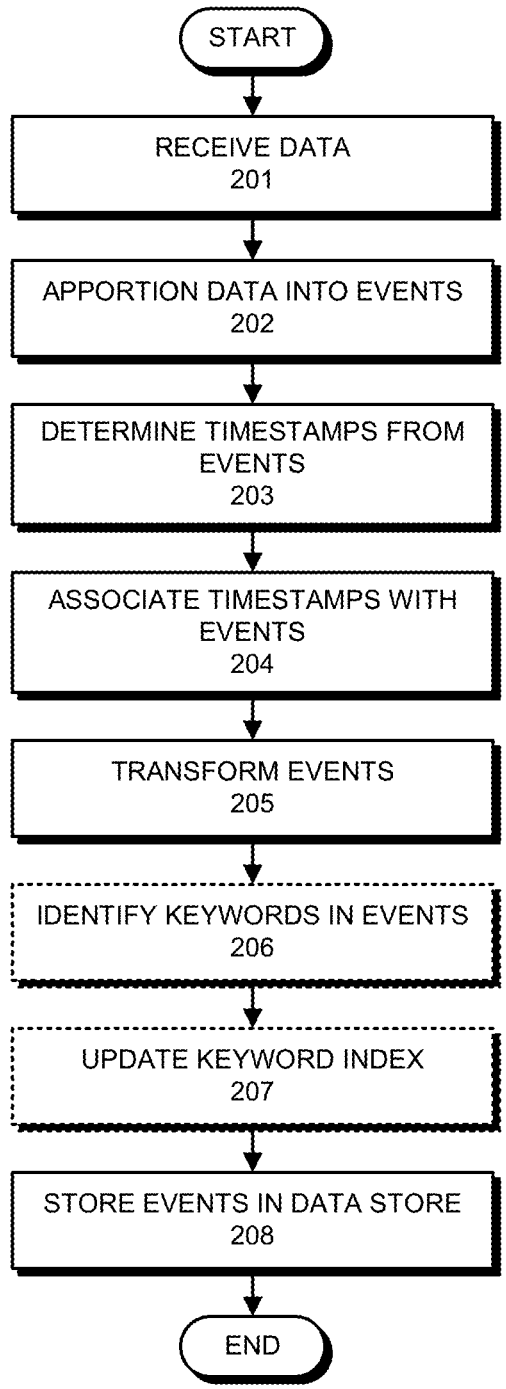
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
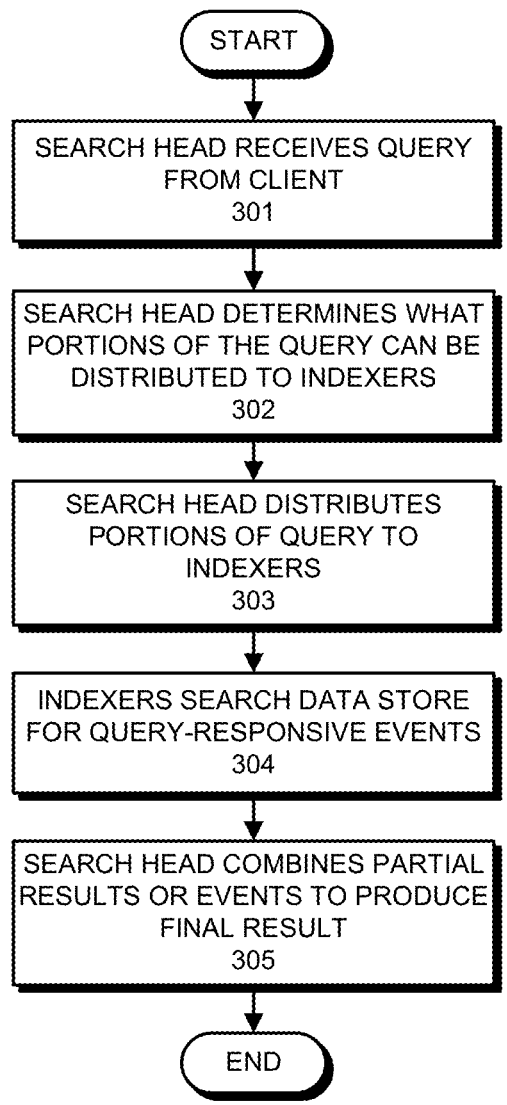
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding schema to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
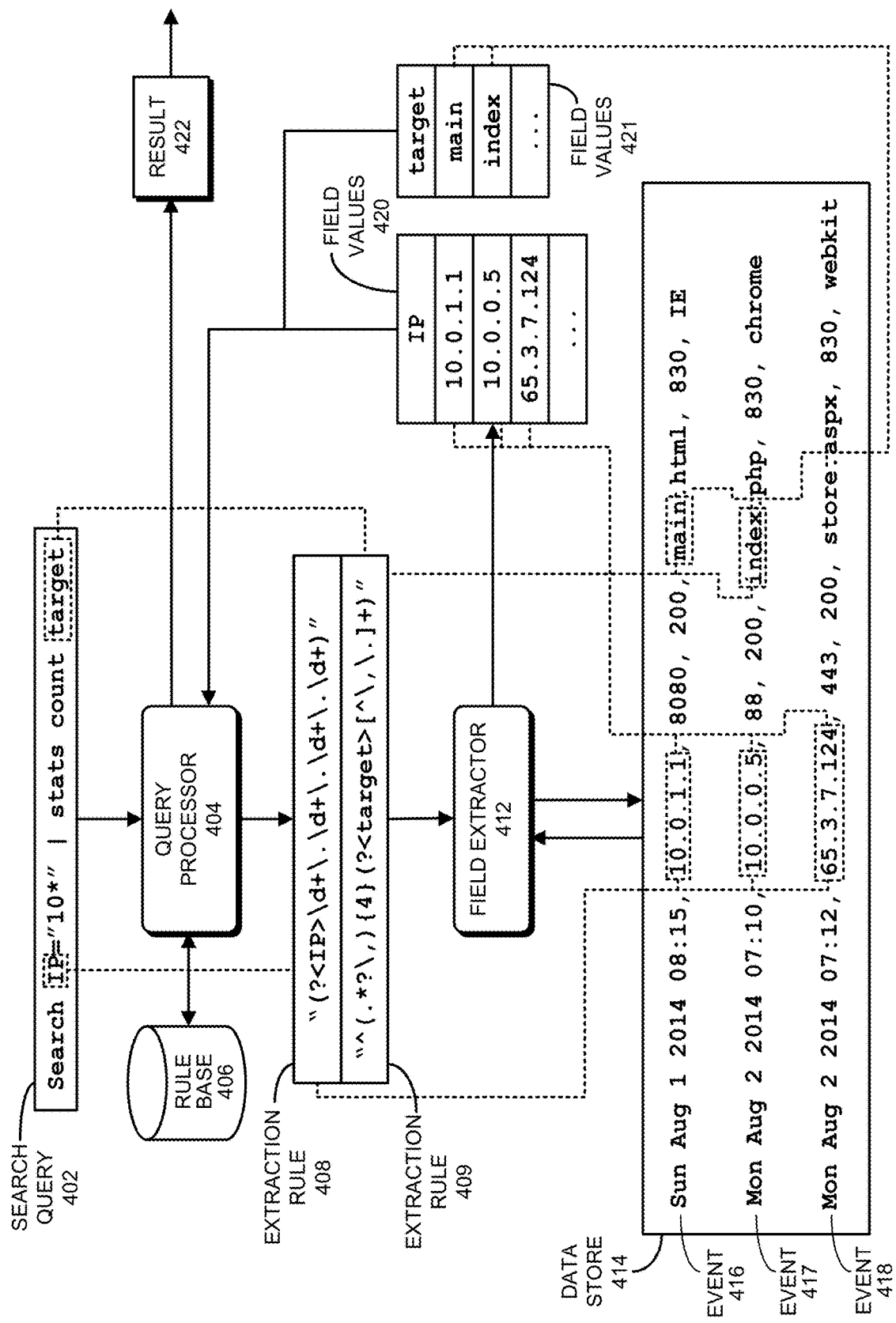
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP"10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
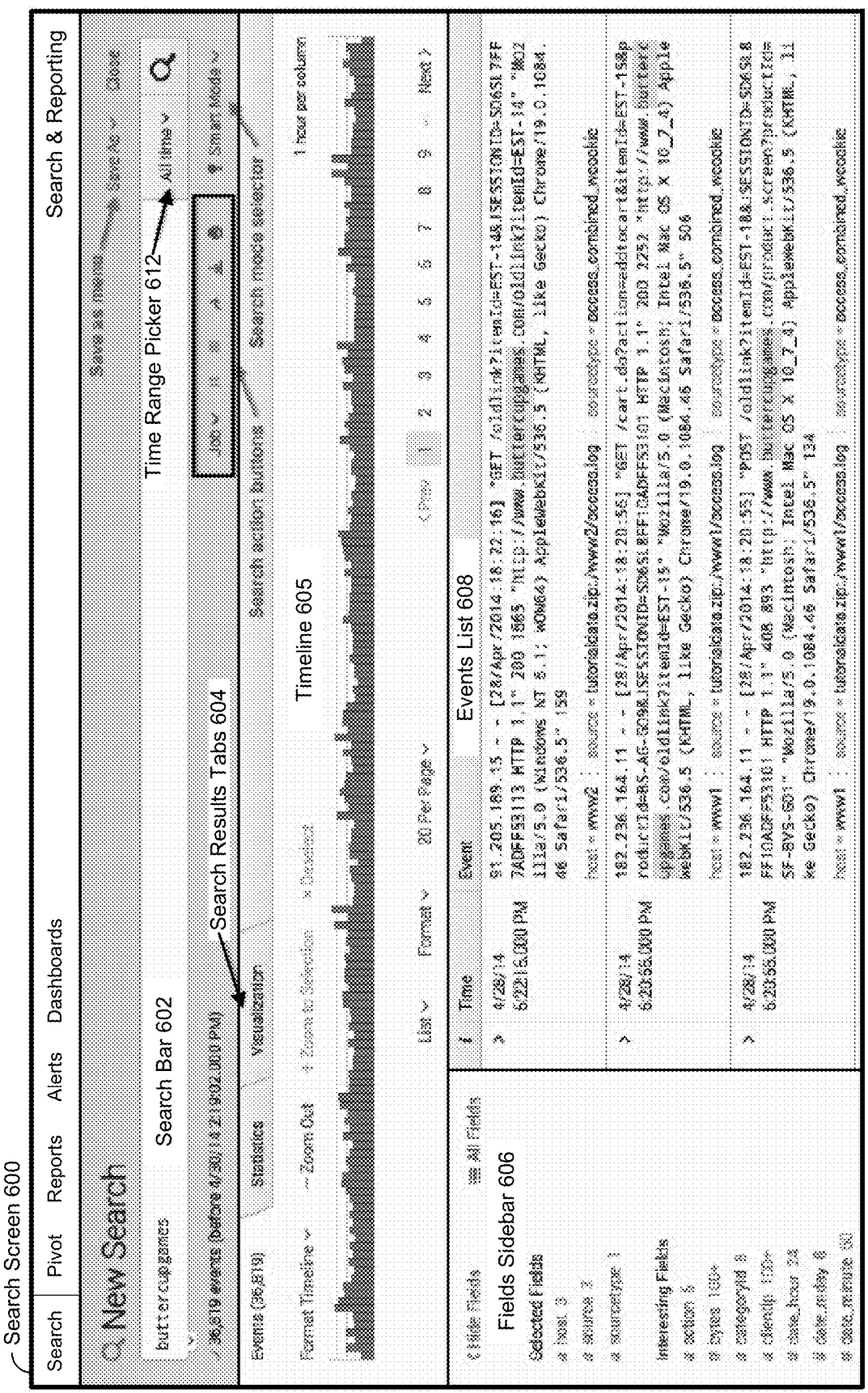
FIG. 6A illustrates a search screen in accordance with the disclosed embodiments.
Figure 6B:
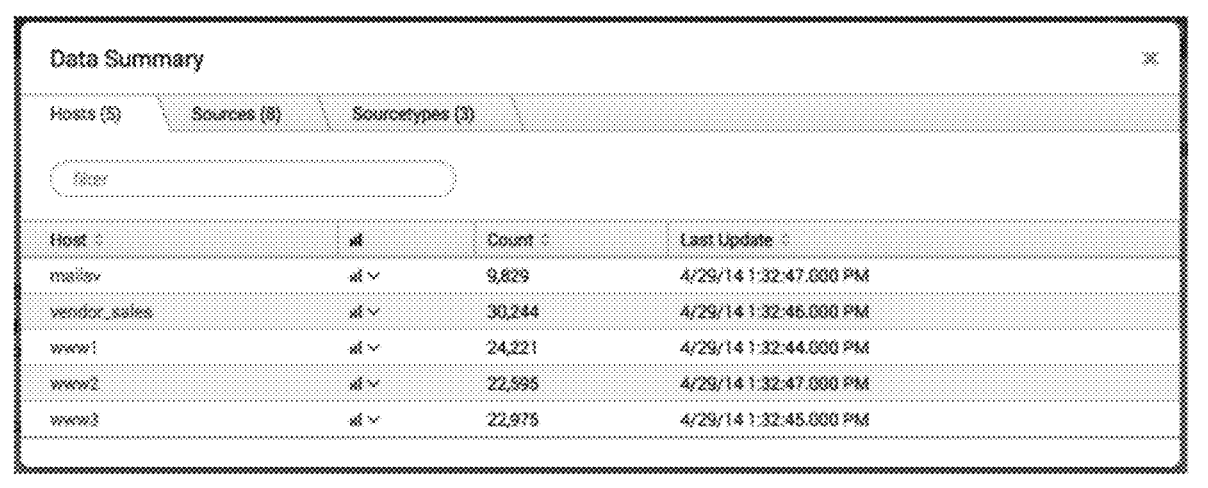

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
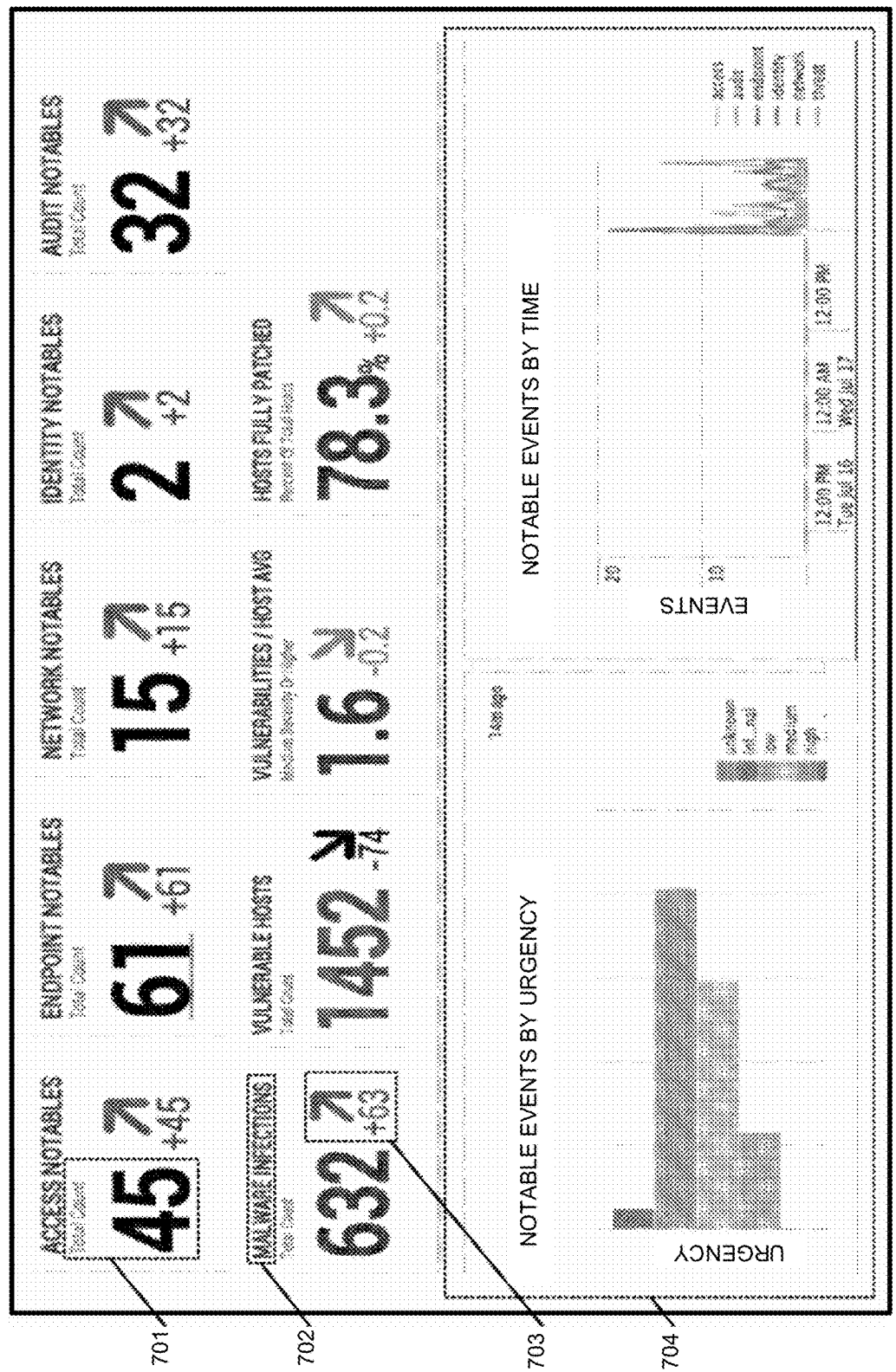
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
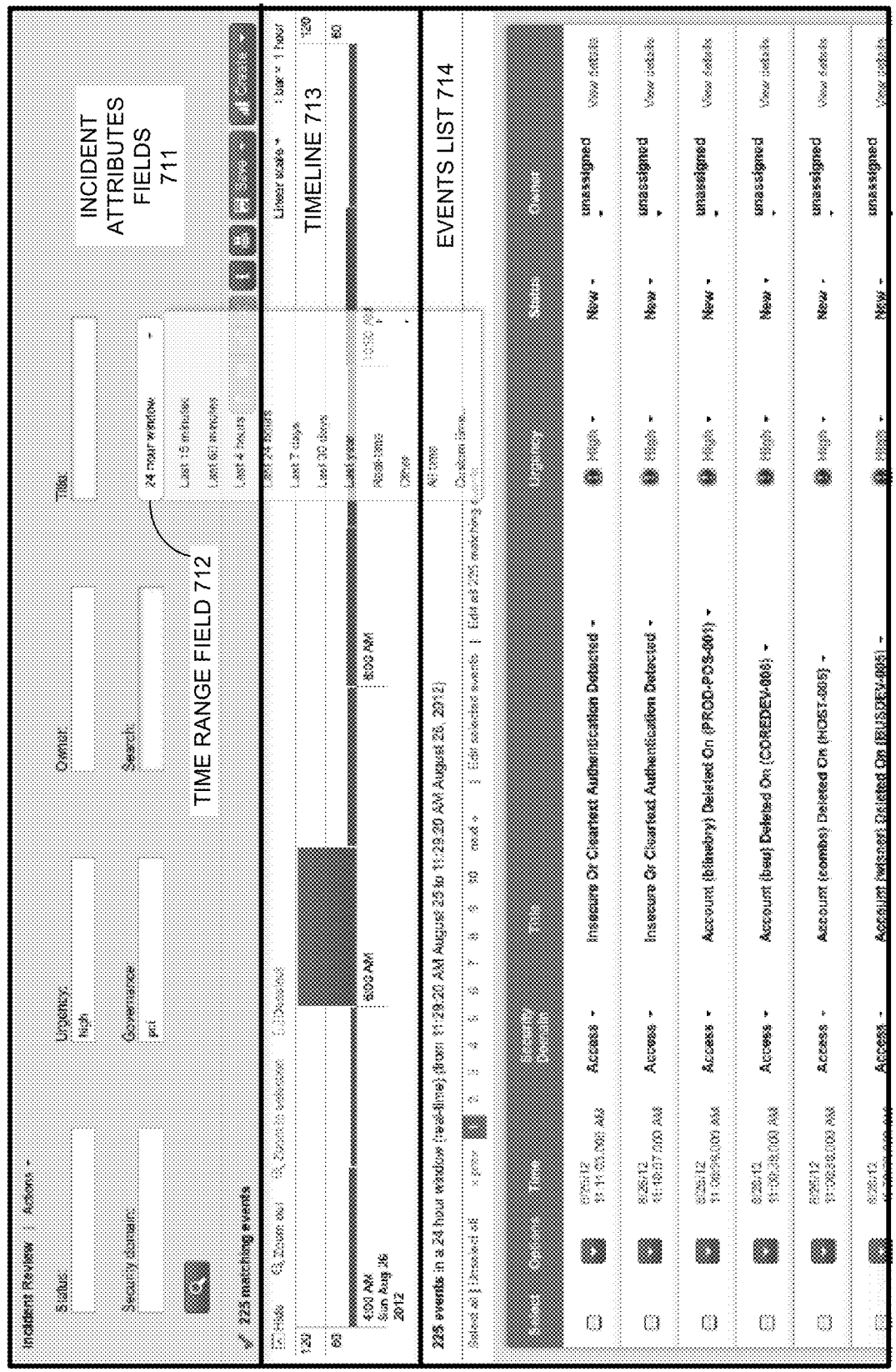
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc., of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
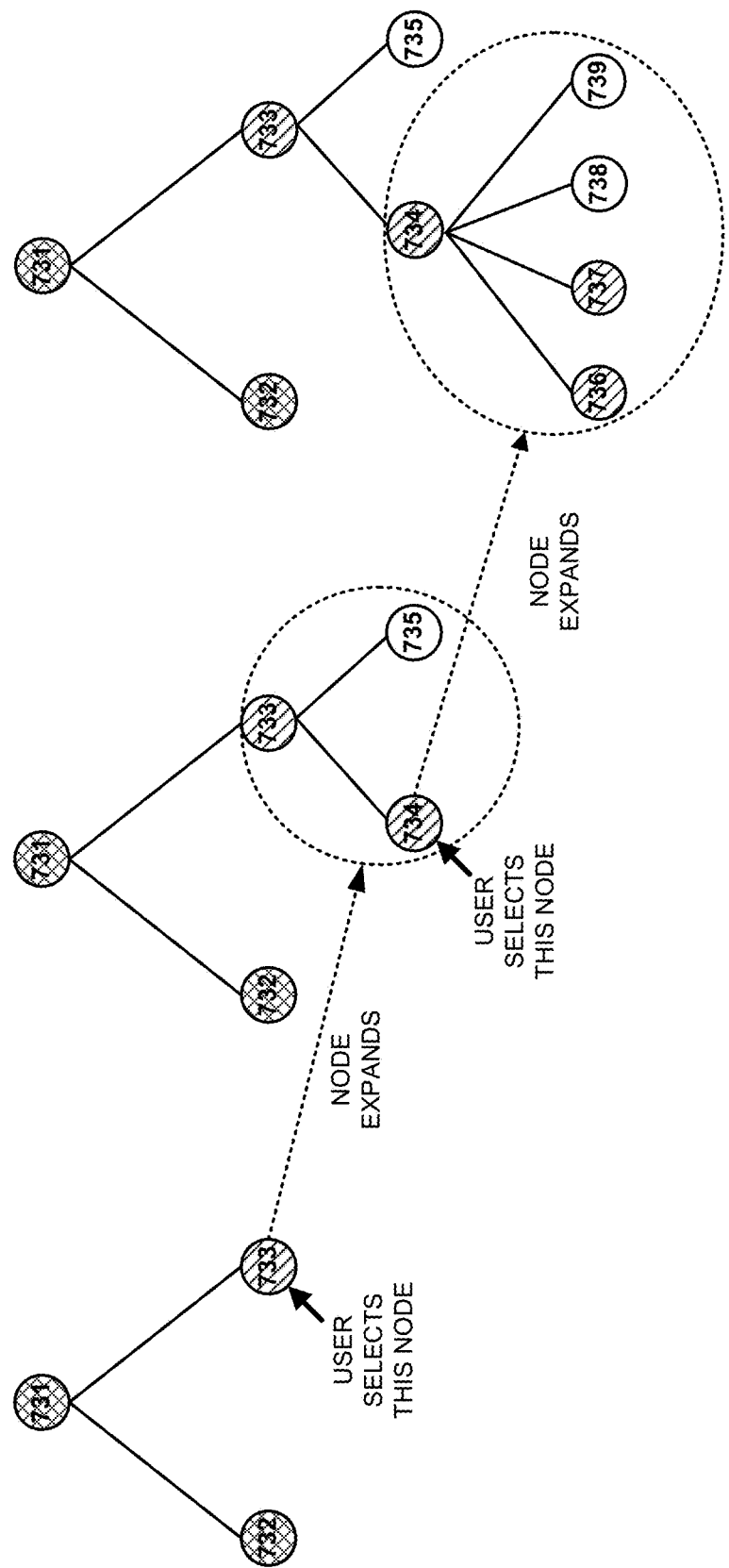
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
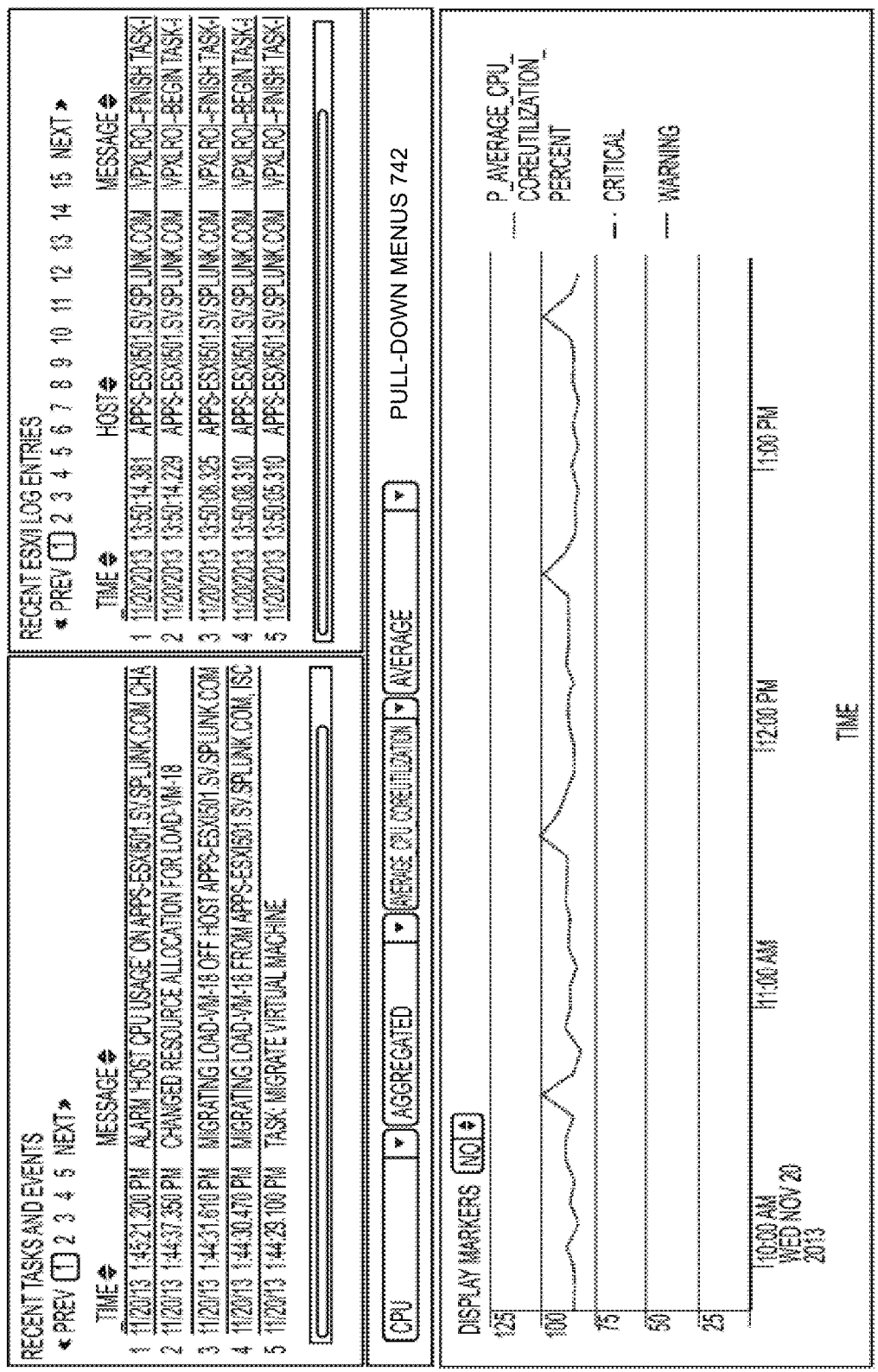
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.1 Managing Event Streams Generated from Captured Network Data

Figure 8:
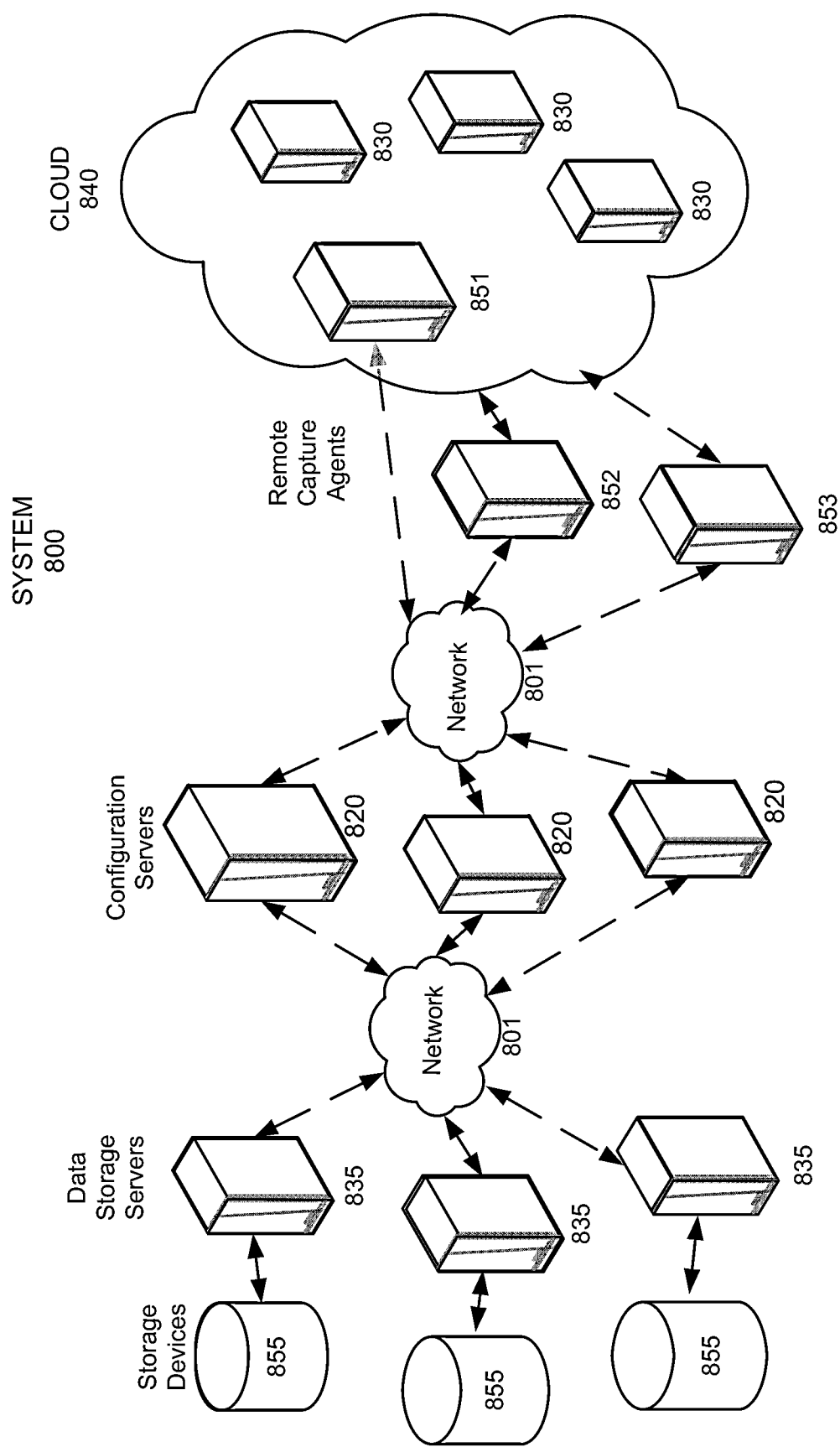
FIG. 8 shows a schematic of a system in accordance with the disclosed embodiments.

The disclosed embodiments provide a method and system for facilitating the processing of network data. As shown in FIG. 8, the network data may be captured using a data-processing system 800 in a distributed network environment. In the illustrated embodiment, system 800 includes a set of configuration servers 820 in communication with a set of remote capture agents 851-853 over one or more networks 890.

Although system 800 only depicts three configuration servers 820 and three remote capture agents 851-853, any number of configuration servers 820 and/or remote capture agents 851-853 may be configured to operate and/or communicate with one another within the data-processing system. For example, a single physical and/or virtual server may perform the functions of configuration servers 820. Alternatively, multiple physical and/or virtual servers or network elements may be logically connected to provide the functionality of configuration servers 820. The configuration server(s) may direct the activity of multiple distributed remote capture agents 851-853 installed on various client computing devices across one or more networks. In turn, remote capture agents 851-853 may be used to capture network data from multiple remote network data sources.

Further, embodiments described herein can be configured to capture network data in a cloud-based environment, such as cloud 840 depicted in the illustrated embodiment, and to generate events such as timestamped records of network activity from the network data. Remote capture agents 851-853 may capture network data originating from numerous distributed network servers, whether they are physical hardware servers or virtual machines running in cloud 840. In cloud-based implementations, remote capture agents 851-853 will generally only have access to information that is communicated to and received from machines running in the cloud-based environment. This is because, in a cloud environment, there is generally no access to any of the physical network infrastructure, as cloud computing may utilize a "hosted services" delivery model where the physical network infrastructure is typically managed by a third party.

Embodiments further include the capability to separate the data capture technology into a standalone component that can be installed directly on client servers, which may be physical servers or virtual machines residing on a cloud-based network (e.g., cloud 840), and used to capture and generate events for all network traffic that is transmitted in and out of the client servers. This eliminates the need to deploy and connect physical hardware to network TAPS or SPAN ports, thus allowing users to configure and change their data capture configuration on-the-fly rather than in fixed formats.

In the illustrated embodiment, remote capture agents 852-853 are in communication with network servers 830 residing in cloud 840, and remote capture agent 851 is located in cloud 840. Cloud 840 may represent any number of public and private clouds, and is not limited to any particular cloud configuration. Network servers 830 residing in cloud 840 may be physical servers and/or virtual machines in cloud 840, and network traffic to and from network servers 830 may be monitored by remote capture agent 851 and/or other remote capture agents connected to network servers 830. Further, remote capture agents 852-853 may also run in cloud 840 on physical servers and/or virtual machines. Those skilled in the art will appreciate that any number of remote capture agents may be included inside or outside of cloud 840.

Remote capture agents 851-853 may analyze network packets received from the networks(s) to which remote capture agents 851-853 are connected to obtain network data from the network packets and generate a number of events from the network data. For example, each remote capture agent 851-853 may listen for network traffic on network interfaces available to the remote capture agent. Network packets transmitted to and/or from the network interfaces may be intercepted by the remote capture agent and analyzed, and relevant network data from the network packets may be used by the remote capture agent to create events related to the network data. Such events may be generated by aggregating network data from multiple network packets, or each event may be generated using the contents of only one network packet. A sequence of events from a remote capture agent may then be included in one or more event streams that are provided to other components of system 800.

Configuration servers 820, data storage servers 835, and/or other network components may receive event data (e.g., event streams) from remote capture agents 851-853 and further process the event data before the event data is stored by data storage servers 835. In the illustrated embodiment, configuration servers 820 may transmit event data to data storage servers 835 over a network 801 such as a local area network (LAN), wide area network (WAN), personal area network (PAN), virtual private network, intranet, mobile phone network (e.g., a cellular network), Wi-Fi network, Ethernet network, and/or other type of network that enables communication among computing devices. The event data may be received over a network (e.g., network 801, network 890) at one or more event indexers (see FIG. 1) associated with data storage servers 835.

In addition, system 800 may include functionality to determine the types of network data collected and/or processed by each remote capture agent 851-853 to avoid data duplication at the indexers, data storage servers 835, and/or other components of system 800. For example, remote capture agents 852-853 may process network traffic from the same network. However, remote capture agent 852 may generate page view events from the network traffic, and remote capture agent 853 may generate request events (e.g., of HyperText Transfer Protocol (HTTP) requests and responses) from the network traffic.

In one or more embodiments, configuration servers 820 include configuration information that is used to configure the creation of events from network data on remote capture agents 851-853. In addition, such configuration may occur dynamically during event processing (e.g., at runtime). Conversely, because most conventional network capture technologies target specific end uses, they have been designed to operate in a fixed way and generally cannot be modified dynamically or easily to address different and changing business needs.

At least certain embodiments are adapted to provide a distributed remote capture platform in which the times at which events are communicated to the configuration servers 820 and the fields to be included in the events are controlled by way of user-modifiable configuration rather than by "hard coding" fixed events with pre-determined fields for a given network capture mechanism. The remote configuration capability also enables additional in-memory processing (e.g., filtering, transformation, normalization, aggregation, etc.) on events at the point of capture (e.g., remote capture agents 851-853) before the events are transmitted to other components of system 800.

Configuration information stored at each configuration server 820 may be created and/or updated manually at the configuration server and/or at a network element in communication with the configuration server. For example, a user may upload a configuration file containing configuration information for a remote capture agent to one or more configuration servers 820 for subsequent propagation to the remote capture agent. Alternatively, the user may use a GUI to provide the configuration information, as described in further detail below with respect to FIGS. 11A-11D. The configuration information may further be provided by one or more applications running on a separate server or network element, such as data storage servers 835.

Remote capture agents 851-853 may then use the configuration information to generate events from captured network packets. When changes in the configuration information at the configuration server are detected at the remote capture agents, logic in the remote capture agents may be automatically reconfigured in response. This means the remote capture agents may be dynamically configured to produce different events, transform the events, and/or communicate event streams to different components of system 800. Dynamic configuration of the generation of events from captured network packets may also be performed by other components (e.g., configuration servers 820, data storage servers 835, etc.), in lieu of or in addition to the remote capture agents.

To detect changes in configuration information at configuration servers 820, remote capture agents 851-853 may poll configuration servers 820 at periodic intervals for updates to the configuration information. The updates may then be pulled from configuration servers 820 by remote capture agents 851-853. Conversely, updates to the configuration information may be pushed from configuration servers 820 to remote capture agents 851-853 at periodic intervals and/or when changes to the configuration information have been made.

In one embodiment, configuration servers 820 include a list of event streams generated by remote capture agents 851-853, as well as the configuration information used to generate the event streams at remote capture agents 851-853. The configuration information may include a unique identifier for each event stream, the types of events to be included in the event stream, one or more fields to be included in each event, and/or one or more filtering rules for filtering events to be included in the event stream. Using configuration information to dynamically modify network data capture by remote capture agents (e.g., remote capture agents 851-853) is described in a co-pending non-provisional application by inventor Michael Dickey, entitled "Distributed Processing of Network Data Using Remote Capture Agents," having Ser. No. 14/253,783, and filing date 15 Apr. 2014, which is incorporated herein by reference.

In one or more embodiments, system 800 includes functionality to perform protocol-based capture and analysis of network data using remote capture agents 851-853. First, remote capture agents 851-853 may be configured to generate event streams from packet flows captured at remote capture agents 851-853 based on protocol classifications for the packet flows. Second, configuration servers 820 may include functionality to streamline the configuration of remote capture agents 851-853 in generating protocol-specific event streams. Third, configuration servers 820 and/or remote capture agents 851-853 may enable the use of capture triggers to capture additional network data based on the identification of potential security risks from previously generated event streams. Protocol-based capture and analysis of network data using remote capture agents is described in a co-pending non-provisional application by inventors Vladimir Shcherbakov and Michael Dickey and filed on the same day as the instant application, entitled "Protocol-Based Capture of Network Data Using Remote Capture Agents," having Ser. No. 14/528,898, and filing date 30 Oct. 2014, which is incorporated herein by reference.

Figure 9A:
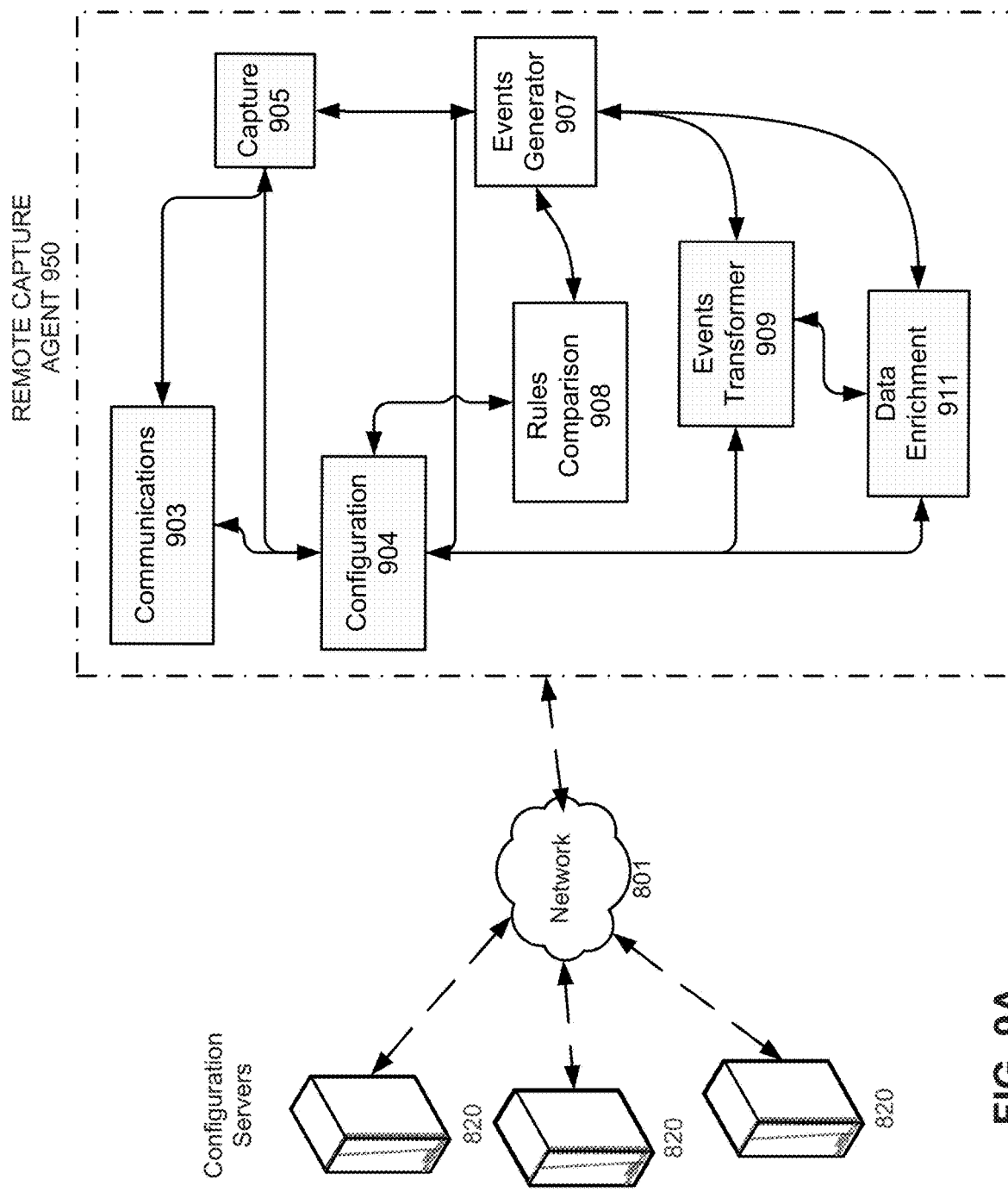
FIG. 9A shows a remote capture agent in accordance with the disclosed embodiments.

FIG. 9 shows a remote capture agent 950 in accordance with the disclosed embodiments. In the illustrated embodiment, remote capture agent 950 is adapted to receive configuration information from one or more configuration servers 820 over network 801. Remote capture agent 950 may be installed at a customer's premises on one or more of the customer's computing resources. Remote capture agent 950 may also be installed in a remote computing environment such as a cloud computing system. For example, remote capture agent 950 may be installed on a physical server and/or in a virtual computing environment (e.g., virtual machine) that is distributed across one or more physical machines.

Remote capture agent 950 includes a communications component 903 configured to communicate with network elements on one or more networks (e.g., network 801) and send and receive network data (e.g., network packets) over the network(s). As depicted, communications component 903 may communicate with configuration servers 820 over network 801. Communications component 903 may also communicate with one or more sources of network data, such as network servers 830 of FIG. 8.

Network data received at communications component 903 may be captured by a capture component 905 coupled with communications component 903. Capture component 905 may capture some or all network data from communications component 903. For example, capture component 905 may capture network data based on the sources and/or destinations of the network data, the types of the network data, the protocol associated with the network data, and/or other characteristics of the network data.

In addition, the network data may be captured based on configuration information stored in a configuration component 904 of remote capture agent 950. As mentioned above, the configuration information may be received from configuration servers 820 over network 801. The configuration information may then be used to dynamically configure or reconfigure remote capture agent 950 in real-time. For example, newly received configuration information in configuration component 904 may be used to configure the operation of remote capture agent 950 during processing of events from network data by remote capture agent 950.

To dynamically configure remote capture agent 950, configuration information received by configuration component 904 from configuration servers 820 may be provided to other components of remote capture agent 950. More specifically, remote capture agent 950 includes an events generator 907 that receives network data from network data capture component 905 and generates events from the network data based on configuration information from configuration component 904.

Using configuration information provided by configuration servers 820, remote capture agent 950 can be instructed to perform any number of event-based processing operations. For example, the configuration information may specify the generation of event streams associated with network (e.g., HTTP, Simple Mail Transfer Protocol (SMTP), Domain Name System (DNS)) transactions, business transactions, errors, alerts, clickstream events, and/or other types of events. The configuration information may also describe custom fields to be included in the events, such as values associated with specific clickstream terms. The configuration information may include additional parameters related to the generation of event data, such as an interval between consecutive events and/or the inclusion of transactions and/or errors matching a given event in event data for the event. Configuration information for configuring the generation of event streams from network data captured by remote capture agents is further described in the above-referenced applications.

An events transformer 909 may further use the configuration information to transform some or all of the network data from capture component 905 and/or events from events generator 907 into one or more sets of transformed events. In one or more embodiments, transformations performed by events transformer 909 include aggregating, filtering, cleaning, and/or otherwise processing events from events generator 907. Configuration information for the transformations may thus include a number of parameters that specify the types of transformations to be performed, the types of data on which the transformations are to be performed, and/or the formatting of the transformed data.

A rules comparison engine 908 in remote capture agent 950 may receive events from events generator 907 and compare one or more fields from the events to a set of filtering rules in the configuration information to determine whether to include the events in an event stream. For example, the configuration information may specify packet-level, protocol-level, and/or application-level filtering of event data from event streams generated by remote capture agent 950.

Finally, a data enrichment component 911 may further transform event data into a different form or format based on the configuration information from configuration component 904. For example, data enrichment component 911 may use the configuration information to normalize the data so that multiple representations of the same value (e.g., timestamps, measurements, etc.) are converted into the same value in transformed event data.

Data can be transformed by data enrichment component 911 in any number of ways. For example, remote capture agent 950 may reside on a client server in Cupertino, Calif., where all the laptops associated with the client server have been registered with the hostname of the client server. Remote capture agent 950 may use the registration data to look up an Internet Protocol (IP) address in a look-up table (LUT) that is associated with one or more network elements of the client server's local network. Remote capture agent 950 may then resolve a user's IP address into the name of the user's laptop, thereby enabling inclusion of the user's laptop name in transformed event data associated with the IP address. The transformed event data may then be communicated to configuration servers 820 and/or a central transformation server residing in San Francisco for further processing, indexing, and/or storage.

Figure 9B:
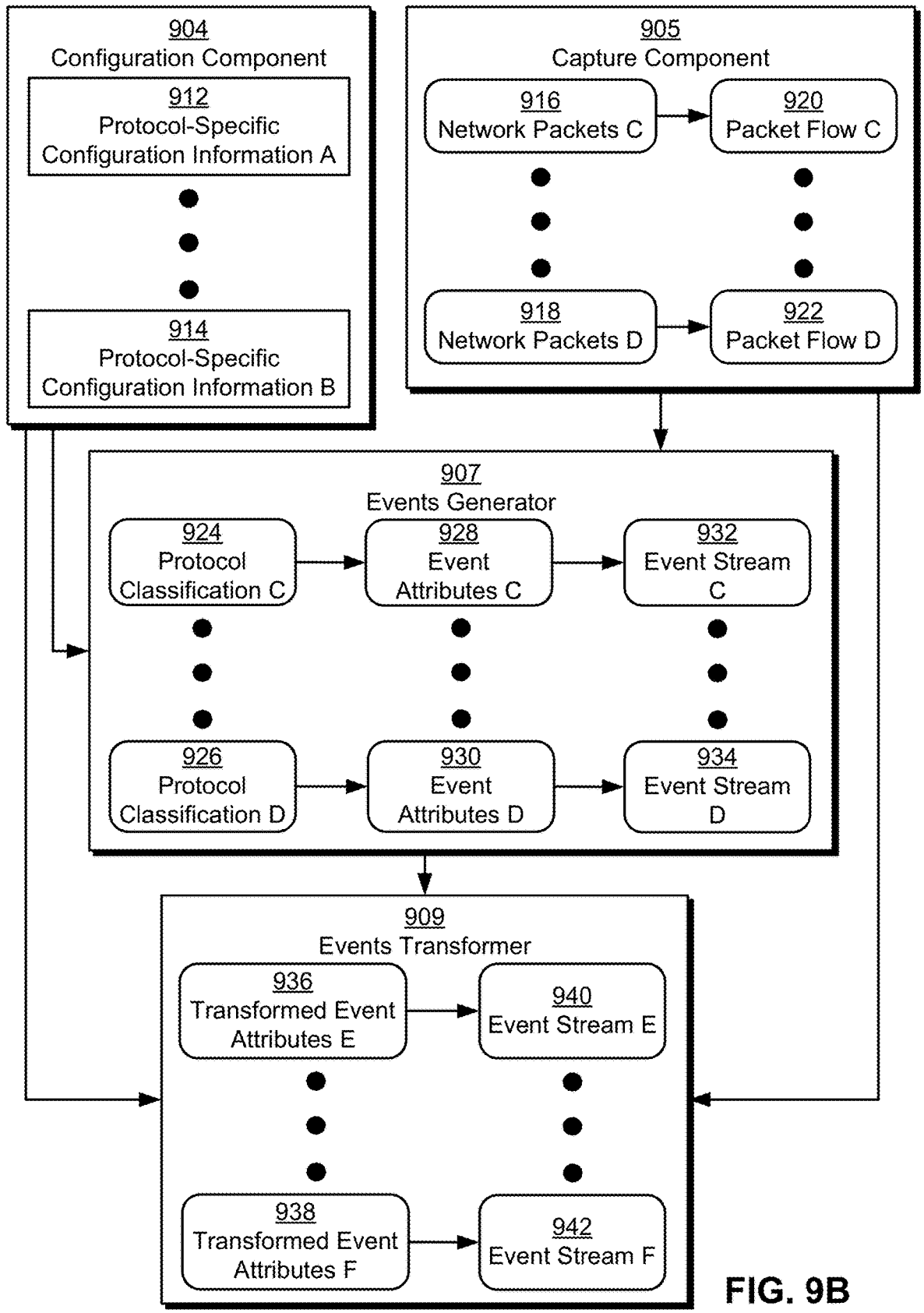
FIG. 9B shows the protocol-based capture of network data using a remote capture agent in accordance with the disclosed embodiments.

As mentioned above, remote capture agent 950 may perform protocol-based generation of event streams from network data. As shown in FIG. 9B, configuration component 904 may obtain protocol-specific configuration information (e.g., protocol-specific configuration information A 912, protocol-specific configuration information B 914) from one or more configuration servers (e.g., configuration servers 820). For example, configuration information from the configuration server(s) may be transmitted over network 801 to communications component 903, which provides the configuration information to configuration component 904 for storage and/or further processing.

Protocol-specific configuration information from configuration component 904 may be used to configure the generation of event streams (e.g., event stream C 932, event stream D 934, event stream E 940, event stream F 942) based on protocol classifications of network packets (e.g., network packets C 916, network packets D 918) captured by capture component 905. For example, protocol-specific configuration information from configuration component 904 may specify the creation of event streams from the network packets based on the protocols used in the network packets, such as HTTP, DNS, SMTP, File Transfer Protocol (FTP), Server Message Block (SMB), Network File System (NFS), Internet Control Message Protocol (ICMP), email protocols, database protocols, and/or security protocols. Such event streams may include event attributes that are of interest to the respective protocols.

Before the event streams are generated from the network packets, capture component 905 may assemble the network packets into one or more packets flows (e.g., packet flow C 920, packet flow D 922). First, capture component 905 may identify the network packets in a given packet flow based on control information in the network packets. The packet flow may represent a communication path between a source and a destination (e.g., host, multicast group, broadcast domain, etc.) on the network. As a result, capture component 905 may identify network packets in the packet flow by examining network (e.g., IP) addresses, ports, sources, destinations, and/or transport protocols (e.g., Transmission Control Protocol (TCP), User Datagram Protocol (UDP), etc.) from the headers of the network packets.

Next, capture component 905 may assemble the packet flow from the network packets. For example, capture component 905 may assemble a TCP packet flow by rearranging out-of-order TCP packets. Conversely, capture component 905 may omit reordering of the network packets in the packet flow if the network packets use UDP and/or another protocol that does not provide for ordered packet transmission.

After the packet flow is assembled, capture component 905 and/or another component of remote capture agent 950 may detect encryption of the network packets in the packet flow by analyzing the byte signatures of the network packets' payloads. For example, the component may analyze the network packets' payloads for byte signatures that are indicative of Secure Sockets Layer (SSL) and/or Transport Layer Security (TLS) encryption. If the network packets are detected as encrypted, the component may decrypt the network packets. For example, the component may have access to private keys from an SSL server used by the network flow and perform decryption of the network packets to obtain plaintext payload data in the order in which the data was sent. Such access to private keys may be given to remote capture agent 950 by an administrator associated with the network flow, such as an administrator of the host from which the network packets are transmitted.

Events generator 907 may then obtain a protocol classification (e.g., protocol classification C 924, protocol classification D 926) for each packet flow identified, assembled, and/or decrypted by capture component 905. For example, events generator 907 may use a protocol-decoding mechanism to analyze the headers and/or payloads of the network packets in the packet flow and return protocol identifiers of one or more protocols used in the network packets. The protocol-decoding mechanism may additionally provide metadata related to the protocols, such as metadata related to traffic volume, application usage, application performance, user and/or host identifiers, content (e.g., media, files, etc.), and/or file metadata (e.g., video codecs and bit rates).

Once the protocol classification is obtained for a packet flow, events generator 907 may use protocol-specific configuration information associated with the protocol classification from configuration component 904 to build an event stream (e.g., event stream C 932, event stream D 934) from the packet flow. As mentioned above and in the above-referenced application, the event stream may include time-series event data generated from network packets in the packet flow. To create the event stream, events generator 907 may obtain one or more event attributes associated with the protocol classification from the configuration information. Next, event generator 907 may extract the event attribute(s) from the network packets in the first packet flow. Events generator 907 may then include the extracted event attribute(s) in the event stream.

For example, events generator 907 may obtain a protocol classification of DNS for a packet flow from capture component 905 and protocol-specific configuration information for generating event streams from DNS traffic from configuration component 904. The protocol-specific configuration information may specify the collection of event attributes such as the number of bytes transferred between the source and destination, network addresses and/or identifiers for the source and destination, DNS message type, DNS query type, return message, response time to a DNS request, DNS transaction identifier, and/or a transport layer protocol. In turn, events generator 907 may parse the protocol-specific configuration to identify the event attributes to be captured from the packet flow. Next, events generator 907 may extract the specified event attributes from the network packets in the packet flow and/or metadata received with the protocol classification of the packet flow and generate time-stamped event data from the extracted event attributes. Events generator 907 may then provide the time-stamped event data in an event stream to communications component 903 for transmission of the event stream over a network to one or more configuration servers, data storage servers, indexers, and/or other components for subsequent storage and processing of the event stream by the component(s).

As described above and in the above-referenced application, network data from capture component 905 and/or event data from events generator 907 may be transformed by events transformer 909 into transformed event data that is provided in lieu of or in addition to event data generated by events generator 907. For example, events transformer 909 may aggregate, filter, clean, and/or otherwise process event attributes from events generator 907 to produce one or more sets of transformed event attributes (e.g., transformed event attributes 1 936, transformed event attributes z 938). Events transformer 909 may then include the transformed event attributes into one or more additional event streams (e.g., event stream 1 940, event stream z 942) that may be transmitted over the network for subsequent storage and processing of the event stream(s) by other components on the network. Such transformation of event data at remote capture agent 950 may offload subsequent processing of the event data at configuration servers and/or other components on the network. Moreover, if the transformation reduces the size of the event data (e.g., by aggregating the event data), network traffic between remote capture agent 950 and the other components may be reduced, along with the storage requirements associated with storing the event data at the other components.

As with protocol-based generation of event data by events generator 907, events transformer 909 may use protocol-specific configuration information from configuration component 904 to transform network and/or event data from a given packet flow and/or event stream. For example, events transformer 909 may obtain protocol-specific configuration information for aggregating HTTP events and use the configuration information to generate aggregated HTTP events from HTTP events produced by events generator 907. The configuration information may include one or more key attributes used to generate a unique key representing an aggregated event from the configuration information. For example, key attributes for generating an aggregated HTTP event may include the source and destination IP addresses and ports in a set of HTTP events. A different unique key and aggregated HTTP event may thus be generated for each unique combination of source and destination IP addresses and ports in the HTTP events.

The configuration information may also specify one or more aggregation attributes to be aggregated prior to inclusion in the aggregated event. For example, aggregation attributes for generating an aggregated HTTP event from HTTP event data may include the number of bytes and packets sent in each direction between the source and destination. Data represented by the aggregation attributes may be included in the aggregated HTTP event by summing, averaging, and/or calculating a summary statistic from the number of bytes and packets sent in each direction between the source and destination. Aggregation of event data is described in further detail below with respect to FIG. 11C.

Figure 10:
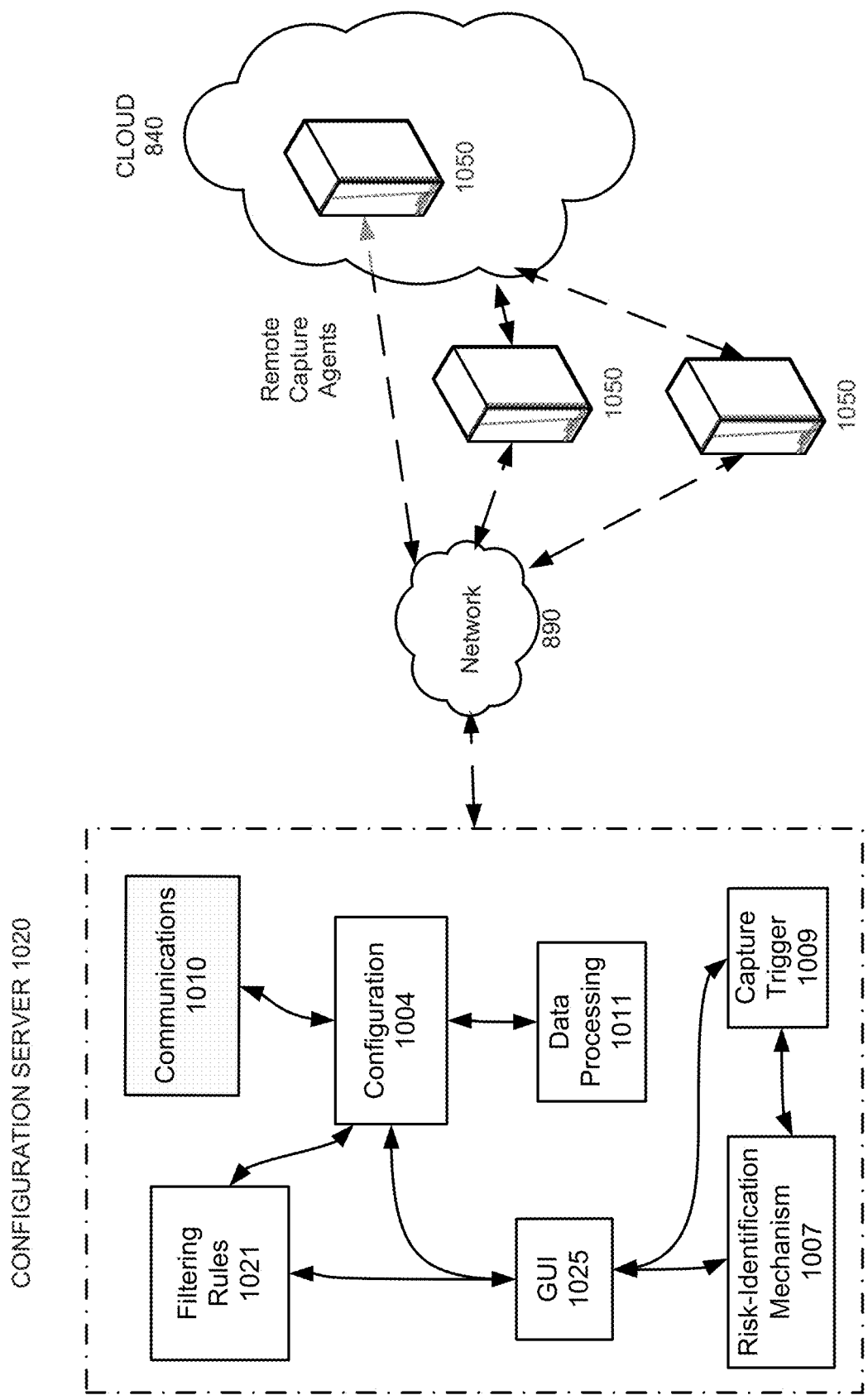
FIG. 10 shows a configuration server in accordance with the disclosed embodiments.

FIG. 10 shows a configuration server 1020 in accordance with the disclosed embodiments. As shown in the illustrated embodiment, configuration server 1020 is in communication with multiple remote capture agents 1050 over network 890, and remote capture agents 1050 are distributed throughout network 890 and cloud 840. Configuration server 1020 includes a communications component 1010 that receives events from remote capture agents 1050 over network 890 and/or from cloud 840. Communications component 1010 may also communicate with one or more data storage servers, such as data storage servers 835 of FIG. 8.

Configuration server 1020 also includes a configuration component 1004 that stores configuration information for remote capture agents 1050. As described above, the configuration information may specify the types of events to produce, data to be included in the events, and/or transformations to be applied to the data and/or events to produce transformed events. Some or all of the transformations may be specified in a set of filtering rules 1021 that may be applied to event data at remote capture agents 1050 to determine a subset of the event data to be included in one or more event streams that are sent to configuration server 1020 and/or other components.

Configuration information from configuration component 1004 may also be used to manage an event stream lifecycle of the event streams. The event stream lifecycle may be a permanent event stream lifecycle, in which generation of events in an event stream continues after the event stream's creation until the event stream is manually disabled, deleted, or otherwise inactivated. Conversely, the event stream lifecycle may be an ephemeral event stream lifecycle, in which events in an event stream are generated on a temporary basis, and the event stream has an end time at which the event stream is terminated. For example, an ephemeral event stream may be created by a capture trigger for generating additional time-series event data from the network packets on remote capture agents 1050 based on a security risk, as described above and in the above-referenced applications.

To distinguish between permanent and ephemeral event streams, the configuration information may include a parameter that identifies each event stream as "permanent" or "ephemeral." The configuration information may also include attributes such as a start time and end time for each ephemeral event stream. Remote capture agents 1050 may begin generating time-series event data for the ephemeral event stream at the start time and terminate the ephemeral event stream at the end time.

Alternatively, the creation and termination of an ephemeral event stream may be managed by configuration component 1004 instead of remote capture agents 1050. For example, configuration component 1004 may track the start and end times of an ephemeral event stream. At the start time of the ephemeral event stream, configuration component 1004 may provide remote capture agents 1050 with configuration information for the ephemeral event stream. At the end time of the ephemeral end stream, configuration component 1004 may remove all references to the ephemeral event stream from the configuration information and transmit the configuration information to remote capture agents 1050. Because configuration component 1004 uses updates to the configuration information to create and terminate an ephemeral event stream, remote capture agents 1050 may not be required to distinguish between ephemeral event streams and permanent event streams.

Configuration information from configuration component 1004 may additionally be used to enable the generation of a set of statistics from an event stream without subsequently storing and processing the event stream by one or more components on a network. For example, the configuration information may allow an event stream to be captured in a "stats only" mode, in which an index volume (e.g., size of indexed event data), incoming traffic volume, outgoing traffic volume, and/or other statistics are generated from the event stream without subsequently indexing and/or storing the event stream. A user may use the "stats only" mode to understand and/or anticipate the volume of data that would be sent for indexing from the event stream without incurring additional costs and/or overhead associated with indexing the event stream. In turn, the "stats only" mode may allow the user to prioritize indexing of various event streams based on the index volumes of the event streams and/or a daily index volume limit associated with indexing the event streams.

The configuration information may also be used to selectively index some or all of an event stream based on a storage limit (e.g., index volume limit) associated with the capture of time-series event data by remote capture agents 1050 and/or the statistics generated from an enabled event stream or a "stats only" event stream. For example, the configuration information may specify the indexing of a portion of the event stream, up to the daily index volume limit associated with a license for indexing event streams captured by remote capture agents 1050. In another example, the configuration information may specify indexing of the event stream based on a historical trend associated with the set of statistics generated from the event stream. In a third example, the configuration information may specify indexing of a sample and/or the entirety of the event stream during high traffic volume, low traffic volume, a notable event, and/or a capture trigger. In a fourth example, the configuration information may include one or more user settings for indexing some or all of the event stream, as described in further detail below.

Configuration server 1020 may also include a data processing component 1011 that performs additional processing of the event streams based on configuration information from configuration component 1004. As discussed in the above example with respect to FIGS. 9A-9B, event data may be transformed at a remote capture agent (e.g., remote capture agent 950) during resolution of the user's IP address into the name of the user's laptop. The transformed event data may be sent to configuration server 1020 and/or a transformation server for additional processing and/or transformation, such as taking the host name from the transformed event data, using an additional LUT to obtain a user identifier (user ID) of the person to which the laptop is registered, and further transforming the event data by including the user ID in the event data before forwarding the event data to a third server (e.g., a transformation server) for another round of processing.

In one or more embodiments, configuration server 1020 and remote capture agents 1050 include functionality to improve the management of event streams generated from captured network data, including event streams associated with various protocols, applications, and event stream lifecycles. As shown in FIG. 10, configuration server 1020 may provide a GUI 1025 that can be used to configure or reconfigure the information contained in configuration component 1004. The configuration information from configuration component 1004 may then be propagated to remote capture agents 1050 and used by remote capture agents 1050 to generate time-series event data from network packets captured by remote capture agents 1050.

GUI 1025 may include a number of features and/or mechanisms for facilitating the management of multiple event streams. First, GUI 1025 may group the event streams by one or more event stream attributes associated with the event streams. For example, GUI 1025 may allow a user to specify an event stream attribute such as a category of an event stream, a protocol used by network packets from which the event stream is generated, an application used to create the event stream, and/or an event stream lifecycle of the event stream. GUI 1025 may display event stream information for one or more subsets of the event streams represented by the grouping of the event streams by the specified event stream attribute. GUI 1025 may also group the event stream information by multiple event stream attributes. For example, GUI 1025 may group the event stream information by a first event stream attribute such as application, category, or protocol. GUI 1025 may then apply a second grouping of the event stream information by permanent or ephemeral event stream lifecycles. As a result, a user may view permanent event streams associated with a given category, application, or protocol separately from ephemeral event streams associated with the category, application or protocol. Grouping and managing event streams is described in further detail below with respect to FIGS. 17A-17C.

Second, GUI 1025 may display, along with the grouped event stream information, graphs of metrics associated with time-series event data in the event streams. For example, GUI 1025 may include a sparkline of network traffic over time for each event stream under a given grouping of event streams. GUI 1025 may also show a sparkline of aggregate network traffic and/or another aggregated metric for all event streams listed under the grouping. In-line visualizations of metrics related to event streams and/or captured network data is described in further detail below with respect to FIGS. 17A-17B.

Third, GUI 1025 may enable the management of ephemeral event streams. For example, GUI 1025 may allow a user to create a new ephemeral event stream, disable an existing event stream, delete an existing event stream, and/or modify an end time for terminating an existing event stream. Managing ephemeral event streams generated from captured network data is described in further detail below with respect to FIG. 17C.

Fourth, GUI 1025 may provide bidirectional linking of ephemeral event streams to creators of the ephemeral event streams. For example, GUI 1025 may include a hyperlink from event stream information for an ephemeral event stream to creation information for a creator of the ephemeral event stream, such as an application and/or capture trigger used to create the ephemeral event stream. GUI 1025 may also include another hyperlink from the creation information to the event stream information to facilitate understanding and analysis related to the context under which the ephemeral event stream was generated. Bidirectional linking of ephemeral event streams to creators of the ephemeral event streams is described in further detail below with respect to FIGS. 17C-17D.

Fifth, configuration server 1020 may provide a risk-identification mechanism 1007 for identifying a security risk from time-series event data generated by remote capture agents 1050, as well as a capture trigger 1009 for generating additional time-series event data based on the security risk. For example, risk-identification mechanism 1007 may allow a user to view and/or search for events that may represent security risks through GUI 1025. Risk-identification mechanism 1007 and/or GUI 1025 may also allow the user to set and/or activate capture trigger 1009 based on the events shown and/or found through risk-identification mechanism 1007 and/or GUI 1025.

In particular, risk-identification mechanism 1007 and/or GUI 1025 may allow the user to manually activate capture trigger 1009 after discovering a potential security risk. In turn, the activated capture trigger 1009 may modify configuration information in configuration component 1004 that is propagated to remote capture agents 1050 to trigger the capture of additional network data by remote capture agents 1050.

Alternatively, risk-identification mechanism 1007 may allow the user to create a search and/or recurring search for time-series event data that may match a security risk. If the search and/or recurring search finds time-series event data that matches the security risk, capture trigger 1009 may automatically be activated to enable the generation of additional time-series event data, such as event data containing one or more attributes associated with one or more protocols that facilitate analysis of the security risk. Such automatic activation of capture trigger 1009 may allow the additional event data to be generated immediately after a notable event is detected, thus averting the loss of captured network data that results from enabling additional network data capture only after a potential security risk is manually identified (e.g., by an analyst). Triggering the generation of additional time-series event data from network packets on remote agents based on potential security risks is described in further detail below with respect to FIGS. 12A-12B.

Sixth, GUI 1025 may be used to enable the generation of a set of statistics from an event stream without subsequently storing and processing the event stream. For example, GUI 1025 provide an option for enabling the "stats only" mode described above, which allows statistics associated with traffic volume to be generated from a given event stream without subsequently indexing and/or storing the event stream. After the statistics are generated, GUI 1025 may display the statistics to allow a user to decide whether to index the event stream or not without exceeding a storage limit (e.g., daily index volume limit) associated with the customer's license, such as a SPLUNK® license.

GUI 1025 may also allow the user to adjust the amount of the event stream to index based on the statistics and/or the storage limit. For example, GUI 1025 may provide a slider and/or other user-interface element for adjusting the amount (e.g., percentage) of the event stream to index. GUI 1025 may also provide a suggestion for setting the amount of storage of the event stream based on the set of statistics and the storage limit, a price associated with storing the event stream above the storage limit, an unused remainder of the storage limit, and/or other information that may facilitate intelligent selective indexing of the event stream. GUI 1025 may further include options for indexing some or all of the event stream during low traffic volume, high traffic volume, and/or other types of traffic or exceptional events in the event stream. Managing the generation of statistics from event streams and/or the selective indexing of the event streams is described in further detail below with respect to FIGS. 23A-23C.

Seventh, GUI 1025 may display one or more graphs containing one or more values from the statistics generated above, as well as a value of a statistic from the set of statistics based on the position of a cursor over the graph(s) and/or a legend associated with the graph(s). For example, GUI 1025 may include a "stream stats" dashboard that contains a table of statistics for enabled, "stats only," and/or selectively indexed event streams. Within the same screen, GUI 1025 may include a bar chart of an aggregate index volume of the event streams over time, with segments in the bar chart representing the individual index volumes of the event streams over a time interval. The bar chart may be updated with a value of an event stream's index volume based on the position of the cursor over the bar chart. A portion of the bar chart may also be highlighted based on the position of the cursor over the legend of the bar chart. GUI 1025 may also include a pie chart of the index volume across the event streams. The pie chart may be updated with one or more values of an index volume of an event stream based on the position of the cursor over the pie chart. Visualizations of statistics associated with captured network data is described in further detail below with respect to FIGS. 24A-24E.

FIG. 11A shows an exemplary screenshot in accordance with the disclosed embodiments. More specifically, FIG. 11A shows a screenshot of a GUI, such as GUI 1025 of FIG. 10. As described above, the GUI may be used to obtain configuration information that is used to configure the generation of event streams containing time-series event data at one or more remote capture agents distributed across a network.

As shown in FIG. 11A, the GUI includes a table with a set of columns 1102-1108 containing high-level information related to event streams that may be created using the configuration information. Each row of the table may represent an event stream, and rows of the table may be sorted by column 1102.

Column 1102 shows an alphabetized or otherwise ordered or unordered list of names of the event streams, and column 1104 provides descriptions of the event streams. For example, columns 1102-1104 may include names and descriptions of event streams generated from HTTP, Dynamic Host Configuration Protocol (DHCP), DNS, FTP, email protocols, database protocols, NFS, Secure Message Block (SMB), security protocols, Session Initiation Protocol (SIP), TCP, and/or UDP network traffic. Columns 1102-1104 may thus indicate that event streams may be generated based on transport layer protocols, session layer protocols, presentation layer protocols, and/or application layer protocols.

A user may select a name of an event stream under column 1102 to access and/or update configuration information for configuring the generation of the event stream. For example, the user may select "DemoHTTP" in column 1102 to navigate to a screen of the GUI that allows the user to specify event attributes, filters, and/or aggregation information related to creating the "DemoHTTP" event stream, as discussed in further detail below with respect to FIGS. 11B-11E.

Column 1106 specifies whether each event stream is enabled or disabled. For example, column 1106 may indicate that the "AggregateHTTP," "DemoHTTP," "dns," "ftp," "mysql-query," "sip," "tcp," and "udp" event streams are enabled. If an event stream is enabled, time-series event data may be included in the event stream based on the configuration information for the event stream.

Column 1108 specifies whether each event stream is cloned from an existing event stream. For example, column 1108 may indicate that the "AggregateHTTP" and "DemoHTTP" event streams have been cloned (e.g., copied) from other event streams, while the remaining event streams may be predefined with default event attributes.

The GUI also includes a user-interface element 1110 (e.g., "Clone Stream"). A user may select user-interface element 1110 to create a new event stream as a copy of an event stream listed in the GUI. After user-interface element 1110 is selected, an overlay may be displayed that allows the user to specify a name for the new event stream, a description of the new event stream, and an existing event stream from which the new event stream is to be cloned. The new event stream may then be created with the same event attributes and/or configuration options as the existing event stream, and the user may use the GUI to customize the new event stream as a variant of the existing event stream (e.g., by adding or removing event attributes, filters, and/or aggregation information).

FIG. 11B shows an exemplary screenshot in accordance with the disclosed embodiments. More specifically, FIG. 11B shows a screenshot of the GUI of FIG. 11A after the user has selected "DemoHTTP" from column 1102. In response to the selection, the GUI displays configuration information and/or configuration options for the "DemoHTTP" event stream.

Like the GUI of FIG. 11A, the GUI of FIG. 11B may include a table. Each row in the table may represent an event attribute that is eligible for inclusion in the event stream. For example, an event attribute may be included in the table if the event attribute can be obtained from network packets that include the protocol of the event stream. Columns 1112-1120 of the table may allow the user to use the event attributes to generate time-series event data that is included in the event stream. First, column 1112 includes a series of checkboxes that allows the user to include individual event attributes in the event stream or exclude the event attributes from the event stream. If a checkbox is checked, the corresponding event attribute is added to the event stream, and the row representing the event attribute is shown with other included event attributes in an alphabetized list at the top of the table. If a checkbox is not checked, the corresponding event attribute is omitted from the event stream, and the row representing the event attribute is shown with other excluded event attributes in an alphabetized list following the list of included event attributes. Those skilled in the art will appreciate that the GUI may utilize other sortings and/or rankings of event attributes in columns 1112-1120.

Columns 1114-1118 may provide information related to the event attributes. Column 1114 may show the names of the event attributes, column 1116 may provide a description of each event attribute, and column 1118 may provide a term representing the event attribute. In other words, columns 1114-1118 may allow the user to identify the event attributes and decide whether the event attributes should be included in the event stream.

Column 1120 may include a series of links labeled "Add." The user may select one of the links to access a portion of the GUI that allows the user to set a filter for the corresponding event attribute. The filter may then be used in the generation of the event stream from network data. Creation of filters for generating event streams from network packets is described in further detail below with respect to FIGS. 11D-11E.

The GUI of FIG. 11B also includes information 1122 related to the event stream. For example, information 1122 may include the name (e.g., "DemoHTTP") of the event stream, the protocol classification and/or type (e.g., "http.event") of the event stream, and the number of filters (e.g., "0 filters configured") set for the event stream. Information 1122 may also include a checkbox 1136 that identifies if the event stream contains aggregated event data. If checkbox 1136 is checked, the GUI may be updated with options associated with configuring the generation of an aggregated event stream, as described below with respect to FIG. 11C.

Finally, the GUI of FIG. 11B includes a set of user-interface elements 1124-1134 for managing the event stream. First, the user may select user-interface element 1124 (e.g., "Enabled") to enable generation of the event stream from network data and user-interface element 1126 (e.g., "Disabled") to disable the generation of the event stream from the network data.

Next, the user may select user-interface element 1128 (e.g., "Clone") to clone the event stream and user-interface element 1130 (e.g., "Delete") to delete the event stream. If the user selects user-interface element 1128, the GUI may obtain a name and description for the cloned event stream from the user. Next, the GUI may copy the content of columns 1112-1120, including configuration options (e.g., checkboxes in column 1112 and filters added using links in column 1120) that have been changed but not yet saved by the user, to a new screen for configuring the generation of the cloned event stream.

If the user selects user-interface element 1130, the GUI may remove the event stream from the table in FIG. 11A. In turn, a representation of the event stream may be removed from the configuration information to stop the generation of time-series event data in the event stream by one or more remote capture agents.

The user may select user-interface element 1132 (e.g., "Cancel") to discharge changes to the configuration information made in the current screen of the GUI. Conversely, the user may select user-interface 1134 (e.g., "Save") to propagate the changes to the configuration information, and in turn, update the generation of event data from network packets captured by the remote capture agents based on the changes.

FIG. 11C shows an exemplary screenshot in accordance with the disclosed embodiments. In particular, FIG. 11C shows a screenshot of the GUI of FIG. 11B after checkbox 1136 has been checked. Because checkbox 1136 is checked, the GUI includes a number of user-interface elements for configuring the generation of an aggregated event stream. The aggregated event stream may include aggregated event data, which in turn may be generated by aggregating and/or extracting event attributes from one or more network packets in a packet flow. For example, an HTTP event may be generated from one to several HTTP packets representing an HTTP request/response pair. Event attributes from multiple HTTP events may then be aggregated into a single aggregated HTTP event to reduce the amount of event data generated from the network data without losing important attributes of the event data.

As shown in FIG. 11C, a new column 1138 is added to the table. Each row in column 1138 may include a pair of user-interface elements (e.g., buttons) that allow the user to identify the corresponding event attribute as a key attribute or an aggregation attribute. One or more key attributes may be used to generate a unique key representing each aggregated event, and one or more aggregation attributes may be aggregated prior to inclusion in the aggregated event. Some event attributes (e.g., "dest_ip," "src_ip," "uri_path") may only be used as key attributes because the event attributes are not numeric in nature. On the other hand, event attributes that may be summed (e.g., "dest_port," "status," "bytes," "bytes_in," "bytes_out," "time_taken") may have numeric values.

Event attributes identified as key attributes in column 1138 may be sorted at the top of the table, followed by event attributes identified as aggregation attributes. Event attributes that are not included in the event stream (e.g., event attributes with unchecked checkboxes in column 1112) may be shown below the aggregation attributes in the table. Alternatively, event attributes may be displayed in the table according to other sortings and/or rankings.

While sums are the only type of aggregation shown in the GUI of FIG. 11C, other types of aggregation may also be used to generate aggregated event data. For example, aggregated event streams may be created using minimums, maximums, averages, standard deviations, and/or other summary statistics of event attributes.

The GUI of FIG. 11C also includes a user-interface element 1140 (e.g., a text box) for obtaining an aggregation interval over which event attributes are to be aggregated into a single aggregated event. The aggregation interval may be increased to increase the amount of aggregation in the aggregated event stream and reduced to decrease the amount of aggregation in the aggregated event stream.

For example, column 1138 may indicate that the "dest_ip," "dest_port," "src_ip," "status," and "uri_path" event attributes are specified as key attributes and the "bytes," "bytes_in," "bytes_out," and "time_taken" event attributes are specified as aggregation attributes. Similarly, an aggregation interval of 60 seconds may be obtained from user-interface element 1140. As a result, the aggregated event stream may include aggregated events generated from event data over a 60-second interval. After each 60-second interval has passed, a separate aggregated event with a unique key may be generated for each unique combination of "dest_ip," "dest_port," "src_ip," "status," and "uri_path" key attributes encountered during the interval. Values of "bytes," "bytes_in," "bytes_out," and "time_taken" for events within the interval that match the unique combination of key attributes may also be summed and/or otherwise aggregated into the aggregated event. Aggregated events generated from the configuration options may then be shown in the same GUI, as described in further detail below with respect to FIG. 11F.

Such configuration of event streams and/or aggregated event streams may allow network data to be captured at different levels of granularity and/or for different purposes. For example, an aggregated event stream may include all possible event attributes for the event stream to enable overall monitoring of network traffic. On the other hand, one or more unaggregated event streams may be created to capture specific types of network data at higher granularities than the aggregated event stream. In addition, multiple event streams may be created from the same packet flow and/or event data to provide multiple "views" of the packet flow and/or event data.

Figure 11D:
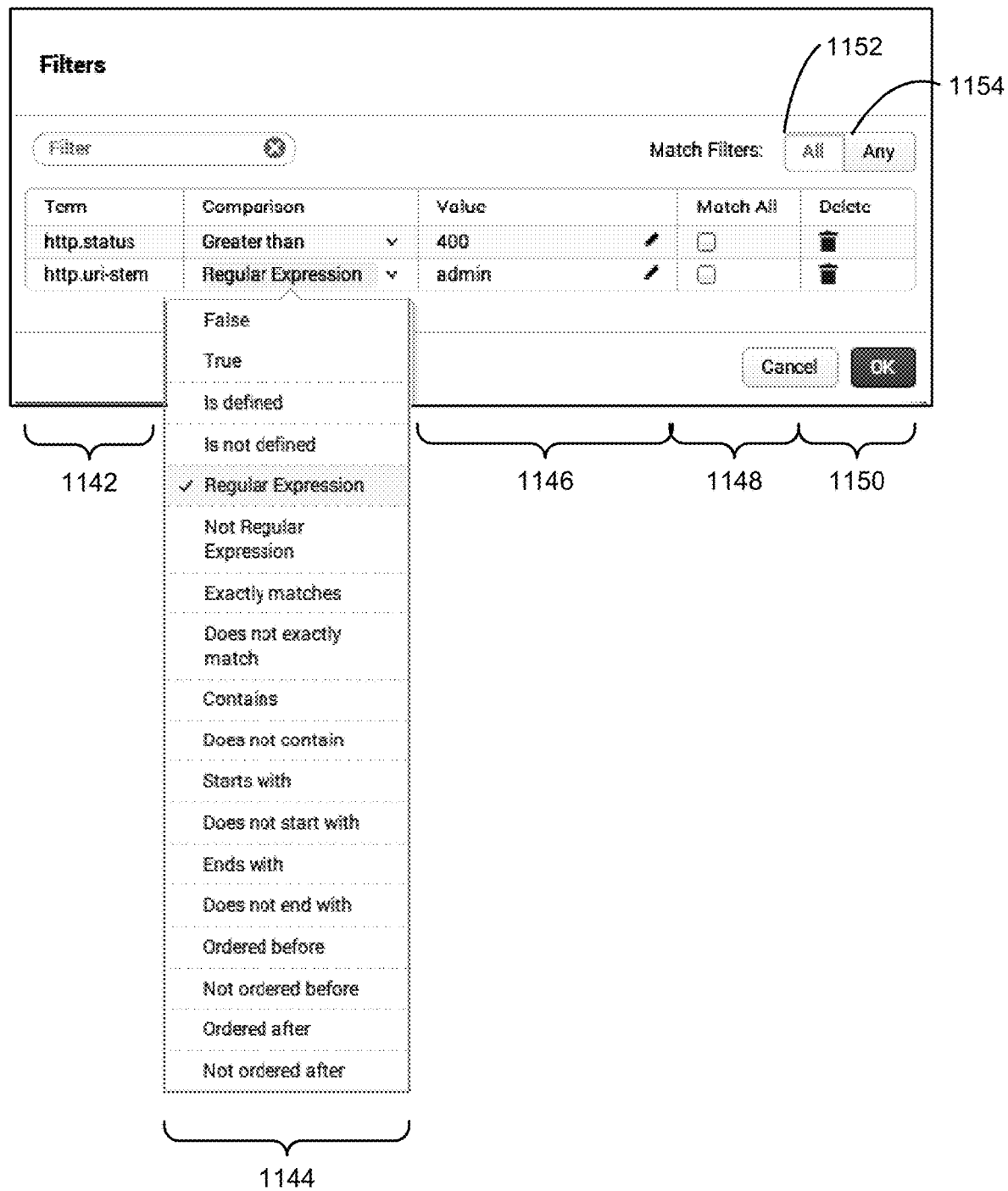
FIG. 11D shows an exemplary screenshot in accordance with the disclosed embodiments.

FIG. 11D shows an exemplary screenshot in accordance with the disclosed embodiments. More specifically, FIG. 11D shows a screenshot of the GUI of FIGS. 11B-11C after an "Add" link in column 1120 is selected. For example, the GUI of FIG. 11D may be shown as an overlay on the screens of FIGS. 11B-11C to enable the addition of filters to configuration information for the event stream(s) and/or aggregated event stream(s) shown on the screens.

As with the screenshots of FIGS. 11A-11C, the GUI of FIG. 11D includes information and/or user-interface elements organized into a table. Rows of the table may represent filters for an event stream and/or aggregated event stream, and columns 1142-1150 of the table may facilitate identification and/or configuration of the filters.

First, column 1142 may provide a list of terms representing event attributes to which the filters are to be applied. For example, column 1142 may specify an "http.status" term representing the "status" event attribute and an "http.uri-stem" term representing the "uri_path" event attribute.

Column 1144 may be used to provide a comparison associated with each filter. For example, a user may select a cell under column 1144 to access a drop-down menu of possible comparisons for the corresponding filter. As shown in FIG. 11D, the second cell of column 1144 is selected to reveal a drop-down menu of comparisons for a string-based event attribute (e.g., "uri_path"). Within the drop-down menu, "Regular Expression" is selected, while other options for the comparison may include "False," "True," "Is defined," "Is not defined," "Not Regular Expression," "Exactly matches," "Does not exactly match," "Contains," "Does not contain," "Starts with," "Does not start with," "Ends with," "Does not end with," "Ordered before," "Not ordered before," "Ordered after," and "Not ordered after." As a result, a number of comparisons may be made with string-based event attributes during filtering of network data by the string-based event attributes.

Column 1146 may allow the user to specify a value against which the comparison in column 1144 is made. Cells in column 1146 may be text-editable fields and/or other user-interface elements that accept user input. For example, the second cell of column 1146 may include a value of "admin" that is entered by the user. Consequently, the values in the second cells of columns 1144-1146 may be used to generate a filter that determines if the "uri_path" event attribute from network data matches a regular expression of "admin." If the network data matches the regular expression, the network data may be used to generate event data, which may subsequently be used to generate aggregated event data. If the network data does not match the regular expression, generation of event data from the network data may be omitted.

Column 1148 may include a set of checkboxes with a "Match All" header. The user may check a checkbox in column 1148 to require each value in a multi-value event attribute to match the filter. For example, the user may check a checkbox in column 1148 for a filter that is applied to a checksum event attribute to ensure that each of multiple checksums in a given network packet and/or event satisfies the comparison in the filter.

Column 1150 may allow the user to delete filters from the configuration information. For example, the user may select a user-interface (e.g., an icon) in a cell of column 1150 to remove the corresponding filter from the configuration information.

The GUI also includes a set of user-interface elements 1152-1154 for determining the applicability of individual filters or all filters to the network data. For example, the user may select user-interface element 1152 (e.g., "All") to apply the filters so that only data that matches all filters in the table is used to generate events. Conversely, the user may select user-interface element 1154 (e.g., "Any") to apply the filters so that data matching any of the filters in the data is used to generate events. In other words, user-interface element 1152 may be selected to apply a logical conjunction to the filters, while user-interface element 1154 may be selected to apply a logical disjunction to the filters.

Figure 11E:
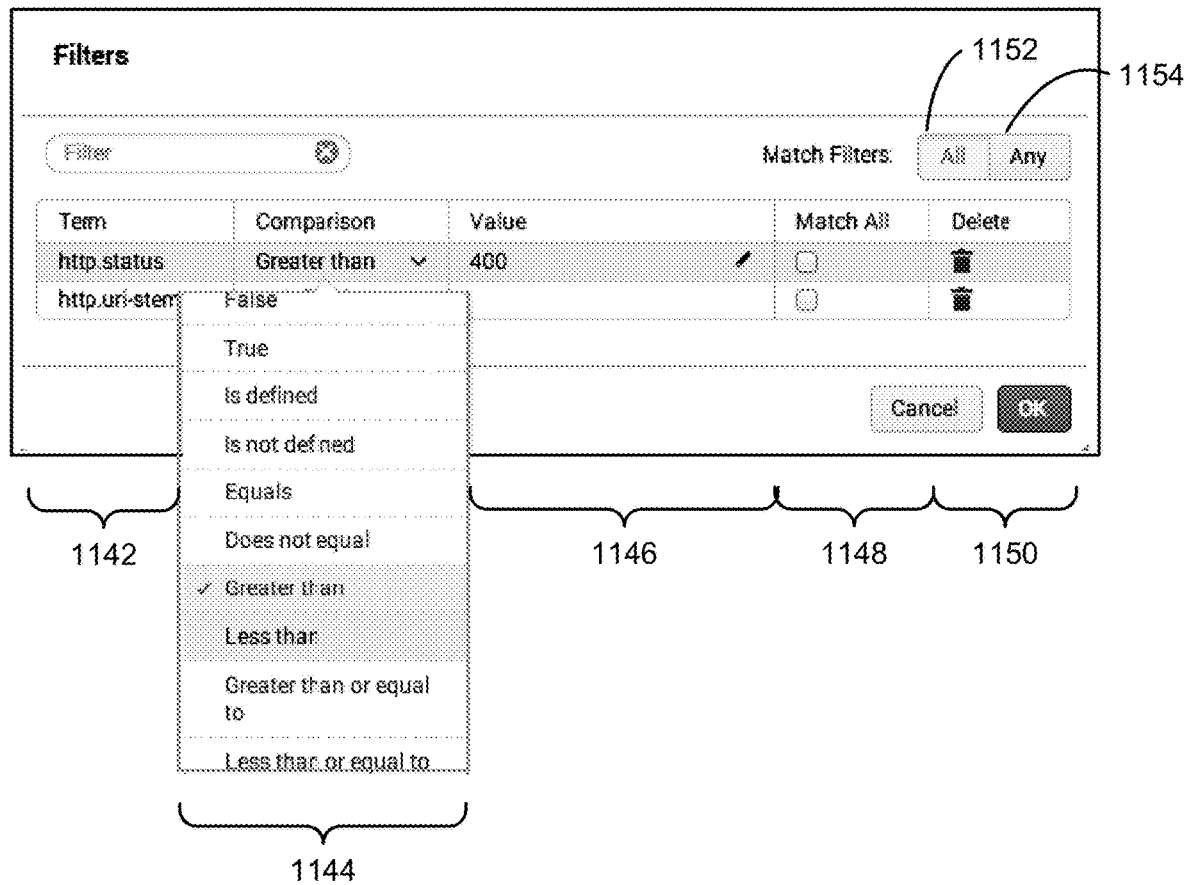
FIG. 11E shows an exemplary screenshot in accordance with the disclosed embodiments.

FIG. 11E shows an exemplary screenshot in accordance with the disclosed embodiments. As with the screenshot of FIG. 11D, FIG. 11E shows a GUI for adding and/or managing filters for generating event data at one or more remote capture components.

Within the GUI of FIG. 11E, the first cell of column 1144 is selected. In turn, a drop-down menu of possible comparisons is shown for the corresponding filter. Because the filter relates to a numeric event attribute (e.g., an HTTP status code), comparisons in column 1144 may be numeric in nature. For example, the "Greater than" comparison is selected, while other possible comparisons may include "False," "True," "Is defined," "Is not defined," "Equals,"

"Does not equal," "Less than," "Greater than or equal to," and "Less than or equal to." The differences in comparisons shown in FIG. 11E and FIG. 11D may ensure that comparisons that are meaningful and/or relevant to the types of event attributes specified in the filters are used with the filters.

FIG. 11F shows an exemplary screenshot in accordance with the disclosed embodiments. More specifically, FIG. 11F shows a screenshot of a GUI, such as GUI 1025 of FIG. 10. The GUI of FIG. 11F may provide information related to aggregated events, such as aggregated events generated using the GUI of FIG. 11C.

As shown in FIG. 11F, a first column 1156 contains a timestamp of an aggregated event, and a second column 1158 shows the aggregated event. Within column 1158, the aggregated event includes a number of event attributes. Some of the event attributes (e.g., "dest_ip," "dest_port," "src_ip," "status," "uri_path") are key attributes that are used to uniquely identify the aggregated event, and other event attributes (e.g., "dest_port," "status," "bytes," "bytes_in," "bytes_out," "time_taken") may be numerically summed before the event attributes are included in the aggregated event.

Figure 12A:
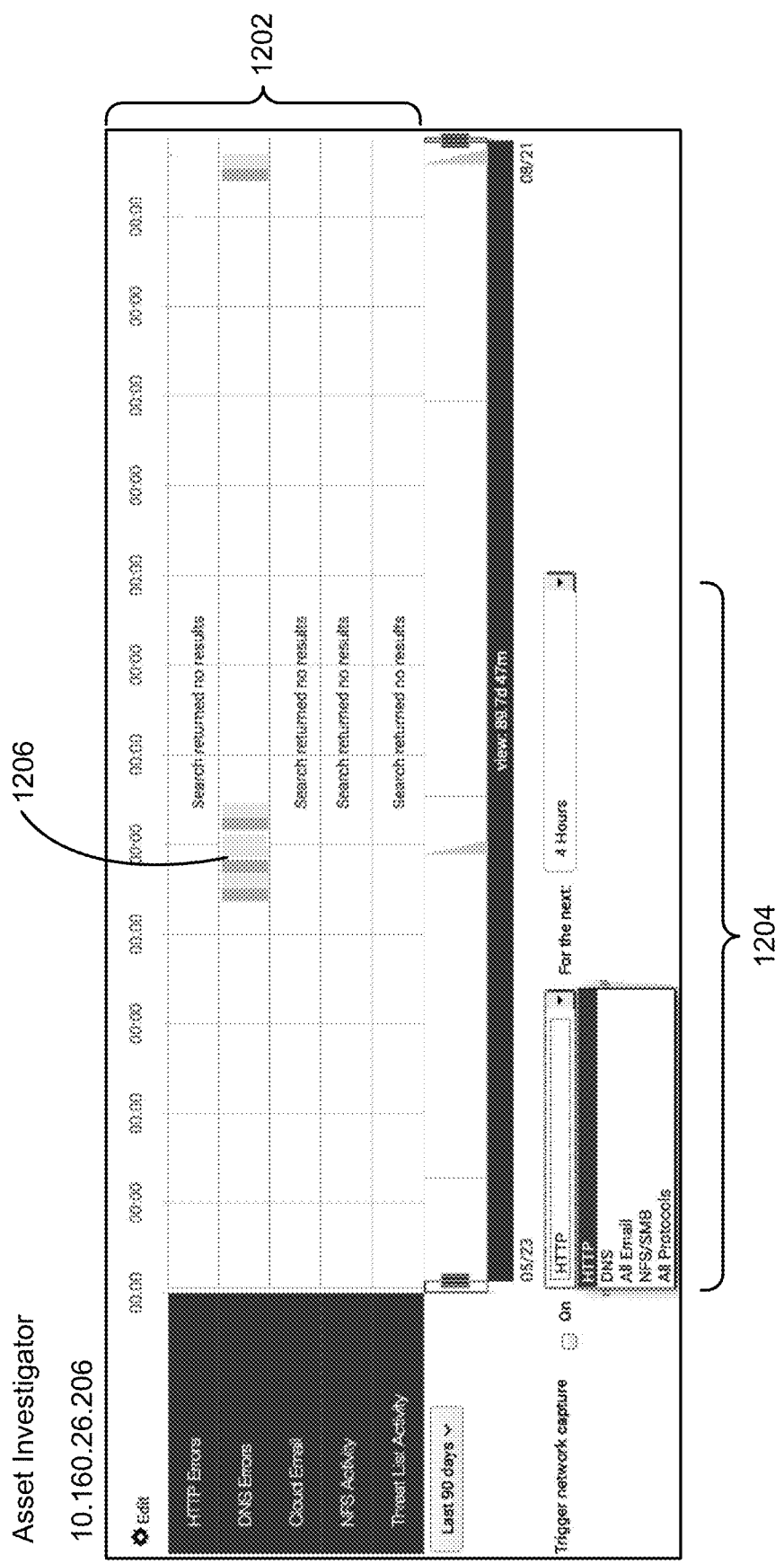
FIG. 12A shows an exemplary screenshot in accordance with the disclosed embodiments.

FIG. 12A shows an exemplary screenshot in accordance with the disclosed embodiments. More specifically, FIG. 12A shows a screenshot of a GUI, such as GUI 1025 of FIG. 10. The GUI may be used with a risk-identification mechanism and/or a capture trigger, such as risk-identification mechanism 1007 and capture trigger 1009 of FIG. 10.

The GUI of FIG. 12A may include a portion 1202 that represents the risk-identification mechanism. For example, portion 1202 may display a dashboard of time-series event data that represents security risks. The dashboard includes a number of potential security risks, such as "HTTP Errors," "DNS Errors," "Cloud Email," "NFS Activity," and "Threat List Activity." Events that match one of the listed potential security risks may be represented as bars within a time interval represented by the horizontal dimension of the dashboard. For example, a security risk 1206 may be shown as a series of bars clustered around an interval of time under "DNS Errors" in portion 1202.

On the other hand, the dashboard may lack data for other potential security risks because the data volume associated with capturing network data across all protocols and/or security risks may be too large to effectively store and/or consume. As a result, portion 1202 may indicate that no data is available (e.g., "Search returned no results") for the "HTTP Errors," "Cloud Email," "NFS Activity," and "Threat List Activity" security risks.

The GUI may also include a portion 1204 that represents a capture trigger for generating additional time-series event data based on identified security risks from portion 1202. For example, portion 1204 may include a checkbox that allows a user to activate the capture trigger upon identifying security risk 1206 in portion 1202. Portion 1204 may also include a first drop-down menu that allows the user to specify one or more protocols (e.g., "HTTP," "DNS," "All Email," "NFS/SMB," "All Protocols") of additional time-series event data to be captured with the capture trigger. Portion 1204 may additionally include a second drop-down menu that allows the user to specify a period (e.g., "4 Hours") over which the additional time-series event data is to be captured after the capture trigger is activated.

After the capture trigger is activated, configuration information on one or more remote capture agents used to generate the time-series event data may be updated to include the additional protocol(s) specified in portion 1204. For example, configuration information for configuring the generation of additional event streams from the specified protocol(s) may be propagated to the remote capture agents, and the remote capture agents may use the configuration to create the event streams from network data and/or event data at the remote capture agents. The configuration information may include default event attributes for the protocol(s) and/or event attributes that may be of interest to the security assessment of network packet flows. For example, the configuration information may specify the generation of event data related to other security risks, such as the security risks shown in the dashboard. Once the event data is generated and/or indexed, the event data may be shown in the dashboard to facilitate verification, monitoring, and/or analysis of the security risk. After the pre-specified period obtained from portion 1204 has passed, the configuration information on the remote capture agents may be updated to disable the generation of the additional event streams and reduce the volume of network data captured by the remote capture agents.

As with the user interfaces of FIGS. 11A-11E, the user may add one or more filters that are applied during the generation of the additional time-series event data. For example, the user may use the user interfaces of FIGS. 11D-11E to add a filter for network and/or event data that exactly matches the IP address (e.g., 10.160.26.206) from which the security risk was detected. As a result, the additional time-series data may be generated only from network data containing the same source IP address. The user may also use the user interfaces of FIGS. 11A-11C to customize the collection of additional time-series event data by protocol and/or event attributes.

FIG. 12B shows an exemplary screenshot in accordance with the disclosed embodiments. In particular, FIG. 12B shows a screenshot of a GUI, such as GUI 1025 of FIG. 10. Like the GUI of FIG. 12A, the GUI of FIG. 12B includes a first portion 1206 representing a risk-identification mechanism and a second portion 1208 representing a capture trigger.

Portion 1206 may allow a user to create a recurring search for time-series event data that matches a security risk. For example, portion 1206 may include user-interface elements for obtaining a domain, application context, description, search terms, time range (e.g., start and end times), and/or frequency (e.g., daily, hourly, every five minutes, etc.) for the recurring search. The user may use the user-interface elements of portion 1206 to specify a recurring search for an excessive number of failed login attempts in captured network and/or event data, which may represent brute force access behavior that constitutes a security risk.

Portion 1208 may allow the user to provide the capture trigger, which is automatically activated if the recurring search finds time-series event data that matches the security risk. As with portion 1204 of FIG. 12A, portion 1208 may allow the user to set the capture trigger, specify one or more protocols to be captured with the capture trigger, and/or a pre-specified period over which network data using the protocol(s) is to be captured.

After the user has finished defining the recurring search and capture trigger, the user may select a user-interface 1210 (e.g., "Save") to save the recurring search and capture trigger. The capture trigger may then be activated without additional input from the user once an iteration of the recurring search identifies the security risk. Conversely, the user may select a user-interface element 1212 (e.g., "Cancel") to exit the screen of FIG. 12B without creating the recurring search and/or capture trigger.

Figure 13:
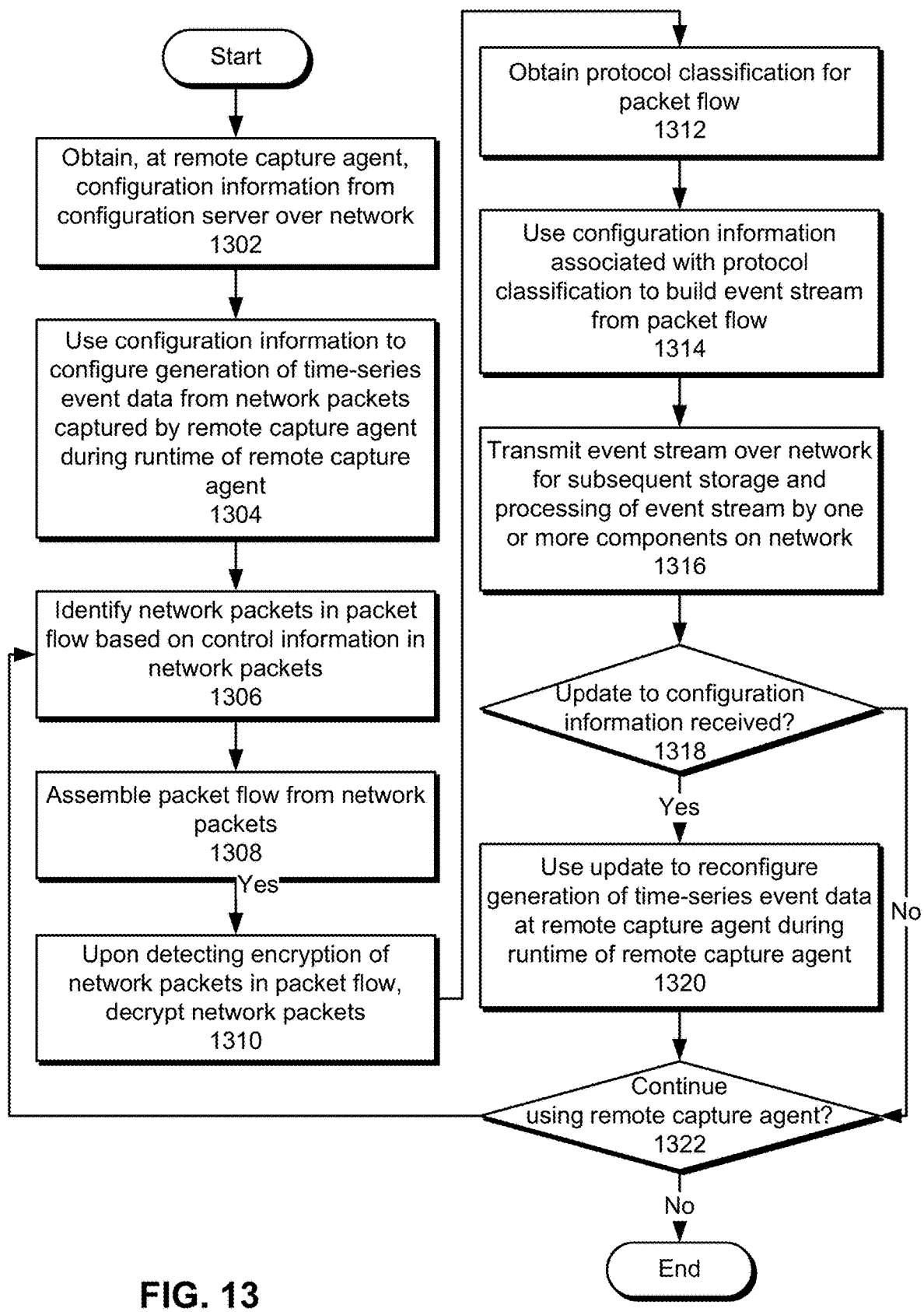
FIG. 13 shows a flowchart illustrating the processing of network data in accordance with the disclosed embodiments.

FIG. 13 shows a flowchart illustrating the processing of network data in accordance with the disclosed embodiments. In one or more embodiments, one or more of the steps may be omitted, repeated, and/or performed in a different order. Accordingly, the specific arrangement of steps shown in FIG. 13 should not be construed as limiting the scope of the embodiments.

Initially, configuration information is obtained at a remote capture agent from a configuration server over a network (operation 1302). The remote capture agent may be located on a separate network from that of the configuration server. For example, the remote capture agent may be installed on a physical and/or virtual machine on a remote network and/or cloud. As discussed above, the remote capture agent and other remote capture agents may be used to capture network data from a set of remote networks in a distributed manner.

Next, the configuration information is used to configure the generation of event data from network packets captured by the remote capture agent during the runtime of the remote capture agent (operation 1304). For example, the configuration information may be used to configure the remote capture agent to identify certain types of network packets, extract network data from the network packets, and/or include the network data in the event data.

The remote capture agent may identify network packets in a packet flow based on control information in the network packets (operation 1306). For example, network packets between a source and destination may be identified based on source and/or destination network addresses, source and/or destination ports, and/or transport layer protocols in the headers of the network packets.

The remote capture agent may also assemble the packet flow from the network packets (operation 1308) and/or decrypt the network packets upon detecting encryption of the network packets (operation 1310). For example, the remote capture agent may rearrange out-of-order TCP packets into a TCP stream. The remote capture agent may also analyze the byte signatures of the network packets' payloads to identify encryption of the network packets and use an available private key to decrypt the network packets.

After the packet flow is identified, assembled and/or decrypted, the remote capture agent may obtain a protocol classification for the packet flow (operation 1312). For example, the remote capture agent may provide network packets in the packet flow to a protocol-decoding mechanism and receive one or more protocol identifiers representing the protocols used by the network packets from the protocol-decoding mechanism.

Next, the remote capture agent may use configuration information associated with the protocol classification to build an event stream from the packet flow (operation 1314), as described in further detail below with respect to FIG. 14. The remote capture agent may then transmit the event stream over a network for subsequent storage and processing of the event stream by one or more components on the network (operation 1316). For example, the remote capture agent may transmit the event stream to one or more data storage servers, configuration servers, and/or indexers on the network.

An update to the configuration information may be received (operation 1316). For example, the remote capture agent may receive an update to the configuration information after the configuration information is modified at a configuration server. If an update to the configuration information is received, the update is used to reconfigure the generation of time-series event data at the remote capture agent during runtime of the remote capture agent (operation 1320). For example, the remote capture agent may be use the updated configuration information to generate one or more new event streams, discontinue the generation of one or more existing event streams, and/or modify the generation of one or more existing event streams.

The remote capture agent may continue to be used (operation 1322) to capture network data. If the remote capture agent is to be used, packet flows captured by the remote capture agent are identified (operation 1306), and network packets in the packet flows are assembled into the packet flows and/or decrypted (operations 1308-1310). Protocol classifications for the packet flows are also obtained and used, along with configuration information associated with the protocol classifications, to build event streams from the packet flows (operations 1312-1314). The event streams are then transmitted over the network (operation 1316), and any updates to the configuration information are used to reconfigure the operation of the remote capture agent (operations 1318-1320) during generation of the event streams. Capture of network data by the remote capture agent may continue until the remote capture agent is no longer used to generate event data from network data.

Figure 14:
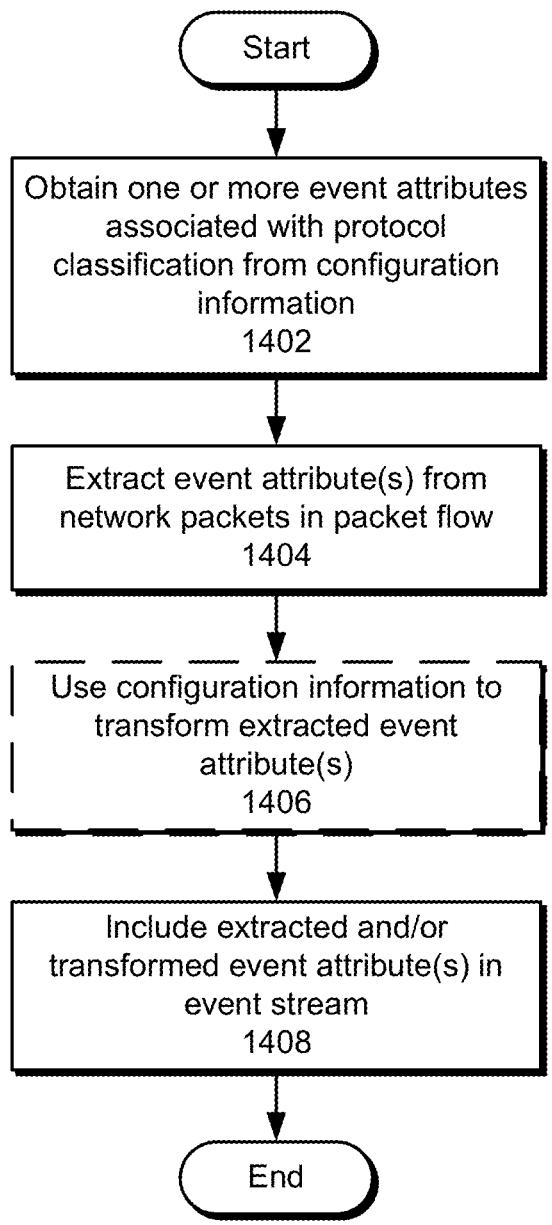
FIG. 14 shows a flowchart illustrating the process of using configuration information associated with a protocol classification to build an event stream from a packet flow in accordance with the disclosed embodiments.

FIG. 14 shows a flowchart illustrating the process of using configuration information associated with a protocol classification to build an event stream from a packet flow in accordance with the disclosed embodiments. In one or more embodiments, one or more of the steps may be omitted, repeated, and/or performed in a different order. Accordingly, the specific arrangement of steps shown in FIG. 14 should not be construed as limiting the scope of the embodiments.

First, one or more event attributes associated with the protocol classification are obtained from the configuration information (operation 1402). For example, the event attribute(s) may be obtained from a portion of the configuration information that specifies the generation of an event stream from network data matching the protocol classification.

Next, the event attribute(s) are extracted from network packets in the packet flow (operation 1404). For example, the event attribute(s) may be used to generate event data from the network packets. The configuration information may optionally be used to transform the extracted event attribute(s) (operation 1406). For example, the configuration information may be used to aggregate the event data into aggregated event data that reduces the volume of event data generated while retaining the important aspects of the event data.

Finally, the extracted and/or transformed event attributes are included in the event stream (operation 1408). For example, the event stream may be include a series of events and/or aggregated events that contain event attributes that are relevant to the protocol classification of the network packets represented by the events.

Figure 15:
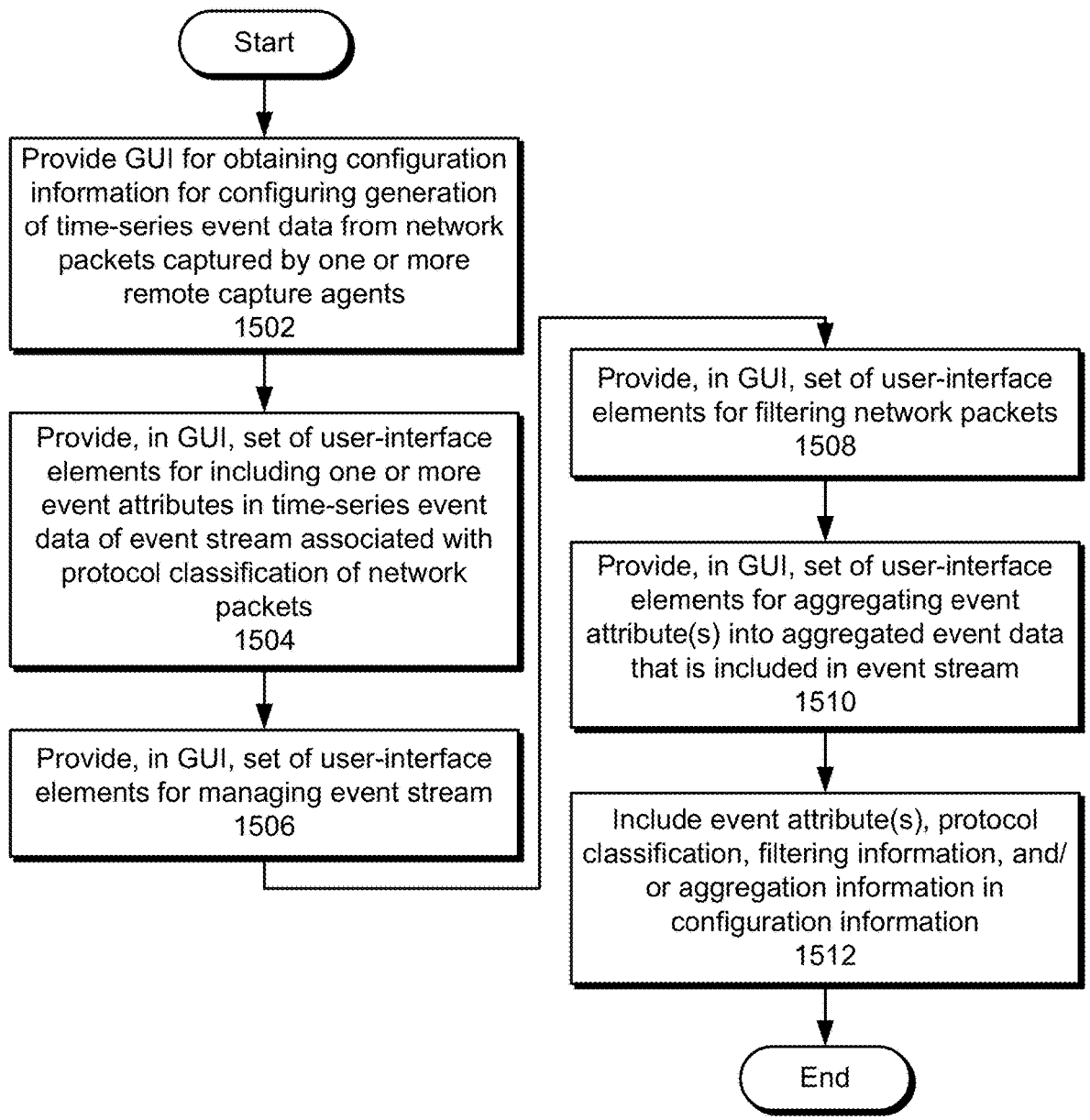
FIG. 15 shows a flowchart illustrating the process of facilitating the processing of network data in accordance with the disclosed embodiments.

FIG. 15 shows a flowchart illustrating the process of facilitating the processing of network data in accordance with the disclosed embodiments. In one or more embodiments, one or more of the steps may be omitted, repeated, and/or performed in a different order. Accordingly, the specific arrangement of steps shown in FIG. 15 should not be construed as limiting the scope of the embodiments.

First, a GUI for obtaining configuration information for configuring the generation of time-series event data from network packets captured by one or more remote agents is provided (operation 1502). The GUI may include a number of user-interface elements for streamlining the creation and/or update of the configuration information. First, the GUI may provide a set of user-interface elements for including one or more event attributes in the time-series event data of an event stream associated with a protocol classification of the network packets (operation 1504). For example, the GUI may include a set of checkboxes that enable the selection of individual event attributes for inclusion in the time-series event data.

Second, the GUI may provide a set of user-interface elements for managing the event stream (operation 1506) and/or obtaining the protocol classification for the event stream. For example, the GUI may include one or more user-interface elements for cloning the event stream from an existing event stream, which imparts the protocol classification of the existing event stream on the cloned event stream. The GUI may also include user-interface elements for deleting the event stream, enabling the event stream, and/or disabling the event stream.

Third, the GUI may provide a set of user-interface elements for filtering the network packets (operation 1508) prior to generating the time-series event data from the network packets. Each filter may identify an event attribute, a comparison to be performed on the event attribute, and/or a value to which the event attribute is to be compared. For example, the filter may match the event attribute to a Boolean value (e.g., true or false), perform a numeric comparison (e.g., equals, greater, less than, greater than or equal to, less than or equal to), and/or verify the definition of (e.g., the existence of) the event attribute in network data. The filter may also compare the event attribute to a regular expression, perform an exact match of the event attribute to the value, perform a partial match of the event attribute to the value, and/or determine the event attribute's position in an ordering.

Fourth, the GUI may provide a set of user-interface elements for aggregating the event attribute(s) into aggregated event data that is included in the event stream (operation 1510). For example, the GUI may provide user-interface elements for identifying event attributes as key attributes used to generate a key representing the aggregated event data and/or aggregation attributes to be aggregated prior to inclusion in the aggregated event data. The GUI may also include one or more user-interface elements for obtaining an aggregation interval over which the one or more event attributes are aggregated into the aggregated event data.

Finally, the event attribute(s), protocol classification, filtering information, and/or aggregation information obtained from the GUI are included in the configuration information (operation 1512). The configuration information may then be used to configure the protocol-based capture, filtering, and/or aggregation of network data at the remote capture agent(s).

Figure 16:
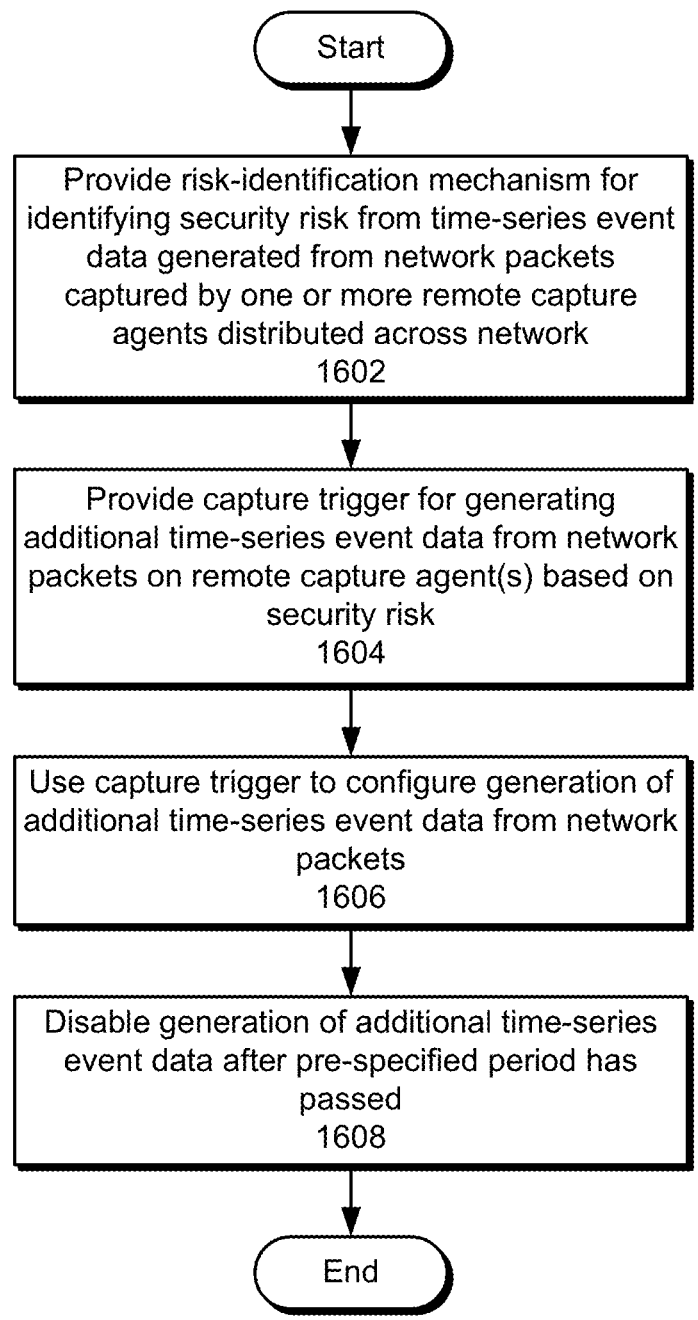
FIG. 16 shows a flowchart illustrating the process of facilitating the processing of network data in accordance with the disclosed embodiments.

FIG. 16 shows a flowchart illustrating the process of facilitating the processing of network data in accordance with the disclosed embodiments. In one or more embodiments, one or more of the steps may be omitted, repeated, and/or performed in a different order. Accordingly, the specific arrangement of steps shown in FIG. 16 should not be construed as limiting the scope of the embodiments.

Initially, a risk-identification mechanism for identifying a security risk from time-series event data generated from network packets captured by one or more remote capture agents distributed across a network is provided (operation 1602). The risk-identification mechanism may include a GUI that displays an event of interest related to the security risk. For example, the GUI may show potential security risks in a dashboard and/or other visualization of the time-series event data. Alternatively, the risk-identification mechanism may include a search and/or recurring search for a subset of the time-series event data matching the security risk. For example, the risk-identification mechanism may include a search mechanism that allows a user to search for threats, attacks, errors, and/or other notable events in the time-series event data.

Next, a capture trigger for generation additional time-series data from the network packets on the remote capture agent(s) based on the security risk is provided (operation 1604). The capture trigger may be received through one or more user-interface elements of a GUI, such as the same GUI used to provide the risk-identification mechanism. For example, the capture trigger may be activated in a portion of the GUI that is above, below, and/or next to a dashboard that displays security risks to the user. Alternatively, the capture trigger may be linked to a recurring search for time-series event data that matches a security risk. As a result, the capture trigger may automatically be activated once time-series event data matching the security risk is found.

After the capture trigger is activated, the capture trigger is used to configure the generation of the additional time-series event data from the network packets (operation 1606). For example, activation of the capture trigger may result in the updating of configuration information for the remote capture agent(s), which causes the remote capture agent(s) to generate additional event streams containing event attributes associated with protocols that facilitate analysis of the security risk.

Finally, generation of the additional time-series event data is disabled after a pre-specified period has passed (operation 1608). For example, generation of the additional time-series event data may be set to expire a number of hours or days after the capture trigger is activated. The expiry may be set by the user and/or based on a default expiration for security-based capture of additional network data from network packets.

Figure 17A:
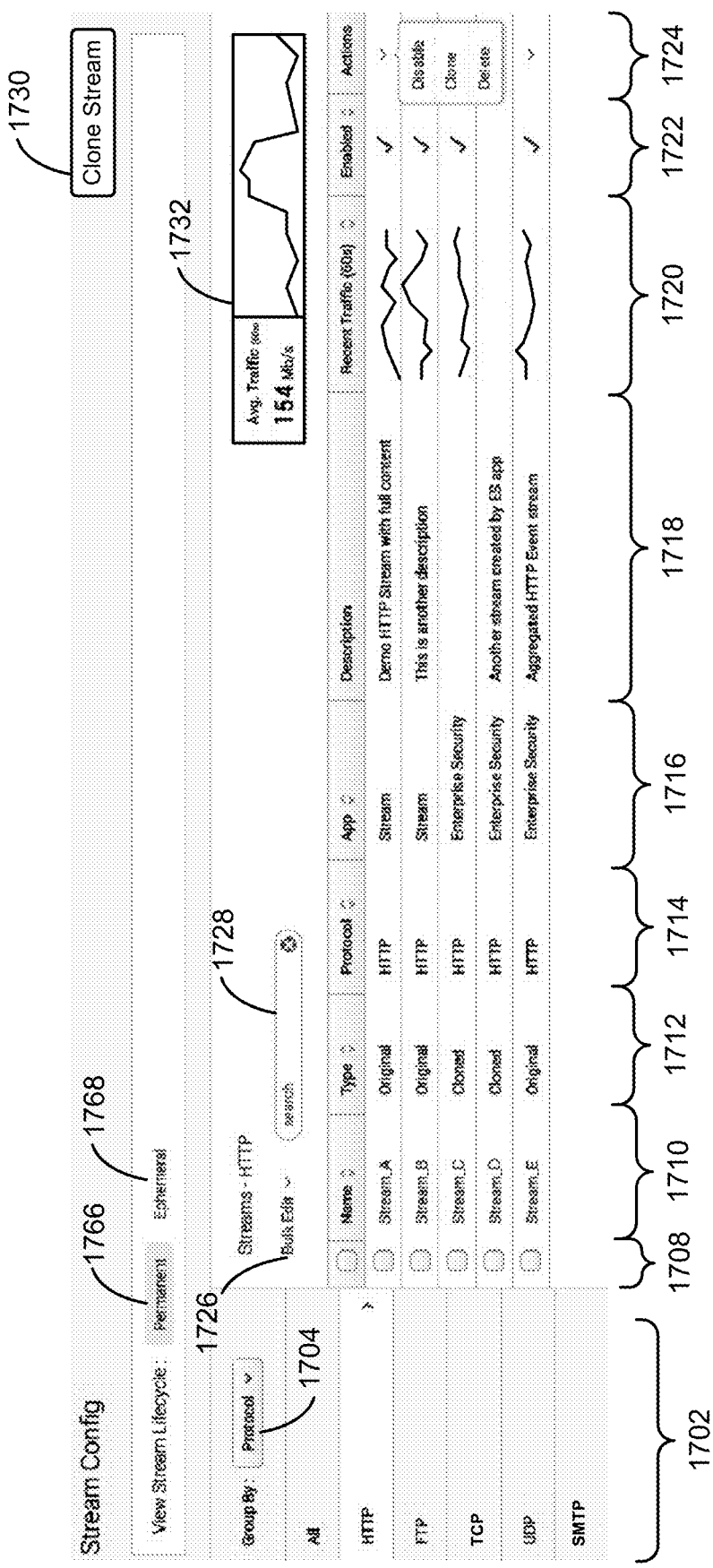
FIG. 17A shows an exemplary screenshot in accordance with the disclosed embodiments.

FIG. 17A shows an exemplary screenshot in accordance with the disclosed embodiments. More specifically, FIG. 17A shows a screenshot of a GUI, such as GUI 1025 of FIG. 10. As described above, the GUI may be used to obtain configuration information that is used to configure the generation of event streams containing time-series event data at one or more remote capture agents distributed across a network.

As shown in FIG. 17A, the GUI includes a table with a set of columns 1708-1724. Columns 1710-1718 may include high-level event stream information related to event streams that are created and/or managed using the configuration information. Each row of the table may represent an event stream, and rows of the table may be sorted by column 1710.

Column 1710 shows an alphabetized list of names of the event streams, and column 1714 may specify a protocol associated with each event stream. For example, columns 1710 and 1714 may include names and/or protocols of event streams generated from HTTP, Dynamic Host Configuration Protocol (DHCP), DNS, FTP, email protocols, database protocols, NFS, Secure Message Block (SMB), security protocols, Session Initiation Protocol (SIP), TCP, and/or UDP network traffic. In other words, the event streams may be generated based on transport layer protocols, session layer protocols, presentation layer protocols, and/or application layer protocols.

A user may select a name of an event stream under column 1710 to access and/or update configuration information for configuring the generation of the event stream. For example, the user may select "Stream_A" in column 1710 to navigate to a screen of the GUI that allows the user to specify event attributes, filters, and/or aggregation information related to creating the "Stream_A" event stream.

Column 1712 specifies a type indicating whether each event stream is cloned from an existing event stream. For example, column 1712 may indicate that the "Stream_C" and "Stream_D" streams have been cloned (e.g., copied) from other event streams, while the remaining event streams may be predefined with default event attributes.

Column 1716 shows an application associated with each event stream, and column 1718 includes a description of each event stream. For example, column 1716 may include the names of applications used to create the event streams (e.g., "Stream," "Enterprise Security," etc.), and column 1718 may include descriptions that are generated by the applications and/or users of the applications.

The table may also include a column 1722 that specifies a status indicating whether each event stream is enabled or disabled. For example, column 1722 may indicate that the "Stream_A," "Stream_B," "Stream_C," and "Stream_E" event streams are enabled. If an event stream is enabled, time-series event data may be included in the event stream based on the configuration information for the event stream. If an event stream is disabled, time-series event data may not be generated for the event stream.

Event streams in the table may further be sorted by information in other columns of the table and/or randomly. For example, the user may select the column header of a given column (e.g., columns 1708-1724) to order the displayed event stream information by the information represented by the column. Alternatively, event streams in the table may be randomly sorted and/or sorted by an attribute that is not explicitly displayed in a column of the table.

The GUI also includes a user-interface element 1730 (e.g., "Clone Stream"). A user may select user-interface element 1730 to create a new event stream as a copy of an event stream listed in the GUI. After user-interface element 1730 is selected, an overlay may be displayed that allows the user to specify a name for the new event stream, a description of the new event stream, and an existing event stream from which the new event stream is to be cloned. The new event stream may then be created with the same event attributes and/or configuration options as the existing event stream, and the GUI may navigate the user to a new screen for customizing the new event stream as a variant of the existing event stream (e.g., by adding or removing event attributes, filters, and/or aggregation information).

As mentioned above, the GUI may include functionality to group event information for the event streams by one or more event stream attributes. In particular, the GUI may provide a user-interface element 1704 for specifying an event stream attribute by which event streams are to be grouped. For example, user-interface element 1704 may be a drop-down menu that allows the user to specify grouping of the event streams by "Protocol," "Category," or "Apps" (e.g., applications). As shown in FIG. 17A, the "Protocol" event stream attribute is specified in user-interface element 1704. In response to the selection of "Protocol" in user-interface element 1704, the GUI may display a list 1702 of possible values for the "Protocol" event stream attribute. For example, list 1702 may include protocols such as HTTP, FTP, TCP, UDP, and SMTP.

The user may select a protocol name from list 1702 to view event stream information for a subset of the event streams matching the protocol (e.g., event streams containing time-series event data generated from network packets classified as using the protocol). Because "HTTP" is selected in list 1702, the table may show event stream information for event streams that match the "HTTP" protocol classification, as indicated in column 1714. The user may select another protocol name from list 1702 to view event streams associated with another protocol represented by the protocol name, or the user may select "All" in list 1702 to view all event streams, regardless of the event streams' protocol classifications.

The GUI may additionally group the event stream information by an event stream lifecycle of the event streams. In particular, the GUI may include two user-interface elements 1766-1768 for specifying an event stream lifecycle. The user may select user-interface element 1766 (e.g., "Permanent") to view event stream information for permanent event streams and user-interface element 1768 (e.g., "Ephemeral") to view event stream information for ephemeral event streams. Selection of one user-interface element 1766-1768 may result in the automatic deselection of the other user-interface element. In response to the selection of either user-interface element 1766 or user-interface element 1768, the GUI may further group event stream information shown in the table by the event stream lifecycle represented by the selected user-interface element. For example, the GUI may show only permanent event streams that match the "HTTP" protocol classification in the table of FIG. 17A because user-interface element 1766 and "HTTP" are selected.

To further facilitate analysis and/or management of the event streams, column 1720 of the table may include graphs of metrics associated with the event streams inline with event stream information for the event streams. The graphs may be generated using time-series event data for the event streams. For example, column 1720 may show, for each event stream represented by a row in the table, a sparkline of network traffic over time for the event stream. Alternatively, column 1720 may show graphs and/or sparklines of other metrics, such as a number of events and/or a number of notable events over time. As with other columns in the table, column 1720 may be updated based on user interaction with user-interface elements 1704 and 1766-1768 and list 1702. For example, the selection of one or more other groupings using user-interface elements 1704 and 1766-1768 and list 1702 may trigger the display of event stream information and graphs in the table for event streams matching the other grouping(s).

The user may click on a graph in column 1720 to navigate to a screen containing a larger version of the graph and one or more user-interface elements for changing a view of the graph. For example, after the user selects a graph in column 1720, the GUI may navigate the user to a dashboard with a more detailed version of the graph that includes a scale and/or labeled axes. The dashboard may also include scrollbars, sliders, buttons, and/or other user-interface elements that allow the user to change the scale along one or both axes, scroll across different portions of the data (e.g., different time ranges), and/or view data from multiple event streams in the same graph.

The GUI may also include a user-interface element 1732 that shows an aggregated value of the metric in the graphs of column 1720. For example, user-interface element 1732 may include a sparkline of aggregate network traffic, events, and/or notable events over time for the event streams represented by the rows of the table. The aggregate metric may be calculated as a sum, average, and/or other summary statistic.

User-interface element 1732 may also display a numeric value of the aggregate metric (e.g., "154 Mb/s") over the time spanned by the sparkline. For example, the numeric value shown to the left of the sparkline in user-interface element 1732 may represent a value of aggregate network traffic at a time represented by a given point in the sparkline. The user may position a cursor at different points along the sparkline to view different values of the aggregate network traffic represented by the points. Similarly, the user may position the cursor at different points in the graphs of column 1720 to trigger the display of numeric values of network traffic at times represented by those points.

As with graphs in column 1720, the graph in user-interface element 1732 may be generated or updated based on the event stream information shown in the table. For example, the selection of "UDP" in list 1702 may cause the GUI to display event stream information for event streams matching the "UDP" protocol classification. In turn, graphs in column 1720 and user-interface element 1732 may be updated to reflect network traffic, events, notable events, network bandwidth, total bandwidth, protocol-based bandwidth, and/or other metrics associated with the "UDP" event streams.

The graphs in column 1720 and/or user-interface element 1732 may further be updated in real-time with time-series event data as the time-series event data is received from one more remote capture agents. For example, sparklines and/or other graphical representations in column 1720 and user-interface element 1732 may shift as the time window spanned by the sparklines advances and additional time-series event data is collected within the time window.

In addition to displaying event stream information and graphs for one or more groupings of event streams, the GUI of FIG. 17A may enable management of the event streams through a column 1724 that allows the user to perform one or more actions on individual event streams. Each row of the table may include a user-interface element in column 1724 that, when selected, activates a drop-down menu of possible actions to be applied to the corresponding event stream.

Within the GUI, the user-interface element in the first row of column 1724 may be selected. As a result, a drop-down menu may be displayed below the user-interface element with a set of options, including "Disable," "Clone," and "Delete." The user may select "Disable" to disable generation of the event stream from network data. Alternatively, the "Disable" option may be replaced with an "Enable" option if the event stream (e.g., "Stream_D") is already disabled to allow the user to enable generation of the event stream from network data.

The user may select "Clone" to create a new event stream as a copy of the event stream. If "Clone" is selected, the GUI may obtain a name and description for the cloned event stream. The GUI may then copy configuration information for the event stream to a new screen for configuring the cloned event stream. As described in the above-referenced application, configuration of new and/or cloned event streams may include one or more event attributes to be included in the event stream, filtering network packets prior to generating the event stream from the network packets, and/or aggregating the event attribute(s) into aggregated event data that is included in the event stream.

The user may select "Delete" to delete the event stream. If "Delete" is selected, the GUI may remove event stream information for the event stream from the table. In turn, a representation of the event stream may be removed from the configuration information to stop the generation of time-series event data in the event stream by one or more remote capture agents.

The GUI may additionally include a user-interface element 1726 (e.g., "Bulk Edit") that allows the user to apply an action associated with managing an event stream to multiple event streams. The user may use a set of checkboxes in column 1708 to select one or more event streams to which the action is to be applied. The user may then select user-interface element 1726 to access a drop-down menu containing a set of possible actions to apply to the selected event streams. For example, the drop-down menu may include options for enabling, disabling, and deleting the selected event streams, which are similar to options in the drop-down menu of user-interface elements in column 1724.

Finally, the GUI may include a user-interface element 1728 that allows the user to search for event streams. The user may type one or more keywords into a text box provided by user-interface element 1728, and the GUI may match the keyword(s) to the names, descriptions, and/or other event stream attributes of the event streams in the table. Event stream information for event streams that do not match the keyword(s) may be removed from the table while the search is in effect. User-interface element 1728 may thus provide another mechanism by which event stream information in the table can be grouped and/or filtered. Consequently, the GUI of FIG. 17A may allow the user to create, find, and/or manage event streams across multiple applications, categories, keywords, and/or protocols that may be relevant to the user's interests or goals.

Figure 17B:
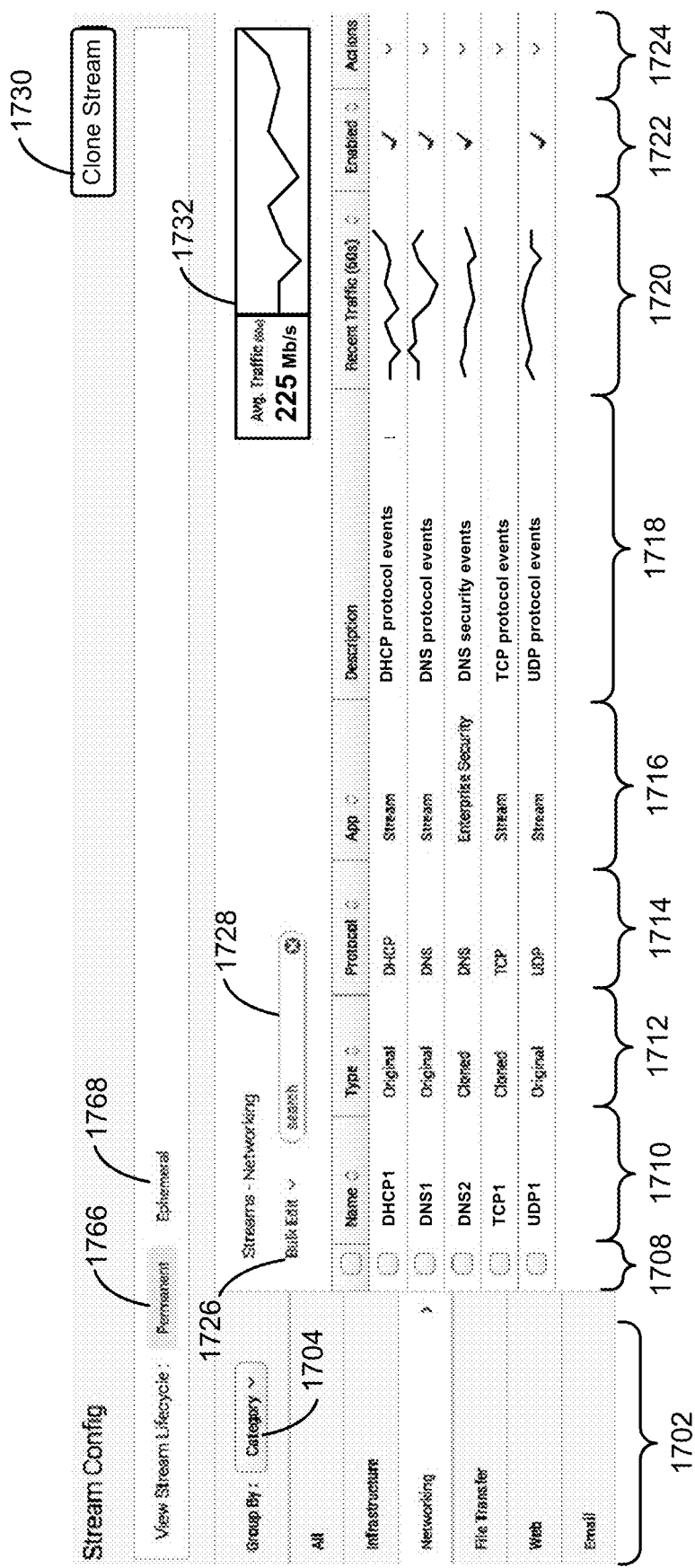
FIG. 17B shows an exemplary screenshot in accordance with the disclosed embodiments.

FIG. 17B shows an exemplary screenshot in accordance with the disclosed embodiments. More specifically, FIG. 17B shows the GUI of FIG. 17A after the event stream attribute in user-interface element 1704 is changed from "Protocol" to "Category." In response to the change, the GUI may update list 1702 with possible values for the "Category" event stream attribute. For example, list 1702 may include different technological categories of network data represented by the event streams, such as "Infrastructure," "Networking," "File Transfer," "Web," and "Email." As with the GUI of FIG. 17A, the user may select "All" in list 1702 to view all event streams, regardless of the categories to which the event streams belong.

Other categories not shown in list 1702 may include, but are not limited to, messaging, authentication, database, telephony, and/or network management. Finally, categories in list 1702 may include one or more user-created values. For example, the GUI may provide one or more user-interface elements that allow the user to specify a name of a new category, along with one or more event stream attributes of event streams to be included under the new category.

Within list 1702, "Networking" is selected. As a result, the table may include names, types, protocols, applications, descriptions, and/or other event stream information for permanent event streams in a networking category, such as event streams associated with networking protocols (e.g., DHCP, DNS, TCP, UDP). Sparklines in column 1720 and user-interface element 1732 may also be updated to reflect metrics and an aggregated metric associated with the event streams represented by the rows of the table in FIG. 17B, respectively.

Figure 17C:
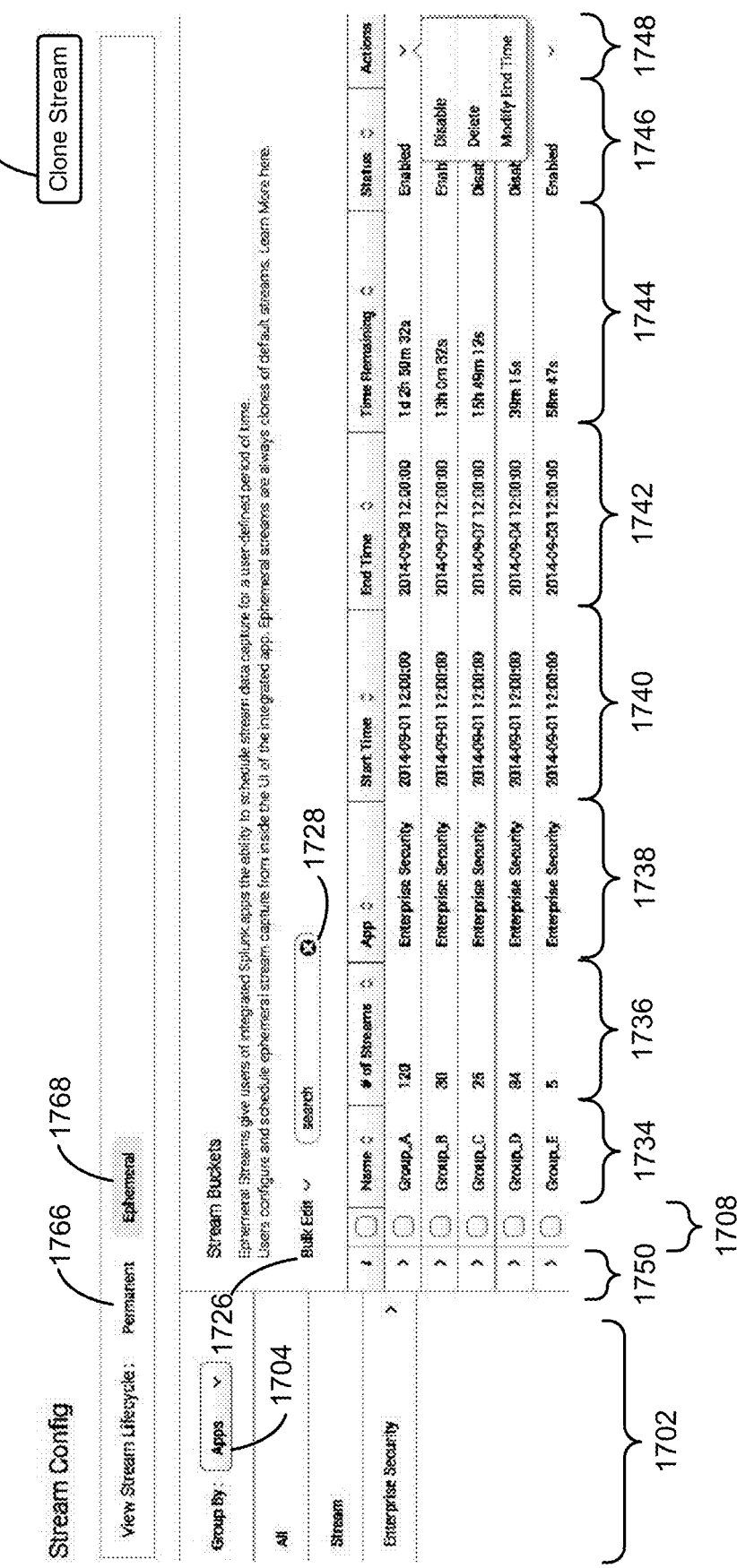
FIG. 17C shows an exemplary screenshot in accordance with the disclosed embodiments.

FIG. 17C shows an exemplary screenshot in accordance with the disclosed embodiments. More specifically, FIG. 17C shows the GUI of FIG. 17B after user-interface element 1768 has been selected and the event stream attribute in user-interface element 1704 is changed from "Category" to "Apps." In the GUI of FIG. 17C, list 1702 includes possible values for the "Apps" (e.g., applications) event stream attribute. For example, list 1702 may include names of applications (e.g., "Stream," "Enterprise Security") associated with event streams, such as applications from which the event streams were created. Within list 1702, "Enterprise Security" is selected. The user may select another application name from list 1702 to view event streams associated with another application represented by the application name, or the user may select "All" in list 1702 to view all event streams, regardless of the applications associated with the event streams.

Because user-interface element 1768 is also selected, the table includes event stream information for ephemeral event streams. In other words, the GUI may group event streams by application and event stream lifecycle so that event stream information for event streams that match both the "Enterprise Security" application name and the ephemeral event stream lifecycle is shown in the table.

The user may apply an additional grouping or filter to event stream information shown in the table by performing a search using user-interface element 1728. For example, the user may type one or more keywords into a text box provided by user-interface element 1728, and the GUI may match the keyword(s) to the names, descriptions, and/or other event stream attributes of the ephemeral event streams in the table. Event stream information for event streams that do not match the keyword(s) may be removed from the table while the search is in effect.

As shown in FIG. 17C, the table includes a different set of columns 1734-1750 from the table of FIGS. 17A-17B. Unlike columns 1710-1718 of FIGS. 17A-17B, columns 1734-1746 may include event stream information that is relevant to ephemeral event streams instead of permanent event streams. Column 1734 may show an alphabetized or otherwise ordered or unordered list of names of groups of ephemeral event streams, and column 1736 may show the number of event streams in each group. The user may select a user-interface element in a row of column 1750 to expand the table to show event stream information for ephemeral event streams in the group represented by the row. For example, the user may select the user-interface element in the first row of column 1750 to view event stream information for 120 ephemeral event streams belonging to the group named "Group_A," as discussed in further detail below with respect to FIG. 17D.

The user may also select a value in column 1734 to view time-series event data for the corresponding ephemeral event stream or group of ephemeral event streams. For example, selection of the "Group_A" value in column 1734 may cause the GUI to navigate to a screen showing events and the corresponding timestamps of the ephemeral event streams of "Group_A," graphs of metrics related to the events, and/or other information associated with the events.

Column 1738 may show the names of applications used to create the ephemeral event streams. Because "Enterprise Security" is selected in list 1702, all values in column 1738 are matched to the "Enterprise Security" application name, and event stream information for ephemeral event streams associated with other applications (e.g., "Stream") is omitted from the table.

In addition, column 1738 may allow the user to navigate from the event stream information for a given ephemeral event stream to creation information for a creator of the ephemeral event stream. For example, each application name in column 1738 may include a hyperlink to a screen of the GUI for interacting with the application represented by the application name. The screen may show user-interface elements and/or information that provides context for the creation of the ephemeral event stream. As a result, column 1738 may link the portion of the GUI used to manage the ephemeral event stream to the portion of the GUI used to create the ephemeral event stream, which is described in further detail below with respect to FIG. 17D.

Columns 1740-1744 show start times, end times, and times remaining for the ephemeral event streams, respectively. The start times may represent times at which generation of time-series event data for the corresponding ephemeral event streams was initiated. For example, each start time may be a time at which an ephemeral event stream was created by a capture trigger for generating additional time-series event data based on a security risk and/or an application that collects time-series event data from a number of sources for subsequent analysis and/or correlation.

The end times may be times at which generation of time-series event data for the corresponding ephemeral event streams is to end. For example, each end time may be a time that is a pre-specified number of minutes, hours, and/or days from the corresponding start time. The amount of time spanned between the start and end time may thus represent the duration of the ephemeral event stream, which may be selected by a capture trigger, application, and/or user interacting with the capture trigger or application. Once the end time for an ephemeral event stream is reached, the ephemeral event stream is terminated.

The times remaining for the ephemeral event streams may indicate the amount of time left in the lifetimes of the ephemeral event streams. For example, each value in column 1744 may represent a "countdown" to the end time of the corresponding ephemeral event stream shown in column 1742.

Column 1746 may provide a status indicating whether each ephemeral event stream or group of ephemeral event streams is enabled or disabled. For example, column 1746 may indicate that the "Group_A," "Group_B," and "Group_E" groups of ephemeral event streams are enabled. Such enabling or disabling of ephemeral event streams may be independent of the creation or termination of the ephemeral event streams. For example, an ephemeral event stream may be created at the start time of the ephemeral event stream by updating one or more remote capture agents with configuration information for the ephemeral event stream. Between the start and end times of the ephemeral event stream, the ephemeral event stream may be disabled to stop the generation of time-series event data for the ephemeral event stream and/or re-enabled to resume the generation of time-series event data for the ephemeral event stream. Once the end time of the ephemeral event stream is reached, the ephemeral event stream may be terminated, and a representation of the event stream may be removed from the configuration information to stop the generation of time-series event data in the event stream by the remote capture agent(s).

Like the GUIs of FIGS. 17A-17B, the GUI may provide a number of mechanisms for managing the ephemeral event streams. First, a column 1748 in the table may allow the user to perform one or more actions on individual event streams. Each row of the table may include a user-interface element in column 1748 that, when selected, activates a drop-down menu of possible actions to be applied to the corresponding event stream.

Within the GUI, the user-interface element in the first row of column 1748 may be selected. As a result, a drop-down menu may be displayed below the user-interface element with a set of options, including "Disable," "Delete," and "Modify End Time." The user may select "Disable" to disable generation of the ephemeral event stream from network data before the end time of the ephemeral event stream is reached. Alternatively, the "Disable" option may be replaced with an "Enable" option if the event stream (e.g., "Stream_D") is already disabled to allow the user to enable generation of the event stream from network data before the end time of the ephemeral event stream is reached.

The user may select "Delete" to delete the ephemeral event stream. If "Delete" is selected, the GUI may remove the ephemeral event stream from the table, even if the end time of the ephemeral event stream has not been reached. In turn, a representation of the event stream may be removed from the configuration information to stop the generation of time-series event data in the event stream by one or more remote capture agents.

The user may select "Modify End Time" to modify the end time of the ephemeral event stream shown in column 1742. If "Modify End Time" is selected, the GUI may display an overlay that allows the user to specify a new end time for the ephemeral event stream as a date and time and/or a number of minutes, hours, and/or days by which the existing end time should be extended or reduced.

Second, user-interface element 1726 (e.g., "Bulk Edit") may be used to apply an action associated with managing the event streams to multiple ephemeral event streams. The user may use a set of checkboxes in column 1708 to select the event streams to which the action is to be applied. The user may then select user-interface element 1726 to access a drop-down menu containing a set of possible actions to apply to the selected event streams. For example, the drop-down menu may include options for enabling, disabling, and deleting the selected event streams, which are similar to options in the drop-down menu of user-interface elements in column 1746.

Third, user-interface element 1730 may allow the user to create a new ephemeral event stream as a copy of an existing ephemeral event stream. After user-interface element 1730 is selected, an overlay may be displayed that includes user-interface elements for specifying a name for the new ephemeral event stream, a description of the new event stream, and an existing ephemeral event stream from which the new ephemeral event stream is to be cloned. The new ephemeral event stream may be created with the same event attributes and/or configuration options as the existing ephemeral event stream, including the same end time and/or duration as the existing ephemeral event stream. The GUI may then show a new screen that allows the user to customize the new ephemeral event stream as a variant of the existing ephemeral event stream.

Figure 17D:
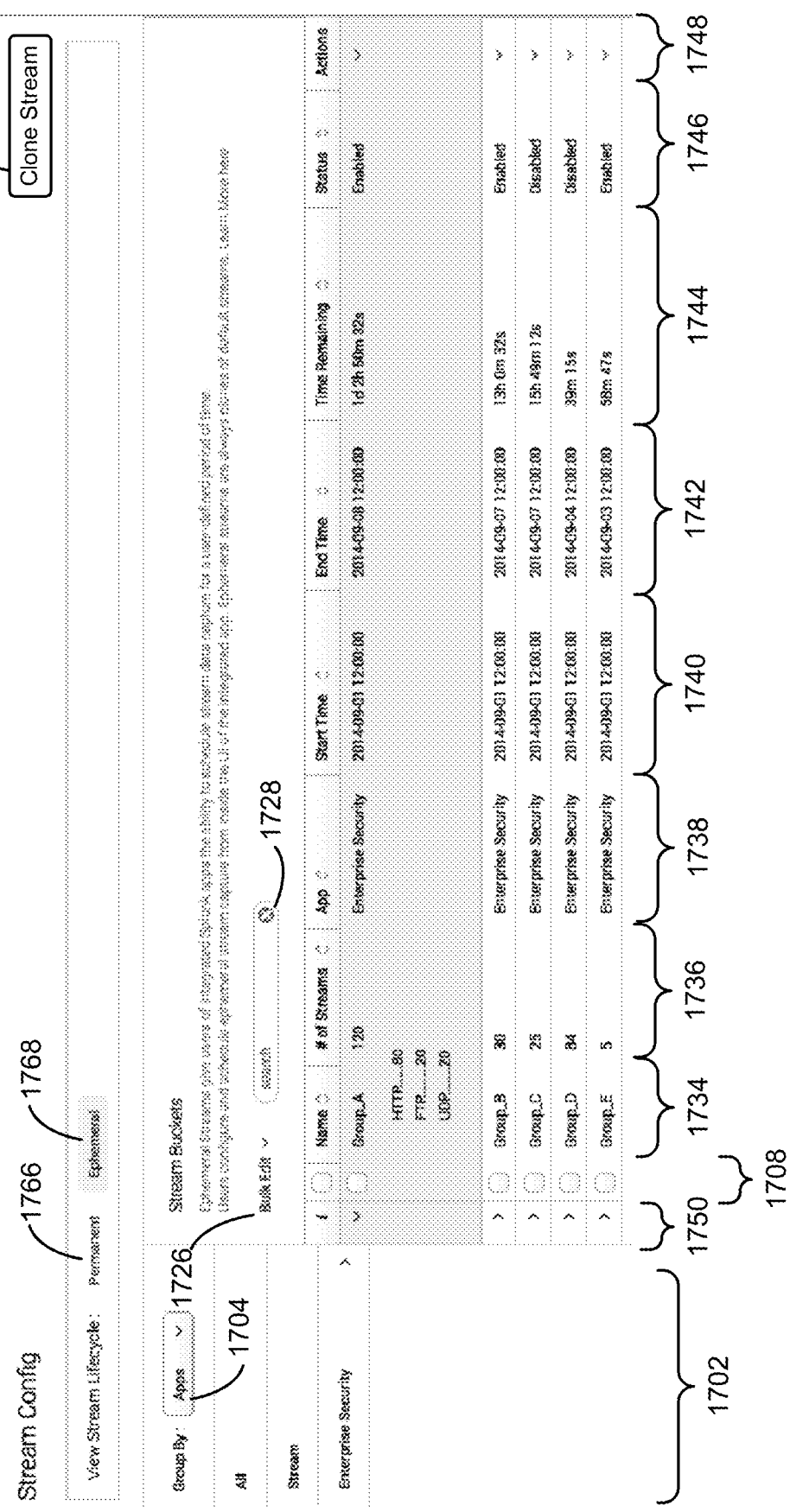
FIG. 17D shows an exemplary screenshot in accordance with the disclosed embodiments.

FIG. 17D shows an exemplary screenshot in accordance with the disclosed embodiments. More specifically, FIG. 17D shows the GUI of FIG. 17C after the user-interface element in the first row of column 1750 has been selected. In response to the selected user-interface element, the table includes additional event stream information for ephemeral event streams in the group represented by the first row in the table. As shown in FIG. 17D, the additional event stream information includes an additional grouping of ephemeral event streams in the "Group_A" group by protocol. For example, the GUI may indicate that the 120 ephemeral event streams in the group are further grouped into 80 ephemeral event streams for capturing HTTP network packets, 20 ephemeral event streams for capturing FTP network packets, and 20 ephemeral event streams for capturing UDP packets.

All ephemeral event streams in the group may be created by the same application (e.g., "Enterprise Security") and have the same start and end times. As a result, the ephemeral event streams may be created by the application for the same purpose or similar purposes. For example, the "Enterprise Security" application may create 120 ephemeral event streams for generating additional time-series event data from network packets based on a security risk.

Figure 17E:
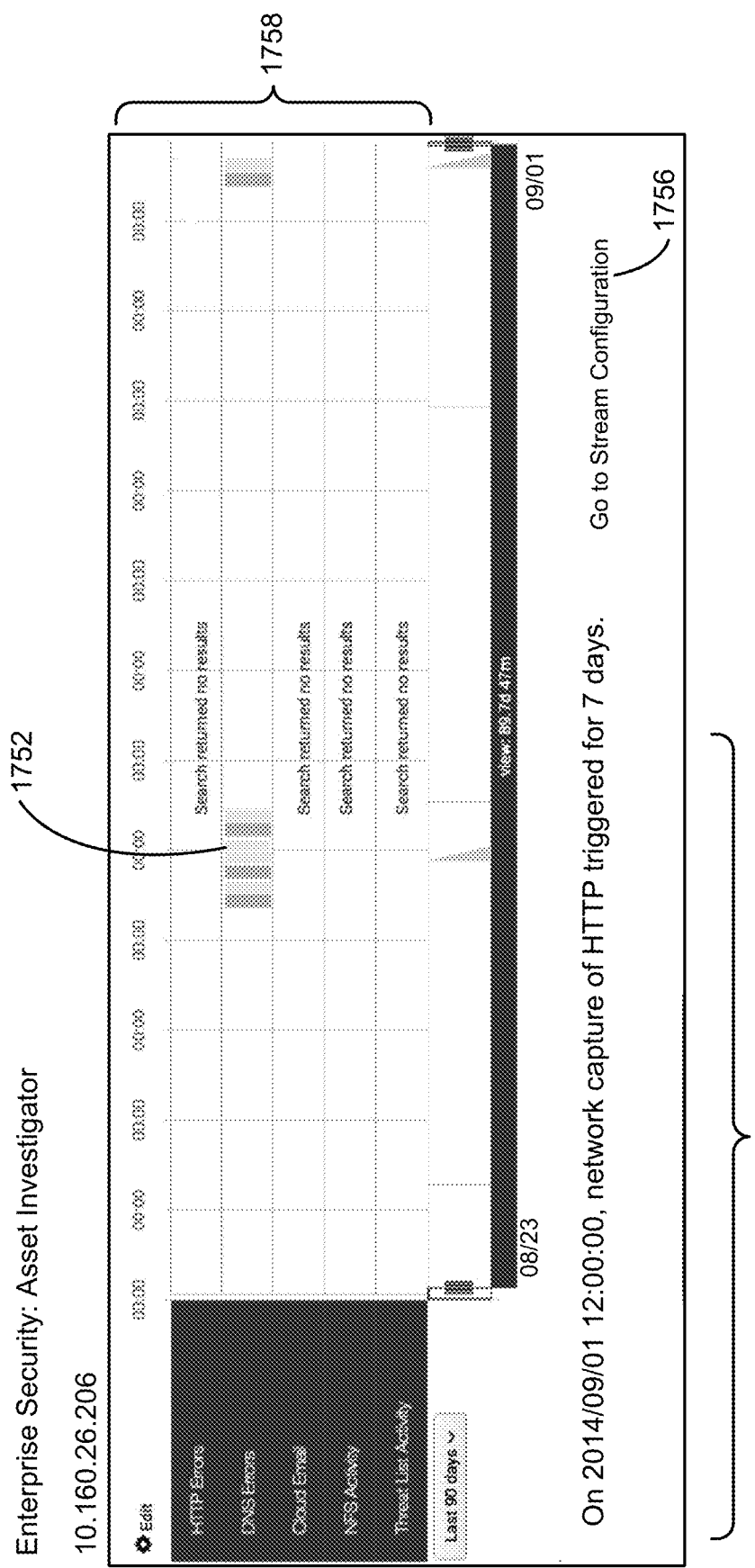
FIG. 17E shows an exemplary screenshot in accordance with the disclosed embodiments.

FIG. 17E shows an exemplary screenshot in accordance with the disclosed embodiments. In particular, FIG. 17E shows the GUI of FIG. 17C after a hyperlink (e.g., "Enterprise Security") in the second row of column 1738 has been selected. The hyperlink may navigate the user from a screen for managing the ephemeral event stream represented by the second row of the table to a screen containing creation information for a creator of the ephemeral event stream.

The GUI of FIG. 17E may show a creator name (e.g., "Enterprise Security: Asset Investigator") of the creator. For example, the name may specify an application (e.g., "Enterprise Security") and/or a feature of the application (e.g., "Asset Investigator") used to create the ephemeral event stream. The GUI may also include a portion 1758 that shows a trigger condition for creating or activating the ephemeral event stream. For example, portion 1758 may be a risk-identification mechanism that displays a dashboard of time-series event data representing security risks. The dashboard includes a number of potential security risks, such as "HTTP Errors," "DNS Errors," "Cloud Email," "NFS Activity," and "Threat List Activity." Events that match one of the listed potential security risks may be represented as bars within a time interval represented by the horizontal dimension of the dashboard. For example, a security risk 1752 may be shown as a series of bars clustered around an interval of time under "DNS Errors" in portion 1758. The presence of security risk 1752 in portion 1758 may indicate that the trigger condition for creating the ephemeral event stream includes a potential security risk 1752, as discovered using portion 1758 in the "Enterprise Security" application. To enable identification of the trigger condition, portion 1758 may replicate the timescale and data (e.g., security risk 1752) seen by the user at the time at which the ephemeral event stream was created using the "Enterprise Security" application.

Below portion 1758, the GUI may display additional creation information 1754 describing the creator of the ephemeral event stream. For example, creation information 1754 may include a start time (e.g., "2014/09/01 12:00:00"), duration (e.g., "7 days"), and/or protocol (e.g., "HTTP") associated with network data capture by the ephemeral event stream. Creation information 1754 may describe a capture trigger for generating additional time-series event data based on identified security risks from portion 1758. For example, creation information 1754 may be submitted through one or more user-interface elements shown below portion 1758 in the "Enterprise Security" application to trigger the capture of additional time-series event data in response to security risk 1752. After creation information 1754 is submitted to the GUI, the information may be used to configure the generation of the ephemeral event stream at one or more remote capture agents.

The GUI may also include a hyperlink 1756 (e.g., "Go to Stream Configuration") that navigates the user back to event stream information for the ephemeral event stream. For example, the user may select hyperlink 1756 to view the event stream information within the GUI of FIG. 17C. Hyperlinks in the GUIs of FIGS. 17C-17D may thus provide a mechanism for bidirectional navigation between the event stream information and the creation information. Such bidirectional linking may allow the user to establish the context for creating the ephemeral event stream as well as the current state of the ephemeral event stream, thus improving analysis, understanding, and management of ephemeral event streams from multiple disparate creators.

Figure 18:
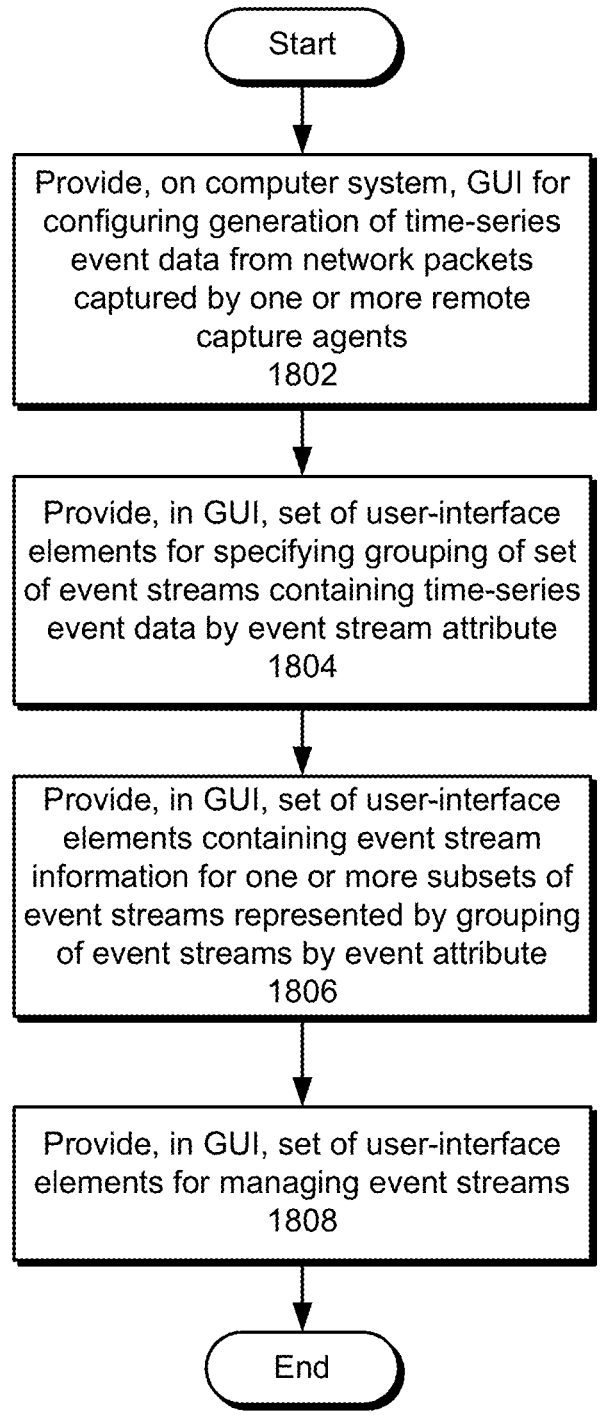
FIG. 18 shows a flowchart illustrating the process of facilitating the processing of network data in accordance with the disclosed embodiments.

FIG. 18 shows a flowchart illustrating the process of facilitating the processing of network data in accordance with the disclosed embodiments. More specifically, FIG. 18 shows a flowchart of grouping and managing event streams generated from captured network data. In one or more embodiments, one or more of the steps may be omitted, repeated, and/or performed in a different order. Accordingly, the specific arrangement of steps shown in FIG. 18 should not be construed as limiting the scope of the embodiments.

Initially, a GUI is provided on a computer system for configuring the generation of time-series event data from network packets captured by one or more remote capture agents (operation 1802). The GUI may include a number of user-interface elements for streamlining the creation, management, and/or update of the configuration information.

First, the GUI may provide a set of user-interface elements for specifying a grouping of a set of event streams containing time-series event data by an event stream attribute (operation 1804). For example, the GUI may enable grouping of the event streams by a category (e.g., web, infrastructure, networking, file transfer, email, messaging, authentication, database, telephony, network management, user-created value, etc.) and/or a protocol used by the network packets (e.g., transport layer protocol, session layer protocol, presentation layer protocol, application layer protocol). The GUI may also enable grouping of the event streams by applications used to create the event streams (e.g., based on application name) and/or event stream lifecycles of the event stream (e.g., permanent or ephemeral).

Next, the GUI may display a set of user-interface elements containing event stream information for one or more subsets of the event streams represented by the grouping of the event streams by the event stream attribute (operation 1806). Grouping of displayed event stream information by event stream attributes is described in further detail below with respect to FIG. 19.

Finally, the GUI may provide a set of user-interface elements for managing the event streams (operation 1808). For example, the GUI may be used to clone a new event stream from an existing event stream, create an event stream, delete an event stream, enable an event stream, disable an event stream, and/or modify an end time of an ephemeral event stream, as discussed above with respect to FIGS. 17A-17E.

Figure 19:
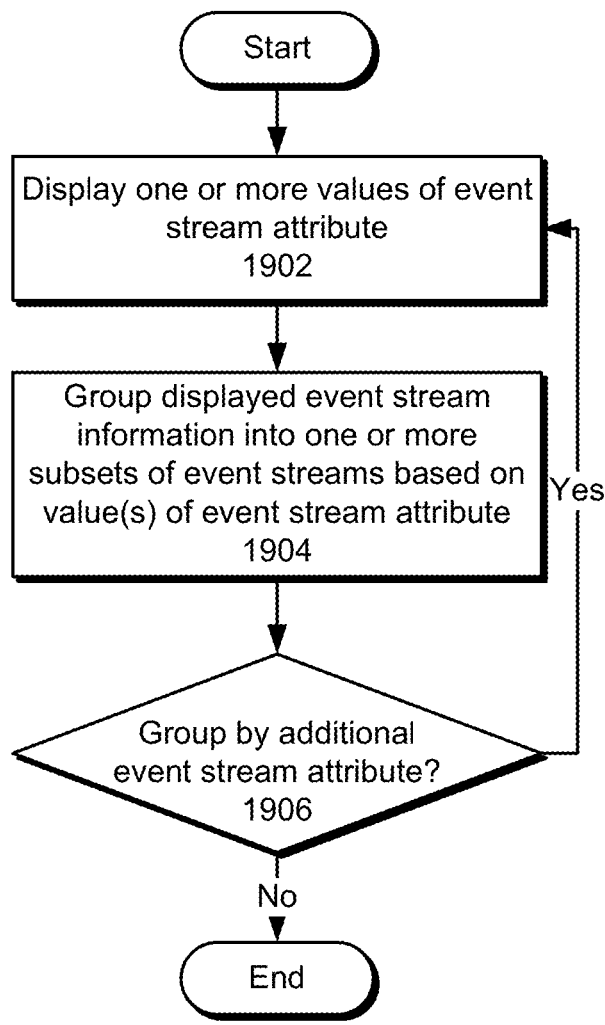
FIG. 19 shows a flowchart illustrating the process of displaying event stream information represented by a grouping of the event streams by an event stream attribute in accordance with the disclosed embodiments.

FIG. 19 shows a flowchart illustrating the process of displaying event stream information represented by a grouping of the event streams by an event stream attribute in accordance with the disclosed embodiments. In one or more embodiments, one or more of the steps may be omitted, repeated, and/or performed in a different order. Accordingly, the specific arrangement of steps shown in FIG. 19 should not be construed as limiting the scope of the embodiments.

First, one or more values of an event stream attribute are displayed (operation 1902), and displayed event stream information is grouped into one or more subsets of the event streams based on the value(s) of the event stream attribute (operation 1904). For example, a user may specify the type of event stream attribute to group by, and a GUI may display one or more categories, protocols, application names, and/or other values of the event stream attribute in a list. After a given value of the event stream attribute is selected from the list, the GUI may show event stream information matching the selected value in a table next to the list.

The event stream information may be grouped by an additional event stream attribute (operation 1906). If the event stream information is not to be grouped by an additional event stream attribute, grouping of the displayed event stream information by the first event stream attribute is maintained.

If the event stream information is to be grouped by an additional event stream attribute, one or more values of the additional event stream attribute are displayed (operation 1902), and the displayed event stream information is further grouped into one or more additional subsets of the event streams based on the value(s) of the additional event stream attribute (operation 1904). Continuing with the above example, the event stream information in the table may additionally be grouped and/or filtered by an event stream lifecycle of the event streams, which may be permanent or ephemeral. If a permanent event stream lifecycle is selected (e.g., through the GUI), event stream information for permanent event streams that match the value of the first event stream attribute (e.g., category, protocol, application) is shown. Such event stream information may include a name, a type, a protocol, an application, a description, a status, and/or a graph of a metric associated with the time-series event data of the event streams. If an ephemeral event stream lifecycle is selected, event stream information for ephemeral event streams that match the value of the first event stream attribute is shown. Such event stream information may include a name, a number of event streams, an application, a start time, an end time, a time remaining, and/or a status.

The displayed event stream information may continue to be grouped by additional event stream attributes (operation 1906) to further facilitate the creation, search, and/or management of event streams across multiple applications, categories, protocols, and/or other event stream attributes. For example, the displayed event stream information may be grouped by category, protocol, keyword, and/or event stream lifecycle to allow a user to find event streams associated with a given category, protocol, keyword, and/or event stream lifecycle. For each event stream attribute by which the event stream information is to be grouped, one or more values of the event stream attribute are displayed (operation 1902). The displayed event stream information, which may already be grouped by one or more other event stream attributes, is then further grouped or filtered into one or more subsets of the event streams based on the value(s) of the event stream attribute (operation 1904). Grouping of displayed event stream information by values of event stream attributes may continue until the displayed event stream information has been grouped by values for all relevant event stream attributes.

Figure 20:
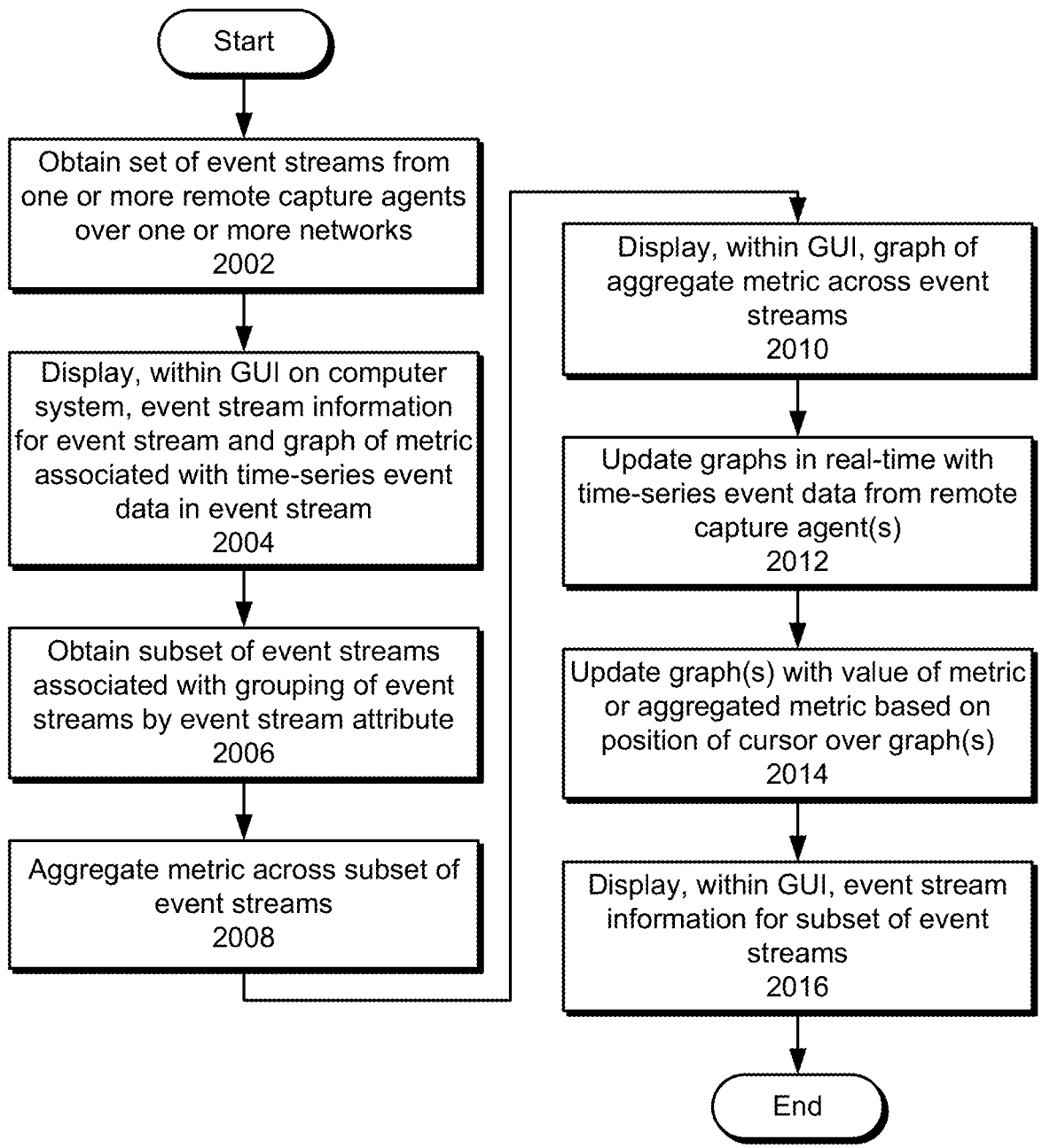
FIG. 20 presents a flowchart illustrating the process of facilitating the processing of network data in accordance with the disclosed embodiments.

FIG. 20 shows a flowchart illustrating the process of facilitating the processing of network data in accordance with the disclosed embodiments. More specifically, FIG. 20 shows a flowchart of providing inline visualizations of metrics related to captured network data. In one or more embodiments, one or more of the steps may be omitted, repeated, and/or performed in a different order. Accordingly, the specific arrangement of steps shown in FIG. 20 should not be construed as limiting the scope of the embodiments.

Initially, a set of event streams is obtained from one or more remote capture agents over one or more networks (operation 2002). The event streams may include time-series event data generated from network packets captured by the remote capture agent(s). Next, event stream information for each event stream and a graph of a metric associated with the time-series event data in the event stream are displayed within a GUI on a computer system (operation 2004). The graph may include a sparkline, bar graph, line chart, histogram, and/or other type of visualization of the metric that is shown in line with the event stream information. The metric may include network traffic, a number of events, and/or a number of notable events (e.g., security risks).

A subset of event streams associated with a grouping of the event streams by an event stream attribute is also obtained (operation 2006). For example, the subset of event streams may match a value of one or more event stream attributes. Alternatively, the subset of event streams may include all event streams if the event streams are matched to all possible values of the event stream attribute(s). Next, the metric is aggregated across the subset of the event streams (operation 2008), and a graph of the aggregated metric across the event streams is displayed within the GUI (operation 2010). For example, the metric may be aggregated as a sum, average, and/or other summary statistic, and the graph of the aggregated metric may include a sparkline and/or other visual representation of the aggregated metric over time and/or another dimension.

While the graphs for individual event streams and the aggregated metric across the event streams are displayed, the graphs are updated in real-time with time-series event data from the remote capture agent(s) (operation 2012). For example, sparklines representing individual and aggregate network traffic over time may "advance" to reflect newly received time-series event data from the remote capture agent(s). The graph(s) are also updated with the value of the metrics or aggregated metric based on the position of a cursor over the graph(s) (operation 2014). For example, the numeric value of a metric (e.g., network traffic, number of events, number of notable events, etc.) at a given point in time may be displayed in response to the positioning of a cursor over that point in time in the graph.

Finally, event stream information for the subset of the event streams is displayed (operation 2016). For example, the event stream information may be displayed in a table, and the graphs for individual event streams may be shown in a column of the table. The graph of the aggregated metric may be displayed in a different part of the GUI, and the graphs may be updated based on the event streams and/or groupings shown in the table.

Figure 21:
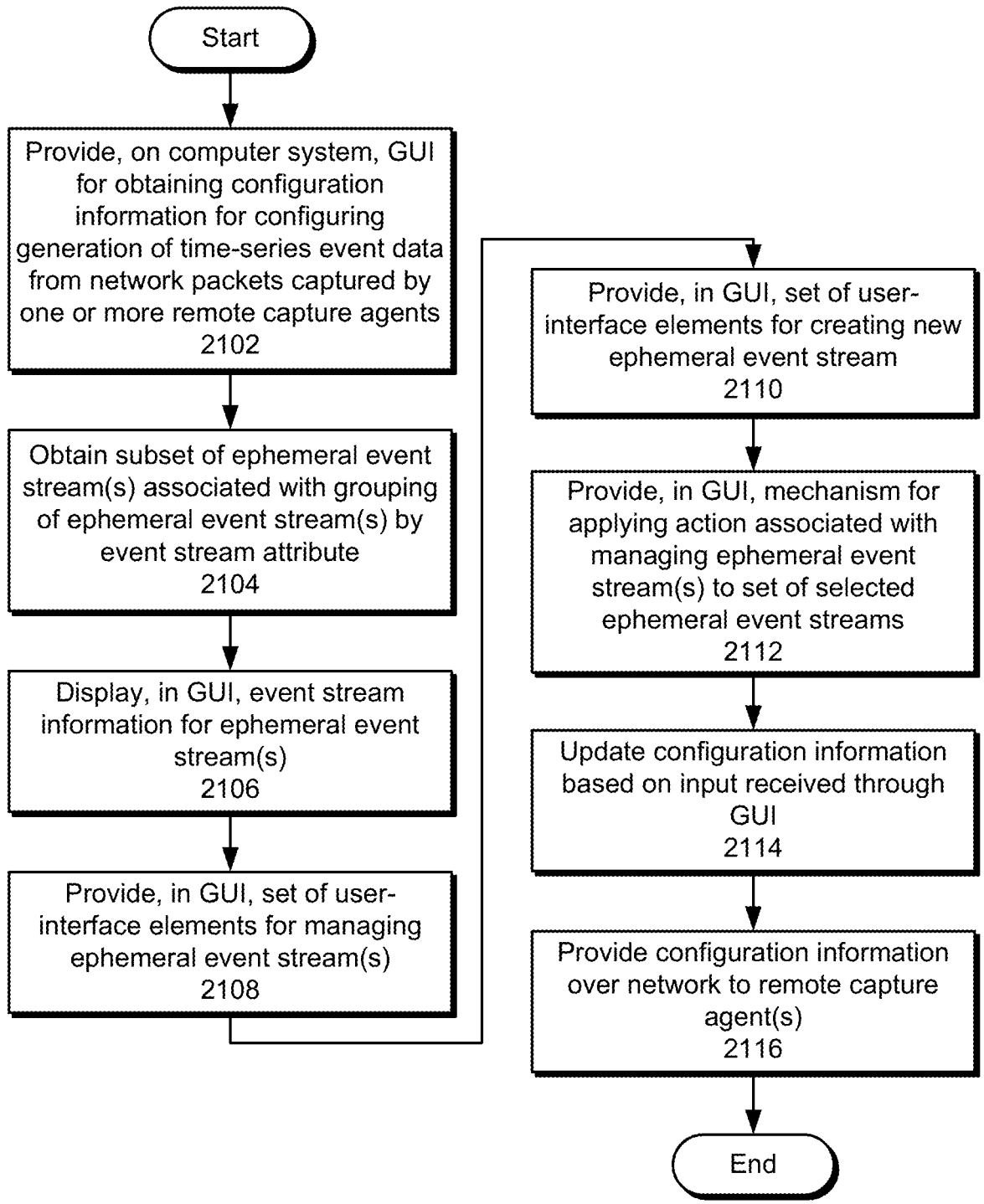
FIG. 21 presents a flowchart illustrating the process of facilitating the processing of network data in accordance with the disclosed embodiments.

FIG. 21 shows a flowchart illustrating the process of facilitating the processing of network data in accordance with the disclosed embodiments. More specifically, FIG. 21 shows a flowchart of managing ephemeral event streams generated from captured network data. In one or more embodiments, one or more of the steps may be omitted, repeated, and/or performed in a different order. Accordingly, the specific arrangement of steps shown in FIG. 21 should not be construed as limiting the scope of the embodiments.

First, a GUI is provided on a computer system for obtaining configuration information for configuring the generation of time-series event data from network packets captured by one or more remote capture agents (operation 2102). Next, a subset of one or more ephemeral event streams associated with a grouping of the ephemeral event stream(s) by an event stream attribute is obtained (operation 2104). For example, the subset of ephemeral event stream(s) may be associated with a grouping of the ephemeral event streams by one or more categories, applications and/or protocols. The ephemeral event streams may be used to temporarily generate time-series event data from network packets captured by the remote capture agent(s).

The GUI is used to display event stream information for the ephemeral event stream(s) (operation 2106), along with a set of user-interface elements for managing the ephemeral event stream(s) (operation 2108). The user-interface elements may be used to disable an ephemeral event stream, delete an ephemeral event stream, and/or modify an end time for terminating the ephemeral event stream. The event stream information may include a name, number of event streams, application, start time, end time, time remaining, and/or status.

The GUI also includes a set of user-interface elements for creating an ephemeral event stream (operation 2110), as well as a mechanism for applying an action associated with managing the ephemeral event stream(s) to a set of selected ephemeral event streams (operation 2112). For example, the GUI may enable the creation of an ephemeral event stream as a copy (e.g., clone) of an existing ephemeral event stream. The GUI may also allow multiple ephemeral event streams to be enabled, disabled, and/or deleted.

The configuration information is updated based on input received through the GUI (operation 2114) and provided over the network to the remote capture agent(s) (operation 2116). The configuration information may then be used to configure the generation of the time-series event data at the remote capture agent(s) during runtime of the remote capture agent(s). For example, the configuration information may be used to create, delete, enable, disable, and/or modify the end times of one or more ephemeral event streams.

Figure 22:
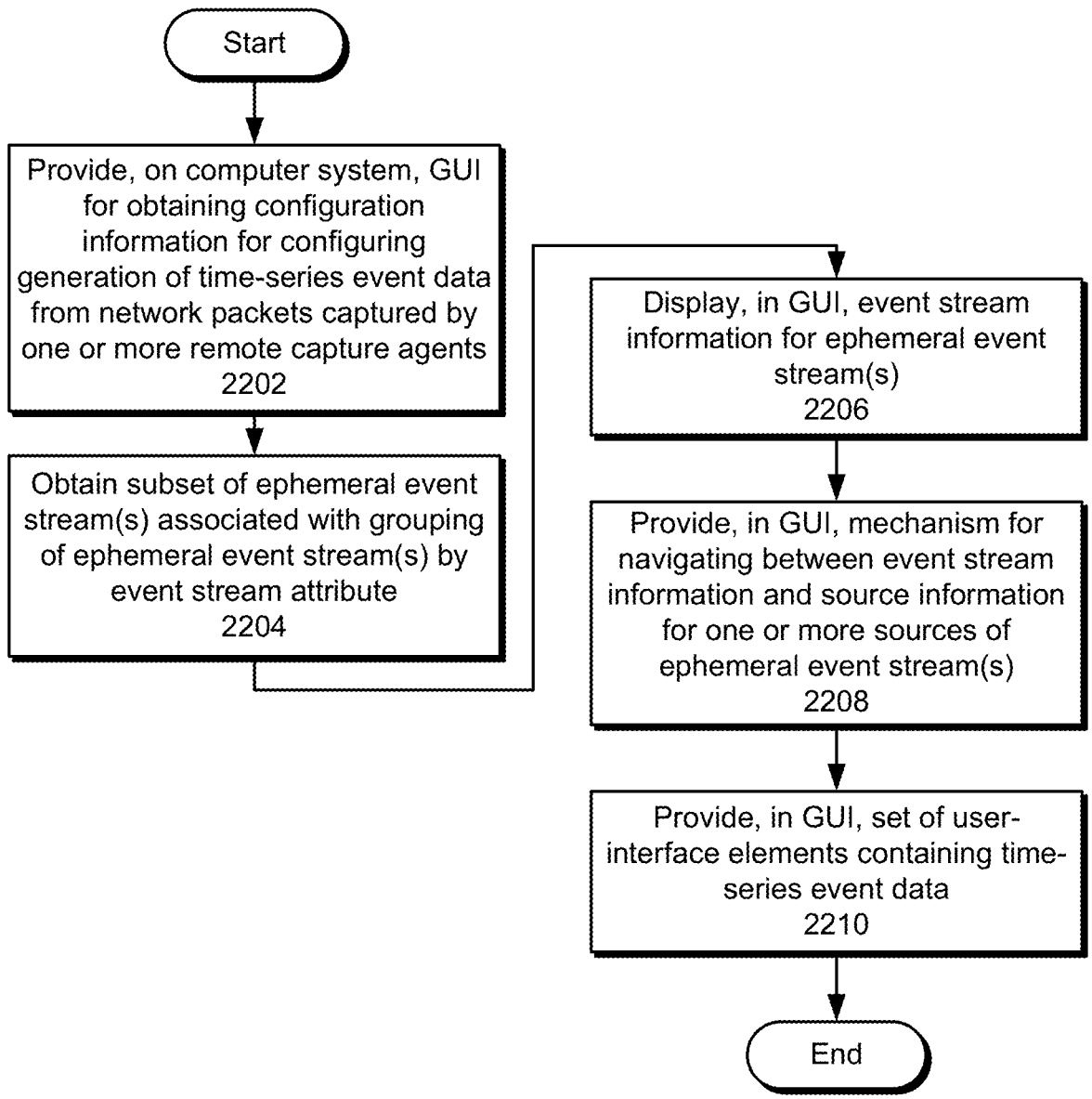
FIG. 22 presents a flowchart illustrating the process of facilitating the processing of network data in accordance with the disclosed embodiments.

FIG. 22 shows a flowchart illustrating the process of facilitating the processing of network data in accordance with the disclosed embodiments. More specifically, FIG. 22 shows a flowchart of bidirectional linking of ephemeral event streams to creators of the ephemeral event streams. In one or more embodiments, one or more of the steps may be omitted, repeated, and/or performed in a different order. Accordingly, the specific arrangement of steps shown in FIG. 22 should not be construed as limiting the scope of the embodiments.

First, a GUI is provided on a computer system for obtaining configuration information for configuring the generation of time-series event data from network packets captured by one or more remote capture agents (operation 2202). Next, a subset of one or more ephemeral event streams associated with a grouping of the ephemeral event stream(s) by an event stream attribute is obtained (operation 2204), and event stream information for the ephemeral event stream(s) is displayed in a GUI (operation 2206), as described above.

The GUI is used to provide a mechanism for navigating between the event stream information and creation information for one or more creators of the ephemeral event stream(s) (operation 2208). The mechanism may include a hyperlink from the event stream information to the creation information for a creator of an ephemeral event stream and/or a hyperlink from the creation information back to the event stream information. The creation information may include a creator name, a protocol, a duration of the ephemeral event stream, and/or a trigger condition for activating the ephemeral event stream. Creators of ephemeral event streams may include applications for monitoring network traffic captured by the remote capture agent(s) and/or capture triggers for generating additional time-series event data from network packets on the remote capture agent(s) based on a security risk.

The GUI also includes a set of user-interface elements containing the time-series event data (operation 2210). For example, the GUI may show individual events and the associated timestamps, graphs of metrics associated with the events, and/or other representations of events in the ephemeral event stream(s). Consequently, the GUI may facilitate understanding and analysis of both the content and context of the ephemeral event streams.

Figure 23A:
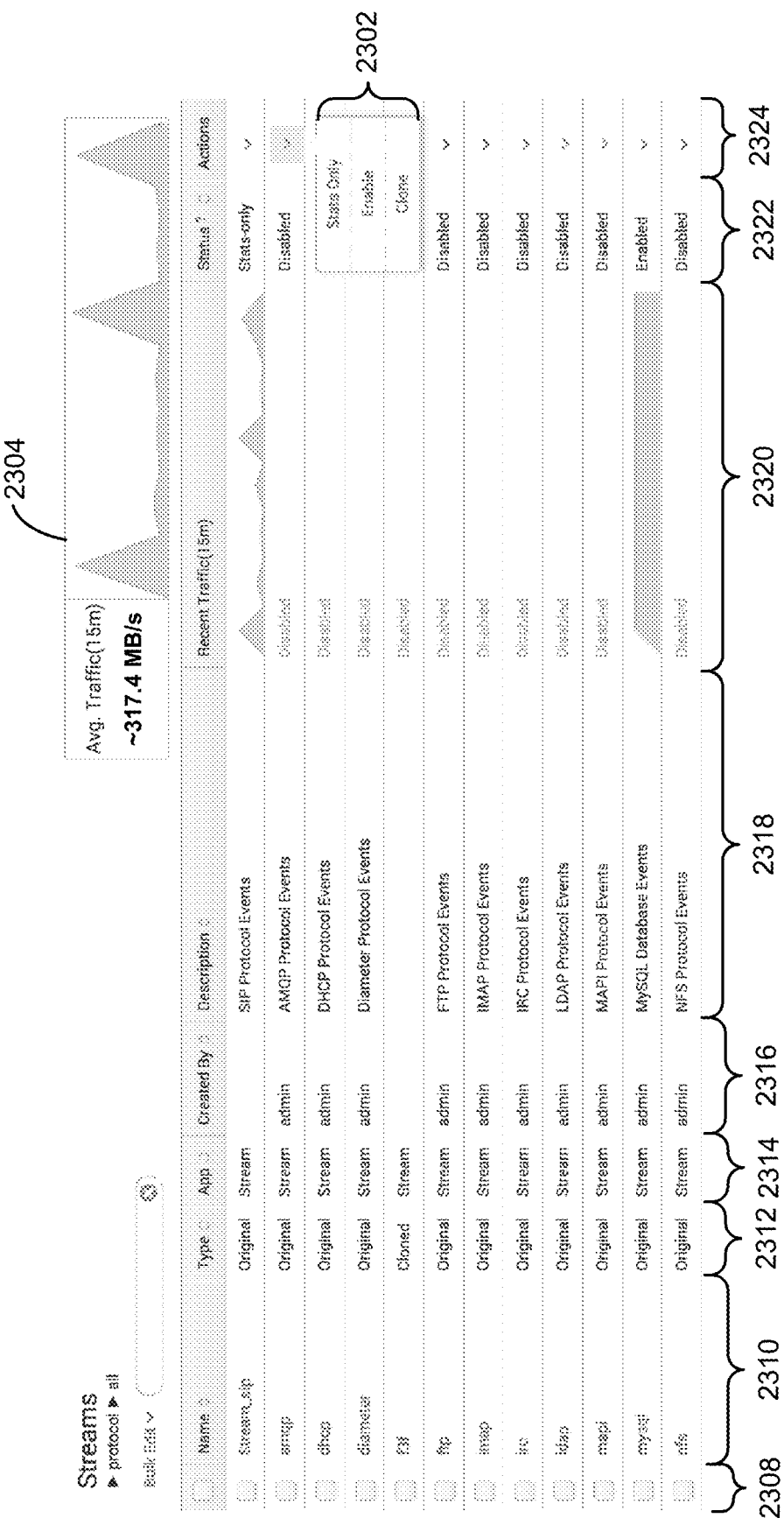
FIG. 23A shows an exemplary screenshot in accordance with the disclosed embodiments.

FIG. 23A shows an exemplary screenshot in accordance with the disclosed embodiments. More specifically, FIG. 23A shows a screenshot of a GUI, such as GUI 1025 of FIG. 10. As described above, the GUI may be used to obtain configuration information that is used to configure the generation of event streams containing time-series event data at one or more remote capture agents distributed across a network.

Like the GUI of FIGS. 17A-17B, the GUI of FIG. 23A may include a table with a set of columns 2308-2324. Event streams in the table may be sorted by information in columns 2308-2324 of the table, other attributes of the event streams, and/or randomly. For example, the user may select the column header of a given column (e.g., columns 2308-2324) to order the displayed event stream information by the information represented by the column. Alternatively, event streams in the table may be randomly sorted and/or sorted by an attribute that is not explicitly displayed in a column of the table.

Column 2308 may include a series of checkboxes that can be used to select one or more event streams to which an action is to be applied using a "Bulk Edit" mechanism, as described above with respect to FIG. 17A. Columns 2310-2318 may include high-level event stream information related to event streams that are created and/or managed using the configuration information. Column 2310 may show a list of names of the event streams, column 2312 may specify a type indicating whether each event stream is cloned from an existing event stream, and column 2314 may specify a protocol associated with each event stream. Column 2316 may show an application associated with each event stream, column 2318 may provide a description of each event stream, and column 2320 may include inline graphs (e.g., sparklines) of metrics associated with the event streams. The GUI may also include a user-interface element 2304 that shows an aggregated value of the metric in the graphs of column 2320, as well as a numeric value of the aggregate metric (e.g., "~317.4 MB/s") over the time spanned by the sparkline.

Column 2322 may specify a status of each event stream, and column 2324 may be used by a user to perform one or more actions on individual event streams. As shown in FIG. 23A, column 2322 indicates a status of "Enabled" for the "mysql" event stream, "Stats-only" for the "Stream_sip" event stream, and "Disabled" for all other event streams.

Within the GUI, the user-interface element in the second row of column 2324 may be selected. As a result, a dropdown menu may be displayed below the user-interface element with a set of options, including "Stats Only," "Enable," and "Clone." The user may select the "Enable" option to enable generation of the corresponding event stream from network data and the "Clone" option to create a new event stream as a copy of the event stream. The user may select the "Stats Only" option to enable the generation of a set of statistics from the event stream without requiring the subsequent storage and processing (e.g., indexing) of the event stream. If the "Stats Only" option is selected, network data related to the event stream may be captured by one or more remote capture agents, and the statistics may be generated from the captured network data and displayed within the GUI without indexing or storing the event stream, as described in further detail below with respect to FIGS. 24A-24E. Alternatively, partial indexing of the event stream in "Stats Only" mode may be configured using another screen of the GUI, as described below with respect to FIG. 23C.

FIG. 23B shows an exemplary screenshot in accordance with the disclosed embodiments. The screenshot of FIG. 23B may be provided by a GUI for obtaining configuration information that is used to configure the generation of event streams containing time-series event data at one or more remote capture agents distributed across a network. More specifically, the GUI of FIG. 23B includes a screen for specifying configuration information for configuring the generation of time-series event data in an event stream named "Stream_sip." For example, the screen of FIG. 23B may be shown after a user selects the first row of column 2310 in the GUI of FIG. 23A.

Like the GUI of FIG. 11B, the GUI of FIG. 23B includes a table. Each row in the table may represent an event attribute that is eligible for inclusion in the event stream. For example, an event attribute may be included in the table if the event attribute can be obtained from network packets that include the protocol of the event stream. Columns 2332-2342 of the table may allow the user to use the event attributes to generate time-series event data that is included in the event stream. First, column 2332 includes a series of checkboxes that allows the user to include individual event attributes in the event stream or exclude the event attributes from the event stream. If a checkbox is checked, the corresponding event attribute is added to the event stream, and the row representing the event attribute is shown with other included event attributes in an alphabetized list at the top of the table. If a checkbox is not checked, the corresponding event attribute is omitted from the event stream, and the row representing the event attribute is shown with other excluded event attributes in an alphabetized list following the list of included event attributes. Those skilled in the art will appreciate that the GUI may utilize other sortings and/or rankings of event attributes in columns 2332-2342.

Columns 2334-2340 may provide information related to the event attributes. Column 2334 may show the names of the event attributes, column 2336 may provide a description of each event attribute, column 2338 may provide a type of each the event attribute (e.g., "Original" or "Extracted" using an extraction rule), and column 2340 may provide a term representing the event attribute. In other words, columns 2334-2340 may allow the user to identify the event attributes and decide whether the event attributes should be included in the event stream.

Column 2342 may be used to apply one or more actions to the event attributes represented by the rows of the table. The user may select each row in column 2342 to set a filter and/or create an extraction rule for the corresponding event attribute. The filter and/or extraction rule may then be used in the generation, processing, and/or querying of the event stream.

The GUI of FIG. 23B also includes a set of user-interface elements 2344-2348 for managing the event stream. The user may select user-interface element 2344 (e.g., "Enabled") to enable generation of the event stream from network data and user-interface element 2346 (e.g., "Disabled") to disable the generation of the event stream from the network data. The user may select user-interface element 2348 (e.g., "Stats Only") to enable the generation of a set of statistics from the event stream without requiring the subsequent storage and processing the event stream by indexers, data stores, and/or other components on the network. The GUI of FIG. 23B may thus provide a mechanism for generating a set of statistics from an un-indexed and/or partially indexed event stream, in lieu of or in addition to drop-down menu 2302 in the GUI of FIG. 23A.

FIG. 23C shows an exemplary screenshot in accordance with the disclosed embodiments. As mentioned above, the screenshot of FIG. 23C may be provided by a GUI (e.g., GUI 1025 of FIG. 10) that is used to manage an event stream. More specifically, the GUI of FIG. 23C may be used to configure the selective indexing of an event stream after the event stream is placed into a "stats only" mode. For example, the GUI of FIG. 23C may be shown after the "Stats Only" option is selected for the "tcp" stream using the GUI of FIG. 23A or FIG. 23B.

As shown in FIG. 23C, the GUI includes a portion 2350 that contains information and/or statistics associated with the "tcp" event stream. For example, portion 2350 may specify the name of the event stream and include a total number of events (e.g., "15764"), which represents the number of events generated from network data associated with the event stream over a given period. Portion 2350 may also include a total incoming traffic in MB (e.g., "6.31"), a total outgoing traffic in MB (e.g., "44.13"), and a total traffic in MB (e.g., "50.44") for the network data over the same period. Finally, portion 2350 may specify an index volume in MB (e.g., "17.52") for the event stream, which represents the estimated indexed size of the 15764 events in the event stream.

The statistics in portion 2350 may be generated without indexing and storing the entirety of the event stream. For example, the statistics may be generated from the event stream by one or more remote capture agents and/or configuration servers. As a result, some or all of the event stream may be omitted from subsequent storage and processing by forwarders, indexers, data stores, and/or other network components.

Next, the GUI includes a portion 2352 that is used to obtain a user setting for the amount to index in the event stream. Portion 2352 includes a slider that allows the user to specify a percentage (e.g., "40%") and/or amount (e.g., "7 MB") of the event stream to index. The user may move the slider to the right to increase the percentage up to a maximum of 100% (e.g., 17.52 MB), or the user may move the slider to the left to decrease the percentage down to a minimum of 0% (e.g., 0MB).

Portion 2352 is followed by information 2354 related to an unused storage limit associated with the time-series event data in the event stream. For example, information 2354 may provide the storage limit as a "daily index volume limit" (e.g., "1 GB") for a given user account or license, along with an average unused portion of the daily storage limit (e.g., "25 MB") that can be used to index other data. Information 2354 is followed by a suggestion 2356 for setting the percentage of the event stream to store (e.g., index) based on the set of statistics in portion 2352, a historical trend associated with the statistics, and/or the storage limit information 2352. For example, suggestion 2356 may recommend indexing up to 85% of the "tcp" event stream based on fluctuations in the index volume of the event stream and the average unused index volume limit associated with a given license.

Suggestion 2356 may be followed by information 2358 that provides a price associated with capturing the event stream above the storage limit. For example, information 2358 may indicate an increase of $1800 a year for increasing the daily index volume limit to 2 GB and an increase of $8200 a year for increasing the daily index volume limit to 10 GB.

The GUI may additionally provide a set of options 2360-2374 for configuring the selective indexing of the event stream. Options 2360-2374 may be associated with checkboxes in the GUI. The user may enable an option by selecting the corresponding checkbox and disable the option by deselecting the checkbox.

Option 2360 may enable the automatic adjustment of the indexing of the event stream based on the average unused daily index volume limit. If option 2360 is enabled, the percentage specified in the slider of portion 2352 may be ignored, and configuration information associated with the event stream may be updated to automatically adjust the indexing of the event stream to stay within the daily unused index volume limit.

Option 2362 may enable indexing of the entire event stream during high traffic volume, and option 2364 may enable indexing of a sample of the event stream during high traffic volume. Conversely, option 2366 may enable indexing of the entire event stream during low traffic volume. Options 2362-2374 may thus be used to fine-tune the indexing of one or more portions of the event stream during various network traffic conditions associated with the event stream.

Option 2368 may enable indexing of the event stream during a daily period that is defined by a user-editable start time (e.g., "6:30 pm") and end time (e.g., "7:30 pm"). The user may edit the start and end times by interacting with a text box, drop-down menu, and/or other user-interface elements in which the start and end times are displayed.

Option 2370 may enable indexing of the event stream during predefined public holidays and retail shopping days. For example, option 2370 may be selected to trigger indexing of the event stream during days such as Thanksgiving, Christmas, Black Friday, Cyber Monday, and/or other days associated with deviations from standard user and/or network traffic patterns.

Option 2372 may enable indexing of the event stream during user-editable custom days (e.g., "January 31, April 30, July 31, October 31"). The user may add edit the list of custom days by interacting with a text box, drop-down menu, and/or other user-interface element in which the custom days are displayed.

Option 2374 may enable indexing of the event stream based on compliance standards such as Payment Card Industry (PCI) data security standards, Health Insurance Portability and Accountability Act (HIPAA) requirements, and/or Sarbanes-Oxley rules. The user may select a user-interface element 2378 (e.g., "compliance standards") associated with option 2374 to navigate to a different screen of the GUI for configuring compliance-based indexing of the event stream. For example, the user may select user-interface element 2378 to reach a screen that allows the user to select one or more standards with which to comply and/or specify one or more associated with compliance with the selected standards during indexing of the event stream.

After the user has finished setting options associated with selective indexing of the event stream, the user may select a user-interface element 2382 (e.g., "Save") to commit the options to configuration information that is used by remote capture agents, configuration servers, forwarders, indexers, data stores, and/or other distributed network components to capture and subsequently process the event stream. Conversely, the user may select a user-interface element 2380 (e.g., "Cancel") to exit the screen of FIG. 23C without saving the options in the configuration information.

Figure 24A:
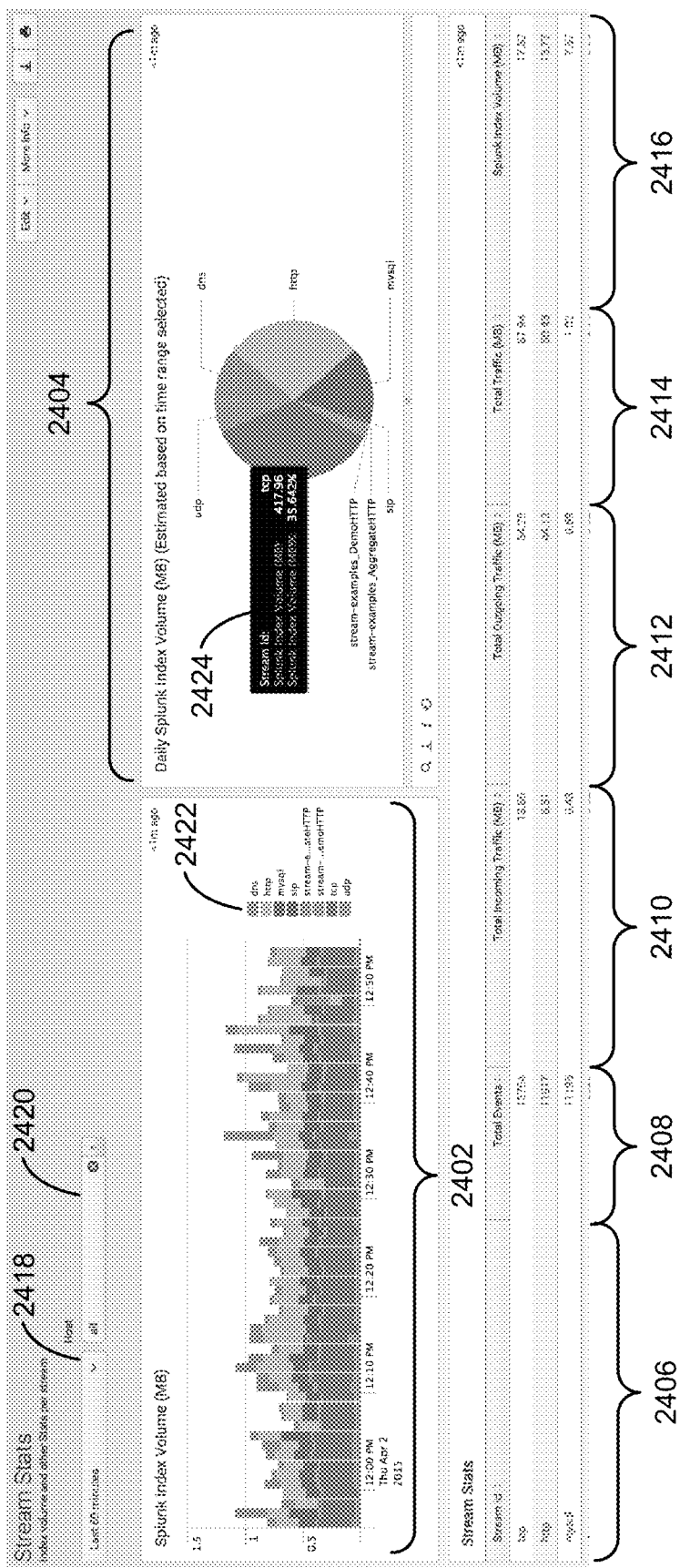
FIG. 24A shows an exemplary screenshot in accordance with the disclosed embodiments.

FIG. 24A shows an exemplary screenshot in accordance with the disclosed embodiments. In particular, FIG. 24A shows a screenshot of a GUI for obtaining configuration information that is used to configure the generation of event streams containing time-series event data at one or more remote capture agents distributed across a network, such as GUI 1025 of FIG. 10.

The GUI of FIG. 24A includes a table of statistics for a set of event streams. As described above, the statistics may be generated from the event streams independently of subsequent storage and processing of the event streams by forwarders, indexers, data stores, and/or other components on a network, such as network 801 of FIG. 8.

The table includes a set of columns 2406-2416. Each column 2406-2416 may provide a different statistic for event streams represented by rows in the table, and rows in the table may be sorted by different column values by selecting the corresponding column headers (e.g. "Stream id," "Total Events," "Total Incoming Traffic (MB)," "Total Outgoing Traffic (MB)," "Total Traffic (MB)," "Splunk Index Volume (MB)") of columns 2406-2416. Alternatively, rows in the table may be sorted by other attributes and/or randomly. Elements of rows in the table may also be selected to navigate to a different screen containing additional information related to the event streams and/or statistics, as described in further detail below with respect to FIG. 24E.

Column 2406 may show a list of names of the event streams, such as "tcp," "http," and "mysql." Column 2408 may show a total number of events collected from each event stream over a pre-specified time period, column 2410 may show a total incoming traffic for the event stream over the same time period, and column 2412 may show a total outgoing traffic for the event stream over the same time period. Column 2414 may show a total traffic (e.g., incoming and outgoing combined) for the event stream over the time period, and column 2416 may show an index volume of the event stream over the time period. Columns 2408-2414 may thus represent statistics for network traffic associated with each event stream, while column 2416 may provide index volumes related to the potential indexing of time-series event data in the event stream after the time-series event data is extracted from the network traffic.

The GUI of FIG. 24A also includes two graphs 2402-2404. Graph 2402 may be a bar chart of index volumes of event streams in the table. Each bar in the bar chart may contain one or more segments representing the index volume of a corresponding event stream over a given time range. As shown in FIG. 24A, bars in the bar chart may be divided into different colored segments, which represent different event streams collected over the corresponding time ranges. The height of each bar in the bar chart may represent a total index volume over a minute, and each colored segment in the bar chart may represent the contribution of the corresponding event stream to the total index volume. As a result, longer segments in a bar may take up more of the total index volume, while shorter segments in the bar may take up less of the total index volume.

The bar chart also includes a legend 2422 that maps colors in the bar chart to specific event streams. Legend 2422 may thus allow a user to identify event streams represented by different colored segments in the bar chart. As discussed below with respect to FIGS. 24B-24C, the appearance of the bar chart may also change based on the position of a cursor over the bar chart and/or legend 2422.

Graph 2404 may be a pie chart of index volume across the event streams. Each colored "slice" of the pie chart may represent the proportion of the total index volume occupied by the corresponding event stream over a given period. For example, the pie chart of FIG. 24A may indicate that the "http" and "tcp" event streams occupy relatively larger portions of the total index volume than other event streams over the same period.

Graph 2404 also includes a user-interface element 2424 that displays a number of values of an index volume of the "tcp" event stream. The appearance and/or location of user-interface element 2424 may change based on the position of the cursor over the pie chart. For example, user-interface element 2424 may be shown when the cursor is positioned over the slice of the pie chart that represents the "tcp" event stream. As the cursor is moved over other slices of the pie chart, the position of user-interface element 2424 may shift to be adjacent to the slice over which the cursor is currently positioned. At the same time, values in user-interface element 2424 may be updated to reflect statistics associated with the corresponding slice of the pie chart.

More specifically, user-interface element 2424 may include the name of the corresponding event stream (e.g., "tcp"), an amount of data associated with the index volume of the event stream in MB (e.g., "417.96"), and a percentage of a total index volume associated with the event stream (e.g., "35.642%"). As the cursor is positioned over other slices in the pie chart, user-interface element 2424 may be updated with the names, index volume data amounts, and index volume percentages of the corresponding event streams. Consequently, the appearance of the pie chart may change with the location of the cursor within graph 2404.

The user may provide other types of user input to graph 2404 and/or user-interface element 2424 to further update the appearance of the GUI. For example, the user may click or double-click on user-interface element 2424 to navigate to a screen of the user interface that displays a search term, event streams, and/or additional data associated with the "tcp" event stream and/or other event streams, such as the screen of FIG. 24E. Other areas of the GUI of FIG. 24A may be updated based on user input associated with user-interface element 2424. For example, the portions (e.g., bar segments) of graph 2402 representing the "tcp" event stream in graph 2402 may be highlighted, and other segments of graph 2402 may be dimmed, in response to the position of cursor over user-interface element 2424 and/or the clicking or double-clicking of user-interface element 2424. In another example, statistics and/or other data associated with the "tcp" event stream may be displayed in one or both graphs 2402-2404 in response to user input associated with user-interface element 2424.

The GUI additionally includes a number of user-interface elements 2418-2420 for changing a view of graphs 2402-2404. User-interface element 2418 may allow the user to change the scale and/or time range associated with data in graphs 2402-2404. For example, user-interface element 2418 may allow the user to select a pre-specified, relative, real-time, absolute, and/or custom time period spanned by the index volumes shown in graphs 2402-2404. Selection of time ranges associated with graphs of statistics associated with event streams is described in further detail below with respect to FIG. 24D.

User-interface element 2420 may be used to filter statistics in the table and graphs 2402-2404 by a host from which the event streams are collected. For example, the user may select user-interface element 2420 to access a drop-down menu that contains a list of hosts from which the event streams are captured. The user may select one or more of the hosts to update columns 2406-2416 in the table and graphs 2402-2404 with statistics associated with the hosts, or the user may select an "all" option to display statistics associated with all hosts from which network data is captured. The user may also search for hosts by name using a form field in the drop-down menu.

Graphs 2402-2404 may be updated in real-time with time-series event data as the time-series event data is received from one more remote capture agents. For example, the bar chart of graph 2402 may shift as a real-time time range specified in user-interface element 2418 advances and additional time-series event data is collected within the time range. Similarly, slices in the pie chart of graph 2404 may change size to reflect changes in the proportions of index volumes in the event streams within the time range.

Figure 24B:
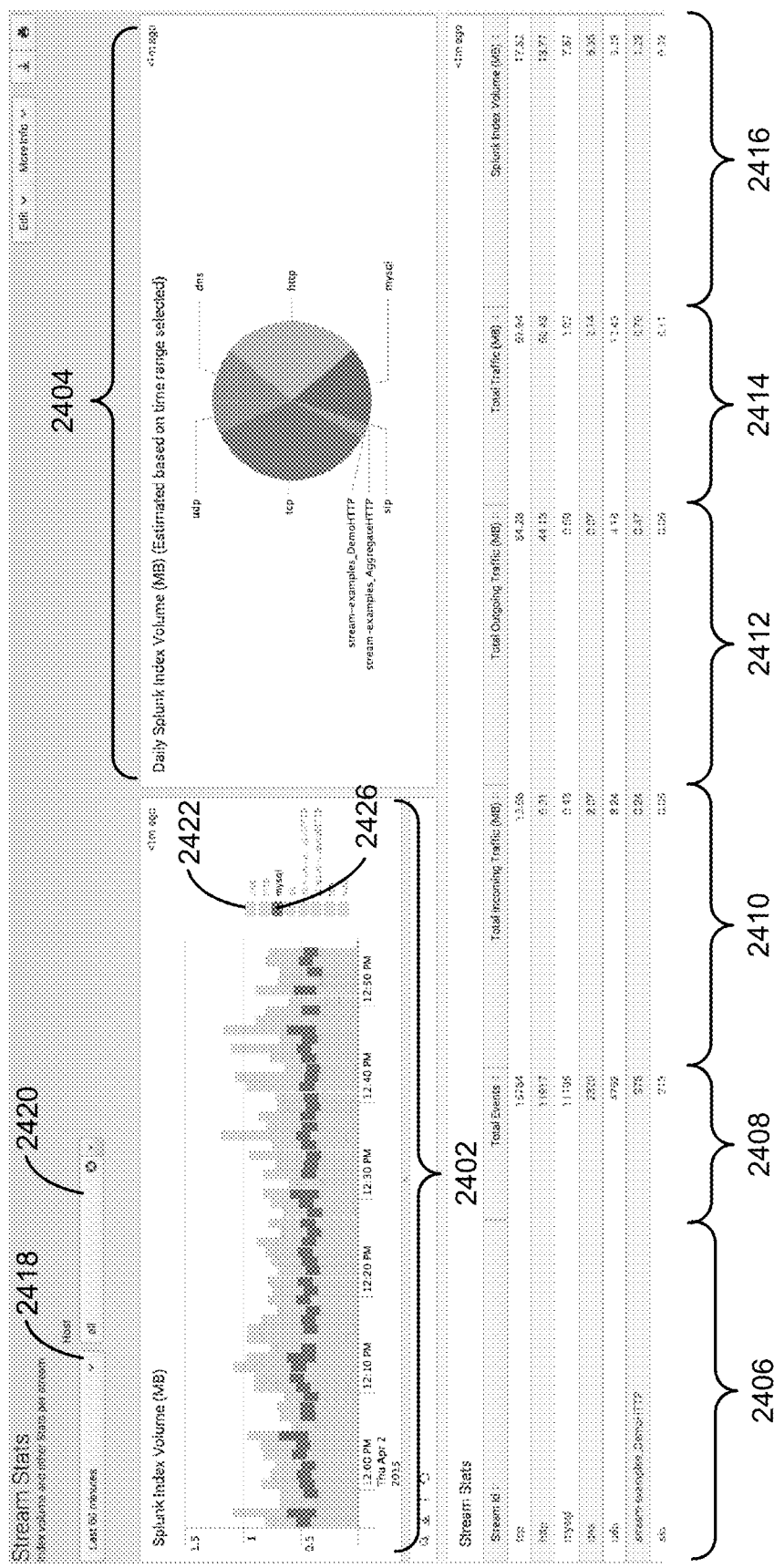
FIG. 24B shows an exemplary screenshot in accordance with the disclosed embodiments.

FIG. 24B shows an exemplary screenshot in accordance with the disclosed embodiments. More specifically, FIG. 24B shows the GUI of FIG. 24A after the cursor is positioned over a portion 2426 of legend 2422 in graph 2402. Portion 2426 may map the "mysql" event stream to a particular color (e.g., red). As a result, portion 2426 may indicate that all red segments in graph 2402 correspond to the contribution of the "mysql" event stream to the total index volume for bars in graph 2402.

In response to the position of the cursor over portion 2426, the appearance of bar chart may be changed so that the red segments in bars of the bar chart are highlighted and other segments corresponding to other portions of legend 2422 are dimmed. By positioning the cursor over portion 2426, the user may identify the locations and/or relative sizes of segments representing the "mysql" event stream in the bar chart. In turn, the user may be able to analyze trends and/or patterns associated with the "mysql" event stream using the highlighted segments.

The user may provide other types of user input to portion 2426 to further update the appearance of the GUI. For example, the user may click or double-click on portion 2426 to navigate to a screen of the user interface that displays a search term, event streams, and/or additional data associated with the "mysql" event stream and/or other event streams, such as the screen of FIG. 24E. Other areas of the GUI of FIG. 24B may be updated based on user input associated with portion 2426. For example, the slice representing the "mysql" event stream in graph 2404 may be highlighted, and other slices of graph 2404 may be dimmed, in response to the position of cursor over portion 2426 and/or the clicking or double-clicking of portion 2426. In another example, statistics and/or other data associated with the "mysql" event stream may be displayed in one or both graphs 2402-2404 in response to user input associated with portion 2426.

The user may change the highlighting and/or dimming of the bar chart by positioning the cursor over other portions of legend 2426. As the cursor is placed over a given portion of legend 2426, colored segments in the bar chart represented by the portion may be highlighted, and other segments in the bar chart may be dimmed. On the other hand, if the cursor is positioned over a colored segment in a bar of the bar chart instead of legend 2422, the appearance of the bar chart may be updated differently, as described in further detail below with respect to FIG. 24C.

Figure 24C:
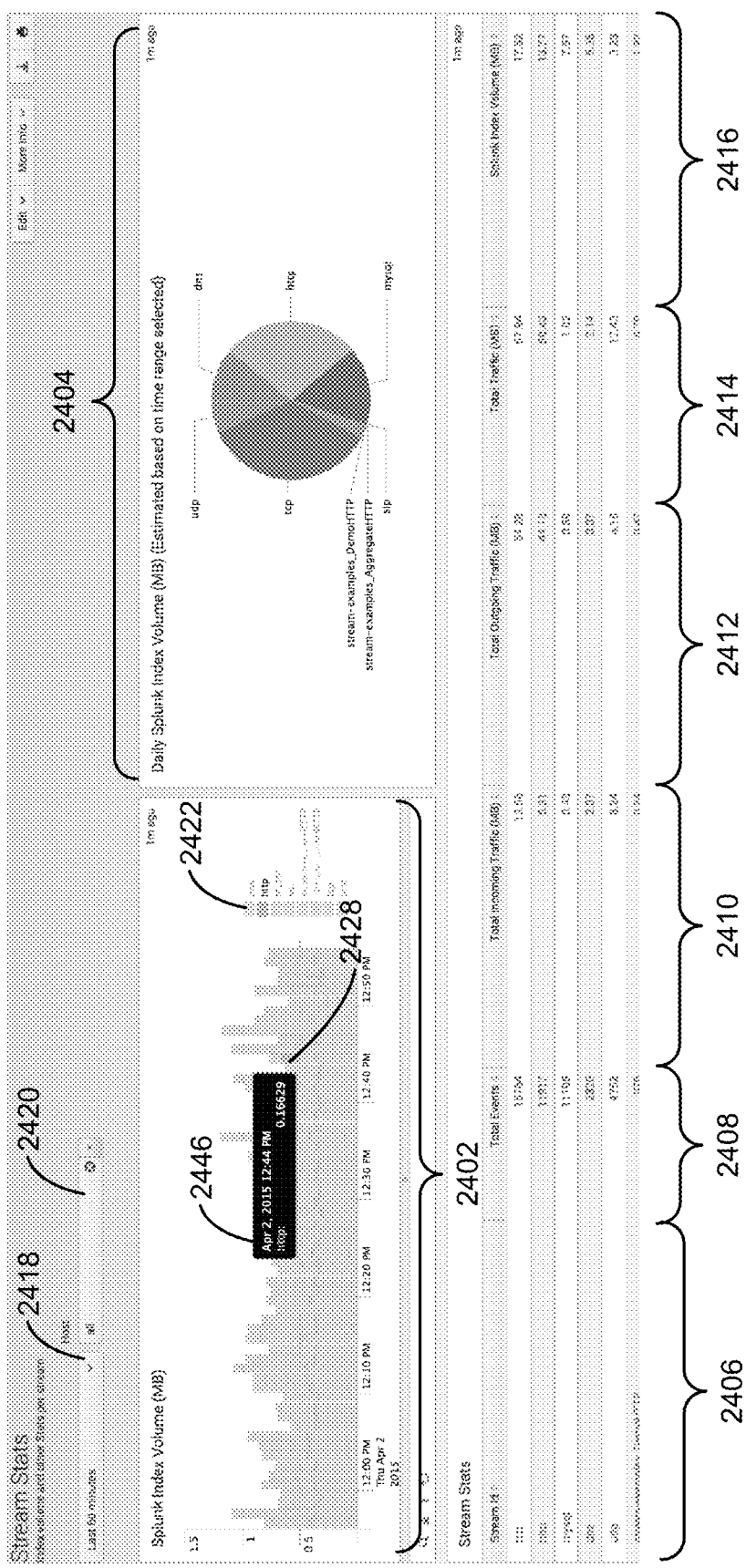
FIG. 24C shows an exemplary screenshot in accordance with the disclosed embodiments.

FIG. 24C shows an exemplary screenshot in accordance with the disclosed embodiments. In particular, FIG. 24C shows the GUI of FIGS. 24A-24B after the cursor is positioned over a segment 2428 in a bar of the bar chart corresponding to graph 2402 instead of a portion of legend 2422. Segment 2428 may represent the contribution of a given event stream (e.g., "http") to the total index volume over a given time interval (e.g., one minute) in the bar chart.

The positioning of the cursor over segment 2428 may cause the segment to be highlighted and other segments in the bar chart to be dimmed. A portion of legend 2422 containing a mapping of the event stream represented by the segment to a color in the bar chart (e.g., yellow) may also be highlighted, while other portions of legend 2422 may be dimmed. In addition, the bar chart may be updated with a user-interface element 2446 that displays information related to the index volume of the "http" event stream. For example, user-interface element 2446 may display the index volume of the event stream (e.g., "0.16629") represented by the highlighted segment in the bar chart in MB. User-interface element 2446 may also identify the time interval (e.g., "Apr. 2, 2015 12:44 PM") during which the index volume represented by the highlighted segment was produced.

As with portion 2426 of FIG. 24B, additional user input to segment 2428 may result in changes to the appearance of the GUI. For example, the user may click or double-click on segment 2428 to navigate to a screen of the user interface that displays a search term, event streams, and/or additional data associated with the "http" event stream and/or segment 2428, such as the screen of FIG. 24E. Other areas of the GUI of FIG. 24C may be updated based on user input associated with segment 2428. For example, the slice representing the "http" event stream in graph 2404 may be highlighted, and other slices of graph 2404 may be dimmed, in response to the position of cursor over segment 2428 and/or the clicking or double-clicking of segment 2428. In another example, statistics and/or other data associated with the "http" event stream and/or segment 2428 may be displayed in one or both graphs 2402-2404 in response to user input associated with portion 2426.

The appearance and/or location of user-interface element 2446 and the bar chart may change based on the position of the cursor over the bar chart. For example, user-interface element 2446 may be shown next to a given segment in the bar chart over which the cursor is currently positioned. The segment and corresponding portion of legend 2422 may be highlighted, and other segments in the bar chart and/or other portions of legend 2422 may be dimmed. Values in user-interface element 2446 may also be updated to reflect the time interval, index volume, and/or other information or statistics associated with the segment.

A user may thus place the cursor over a given segment in the bar chart to obtain information and/or statistics associated with the segment. In turn, the information and/or statistics may provide the user with a more thorough understanding of index volumes of individual event streams a particular points in time.

Figure 24D:
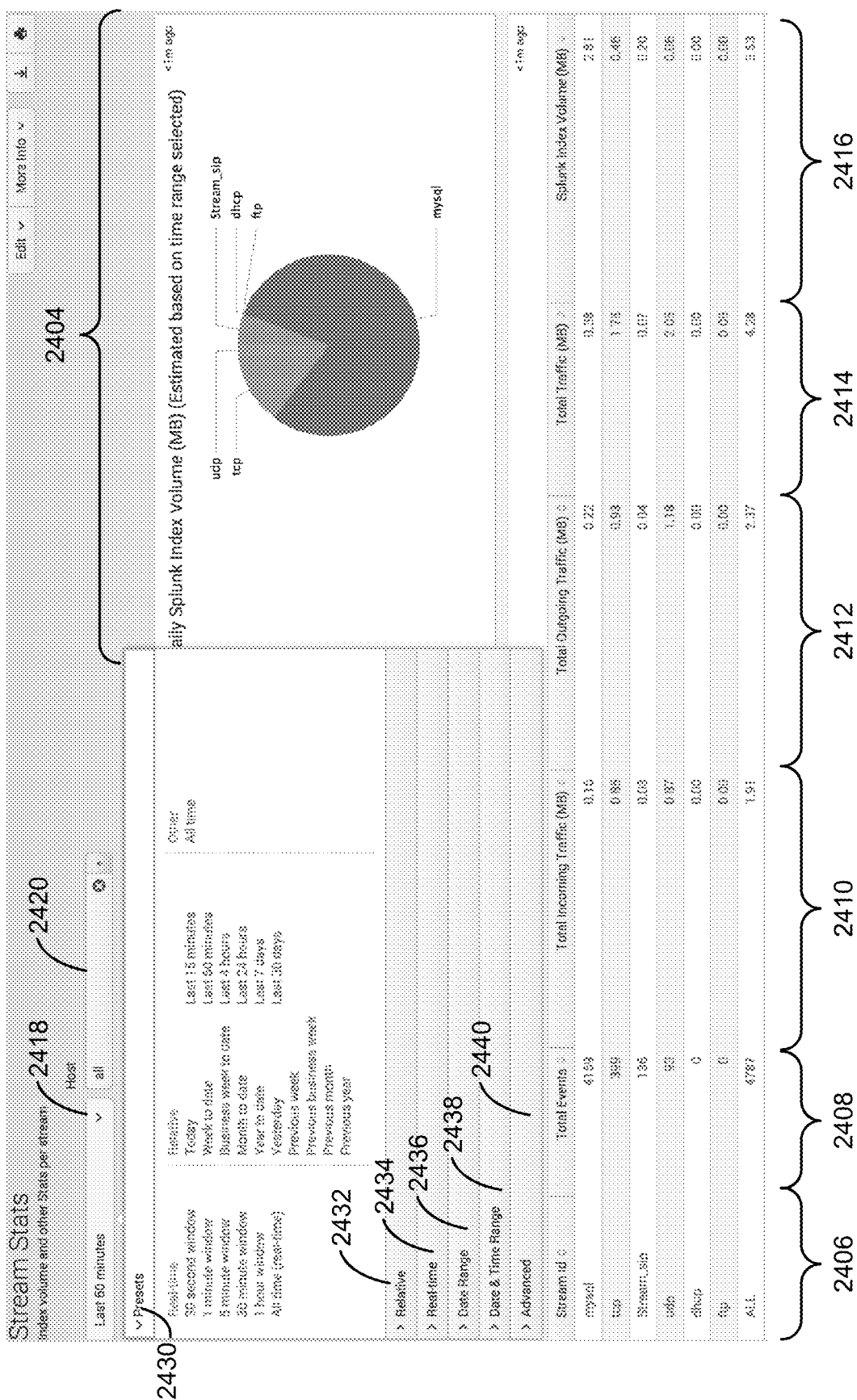
FIG. 24D shows an exemplary screenshot in accordance with the disclosed embodiments.

FIG. 24D shows an exemplary screenshot in accordance with the disclosed embodiments. More specifically, FIG. 24D shows the GUI of FIGS. 24A-24C after the user has selected user-interface element 2418. In response to the selection of user-interface element 2418, the GUI may display a drop-down menu containing a number of sections 2430-2440 for specifying a time range associated with the time-series event data and/or statistics used to generate graphs 2402-2404 and populate columns 2406-2416 in the table.

Section 2430 may include a number of preset time ranges spanned by data in graphs 2402-2404 and columns 2406-2416. For example, section 2430 may include a number of user-interface elements for specifying real-time windows (e.g., 30 seconds, one minute, five minutes, 30 minutes, one hour), relative time ranges (e.g., same or previous minutes, hours, days, weeks, months, years), and/or all time. A user may select a preset time range listed under section 2430 to efficiently update graphs 2402-2404 and columns 2406-2416 with data spanning the time range.

Section 2432 may be used to define a relative time range for data in graphs 2402-2404 and columns 2406-2416. For example, section 2432 may include a number of user-interface elements for defining a start time and an end time of the time range spanned by data in graphs 2402-2404 and columns 2406-2416.

Section 2434 may be used to define a "Real-time" interval that includes the current time as an end time. For example, section 2434 may allow the user to specify a time window spanning a number of minutes, hours, days, weeks, and/or months before the current time. Unlike the preset times in section 2430, section 2434 may allow the time window to span an arbitrary amount of time up to the current time.

Section 2436 may be used to define a date range representing the time range, and section 2438 may be used to define a date and time range representing the time range. For example, sections 2436-2438 may include user-interface elements that allow the user to specify dates (e.g., day, month, year) and/or timestamps representing the start and end times of the time range.

Finally, section 2440 may be used to define an advanced time range. For example, section 2440 may include a number of user-interface elements for entering values of the start and end times for the time range using one or more supported time notations, such as epoch time and/or relative time notation.

Once a time range is selected and/or defined using one or more sections 2430-2440 of user-interface element 2418, graphs 2402-2404 and columns 2406-2416 may be updated with data spanning the time range. As a result, user-interface element 2418 may be used to change a view of graphs 2402-2404 and data in the table.

Figure 24E:
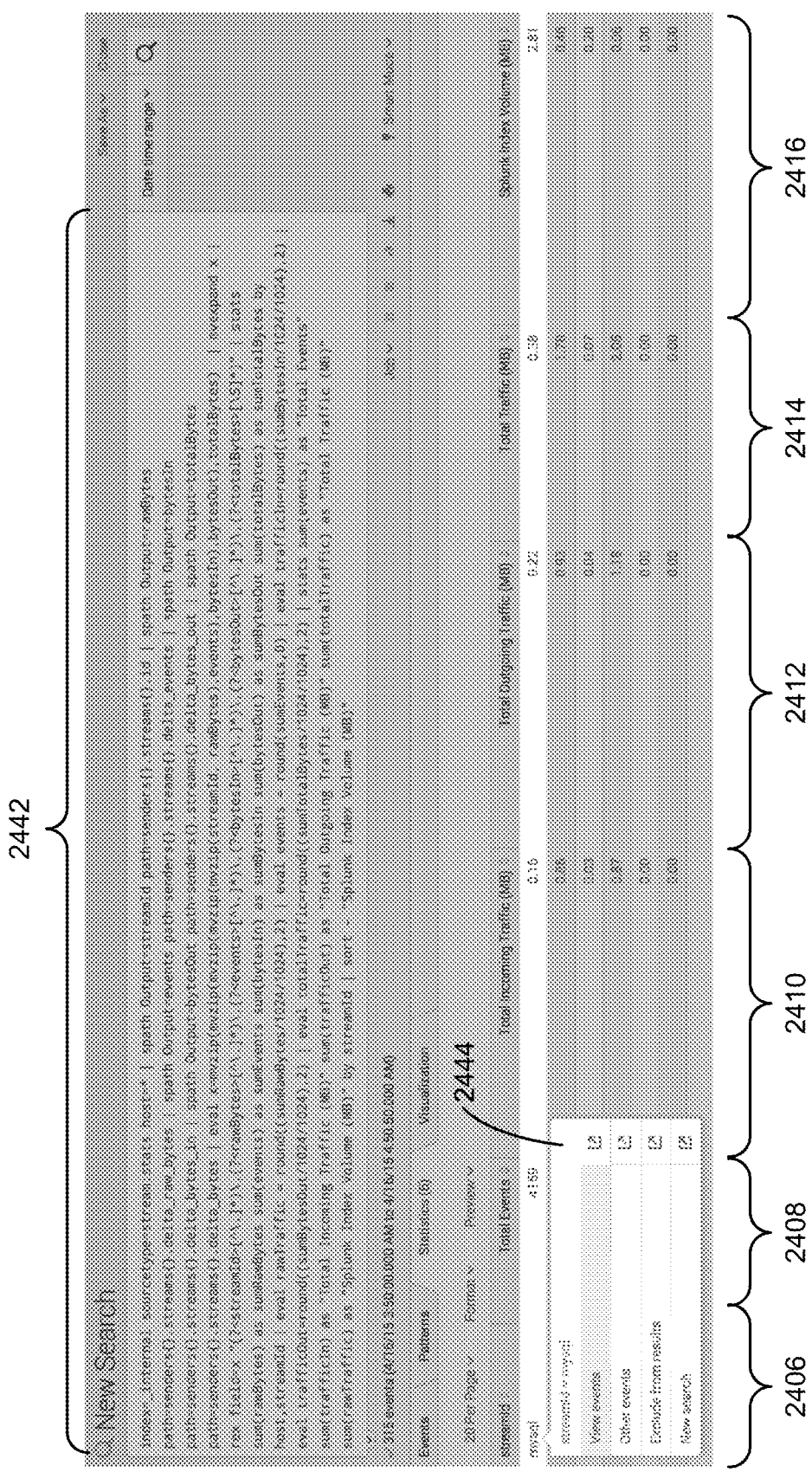
FIG. 24E shows an exemplary screenshot in accordance with the disclosed embodiments.

FIG. 24E shows an exemplary screenshot in accordance with the disclosed embodiments. More specifically, FIG. 24E shows the GUI of FIGS. 24A-24D after any element of the table is selected. In response to the selection, the GUI may navigate to a screen containing a user-interface element 2442 (e.g., a text box) that displays an editable search term for retrieving data associated with graphs 2402-2404 and columns 2406-2416 of the table. A user may manually modify the search term within user-interface element 2442 to change the data included in graphs 2402-2404 and columns 2406-2416. For example, the user may modify the statistics, time range, event streams, and/or other information to be retrieved, generated, and/or visualized using the search term.

The GUI of FIG. 24E also includes a user-interface element 2444 (e.g., a drop-down menu) that is displayed next to the first element of column 2406 (e.g., "mysql") in the table. User-interface element 2444 may be shown after the first element of column 2406 is selected by a user. User-interface element 2444 may include options that are used to configure the search term in user-interface element 2442 and, in turn, the data in columns 2406-2416 and/or graphs 2402-2404. For example, user-interface element 2444 may include a first option (e.g., "View events") that allows the user to search for and view events in the "mysql" event stream in a separate screen of the GUI, such as the screen of FIG. 11F. User-interface element 2444 may include a second option (e.g., "Other events") that allows the user to search for and view events in other event streams but not the "mysql" event stream in a separate screen of the GUI. User-interface element 2444 may include a third option (e.g., "Exclude from results") that excludes data associated with the "mysql" event stream from data shown in columns 2406-2416. Finally, user-interface element 244 may include a fourth option (e.g., "New search") that clears the search term in user-interface element 2442 and allows the user to specify a new search term using user-interface element 2442.

Those skilled in the art will appreciate that the GUI of FIGS. 24A-24E may include other types of information, graphs, and/or variations on graphs 2402-2404. First, the GUI may include line charts, histograms, scatter plots, timelines, and/or other visualizations of statistics associated with the capture and/or indexing of event streams. Second, the GUI may change the views and/or appearances of graphs 2402-2404 in other ways. For example, the GUI may show segments in the bar chart corresponding to graph 2402 in a side-by-side fashion within each time interval instead of stacking the segments on top of one another to form a single bar in the time interval. In another example, graphs 2402-2404 may be highlighted, dimmed, and/or shown with different types of statistics based on cursor positions and/or other user input into the GUI. In yet another example, the GUI may include user-interface elements that allow the user to change the scale of one or both graphs 2402-2404 and/or perform additional filtering of data in graphs 2402-2404. Third, the table and/or graphs 2402-2404 may include additional information, filters, and/or statistics related to the event streams. For example, the table may include a column that identifies each event stream as enabled or "stats only" and/or a column that identifies the percentage and/or amount of indexing of the event stream, up to an entirety of the event stream. In another example, the table may include columns that specify the number of packets in each event stream, the number of packets indexed in the event stream, and/or the number of packets not included in indexing of the event stream. In yet another example, data in graphs 2402-2404 may be filtered by capture mode (e.g., enabled, "stats only," partially indexed), sorted by amount or percentage of indexing, and/or sorted by amount or percentage not indexed.

Figure 25:
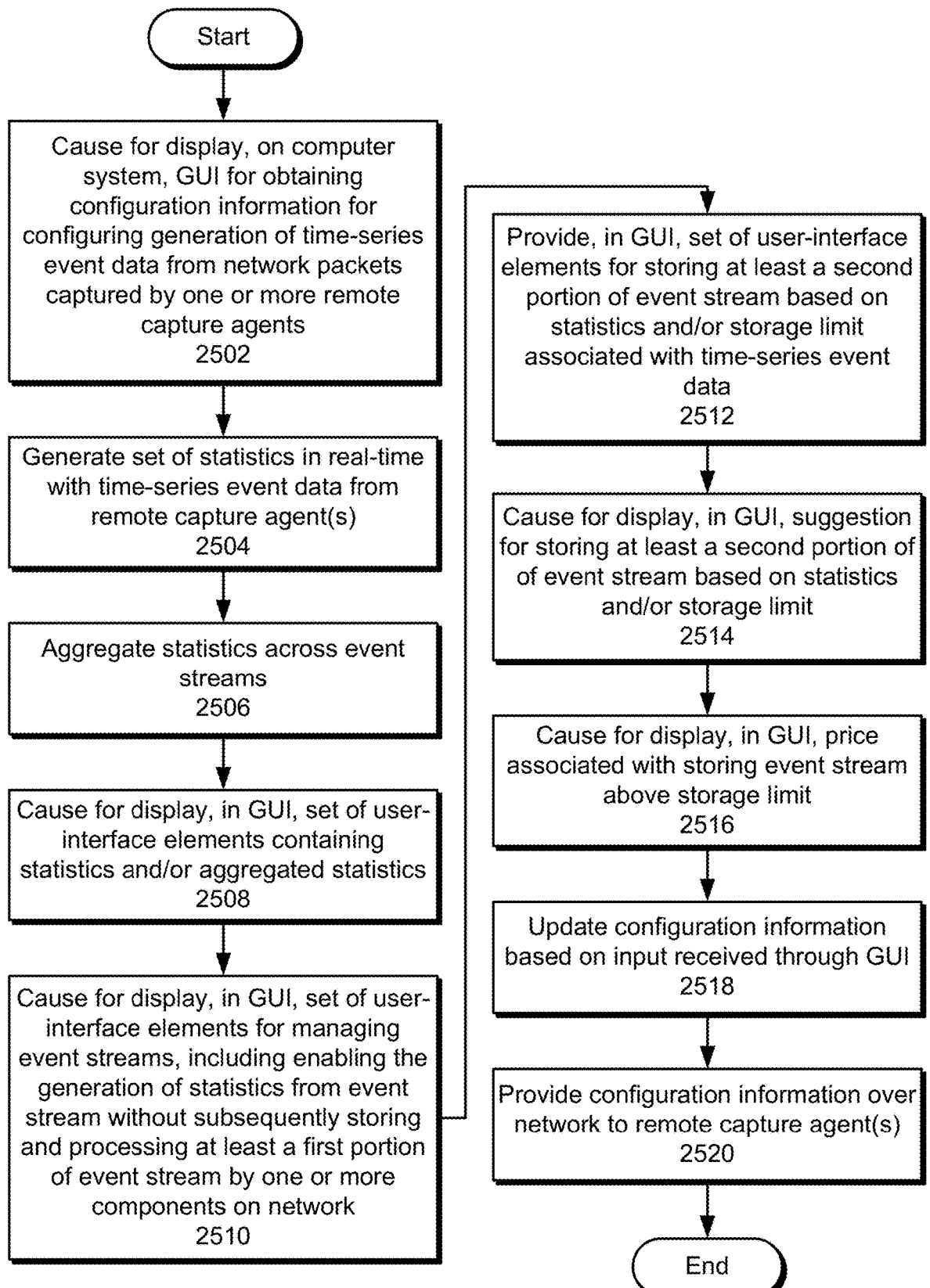
FIG. 25 shows a flowchart illustrating the process of facilitating the processing of network data in accordance with the disclosed embodiments.

FIG. 25 shows a flowchart illustrating the process of facilitating the processing of network data in accordance with the disclosed embodiments. More specifically, FIG. 25 shows a flowchart of adjusting network capture based on event stream statistics through a GUI, such as GUI 1025 of FIG. 10. In one or more embodiments, one or more of the steps may be omitted, repeated, and/or performed in a different order. Accordingly, the specific arrangement of steps shown in FIG. 25 should not be construed as limiting the scope of the embodiments.

First, a GUI for obtaining configuration information for configuring the generation of time-series event data from network packets captured by one or more remote capture agents is displayed on a computer system (operation 2502). The GUI may include a number of user-interface elements for streamlining the creation, management, and/or update of the configuration information. Next, a set of statistics is generated in real-time with time-series event data from one or more remote capture agents (operation 2504). The statistics may include a total number of events, a total incoming traffic, a total outgoing traffic, a total traffic, and/or an index volume for the time-series event data.

The statistics are also aggregated across a number of event streams (operation 2506). For example, the statistics may be aggregated to obtain a total number of events, total incoming traffic, total outgoing traffic, total traffic, and/or total index volume for all event streams collected under a given license and/or user account. The statistics and/or aggregated statistics are then displayed in a set of user-interface elements within the GUI (operation 2508). For example, the statistics and/or aggregated statistics may be shown in one or more tables or lists within the GUI. The statistics and/or aggregated statistics may be generated and/or displayed for event streams that are not subsequently stored, event streams that are subsequently partially stored, and/or event streams that are subsequently stored in entirety. The displayed statistics and/or aggregated statistics may also be filtered and/or sorted by the amount of storage of the event streams.

A set of user-interface for managing the event streams, including enabling the generation of the statistics from an event stream without subsequently storing and processing at least a first portion of the event stream by one or more components on a network, is also displayed in the GUI (operation 2510). For example, the GUI may include a number of buttons, drop-down menus, and/or other user-interface elements that allow a user to enable, disable, or clone individual event streams. The user-interface elements may also allow the user to place each event stream in a "stats-only" mode, in which time-series event data in the event stream is collected and statistics are generated from the time-series event data without indexing and storing some or all of the time-series event data.

Another set of user-interface elements for storing at least a second portion of the event stream based on the statistics and/or a storage limit associated with the time-series event data is also provided in the GUI (operation 2512). For example, the user-interface elements may allow the user to specify an amount and/or percentage of data to index in the event stream and/or enable a setting that automatically adjusts the indexing of the event stream based on the statistics and/or storage limit (e.g., storing the event stream if the size of the event stream and other event streams associated with the same license does not exceed the storage limit). The user-interface elements may also include options for indexing some or all of the event stream during high traffic volume, light traffic volume, and/or another condition associated with the event stream.

A suggestion for storing at least a second portion of the event stream based on the statistics and/or storage limit is additionally displayed in the GUI (operation 2514), along with a price associated with storing the event stream above the storage limit (operation 2516). For example, the GUI may suggest a maximum amount or percentage of the event stream to index to prevent the user from exceeding the storage limit (e.g., daily index volume limit) associated with a given license or user account. As an alternative or addition to the suggested maximum, the GUI may display one or more pricing options or plans for increasing the storage limit so that the entire event stream can be indexed.

The configuration information is updated based on input received through the GUI (operation 2518) and provided over the network to the remote capture agent(s) (operation 2520). The configuration information may then be used to configure the generation of the time-series event data at the remote capture agent(s) during runtime of the remote capture agent(s). For example, the configuration information may be used to generate statistics for a number of event streams without subsequently indexing the event streams, or the configuration information may be used to perform selective indexing of the event streams.

Figure 26:
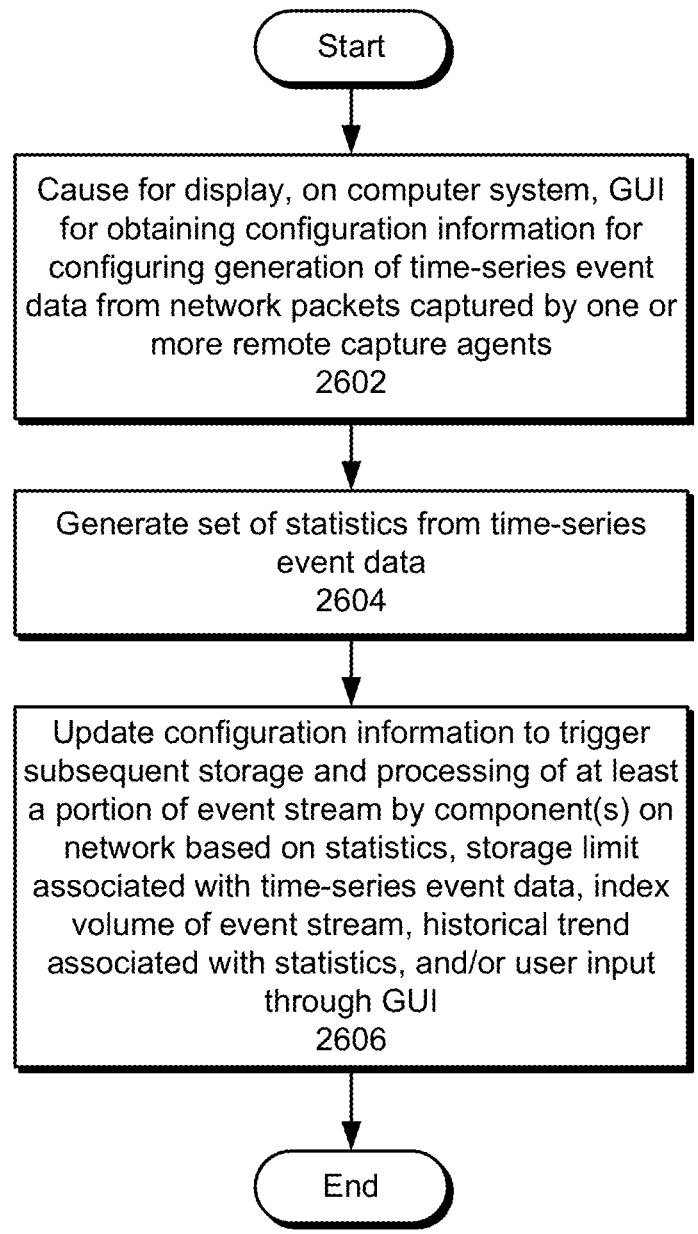
FIG. 26 shows a flowchart illustrating the process of facilitating the processing of network data in accordance with the disclosed embodiments.

FIG. 26 shows a flowchart illustrating the process of facilitating the processing of network data in accordance with the disclosed embodiments. More specifically, FIG. 26 shows a flowchart of performing selective indexing of an event stream. In one or more embodiments, one or more of the steps may be omitted, repeated, and/or performed in a different order. Accordingly, the specific arrangement of steps shown in FIG. 26 should not be construed as limiting the scope of the embodiments.

First, a GUI for obtaining configuration information for configuring the generation of time-series event data from network packets captured by one or more remote capture agents is displayed on a computer system (operation 2602). The GUI may include a set of user-interface elements for managing one or more event streams containing the time-series event data, including selective indexing of the event streams.

Next, a set of statistics is generated from the time-series event data (operation 2604). The statistics may include a total number of events, a total incoming traffic, a total outgoing traffic, a total traffic, and/or an index volume for the time-series event data in one or more of the event streams.

The configuration information is then updated to trigger the subsequent storage and processing of at least a portion of the event stream by one or more components on a network based on the statistics, a storage limit associated with the time-series event data, an index volume of the event stream, a historical trend associated with the statistics, and/or user input through the GUI (operation 2606). For example, automatic adjustment of the indexing of an event stream may be enabled through the GUI. Next, the statistics may be periodically generated and used to establish the index volume of the event stream and/or a historical trend associated with the index volume. The index volume and/or historical trend may be compared with the unused storage limit of the time-series event data and used to determine an amount of the event stream that can be indexed and/or stored without exceeding the storage limit. The configuration information may then be updated to trigger the indexing and/or storage of the determined amount and/or an amount that is set by a user through the GUI.

Figure 27:
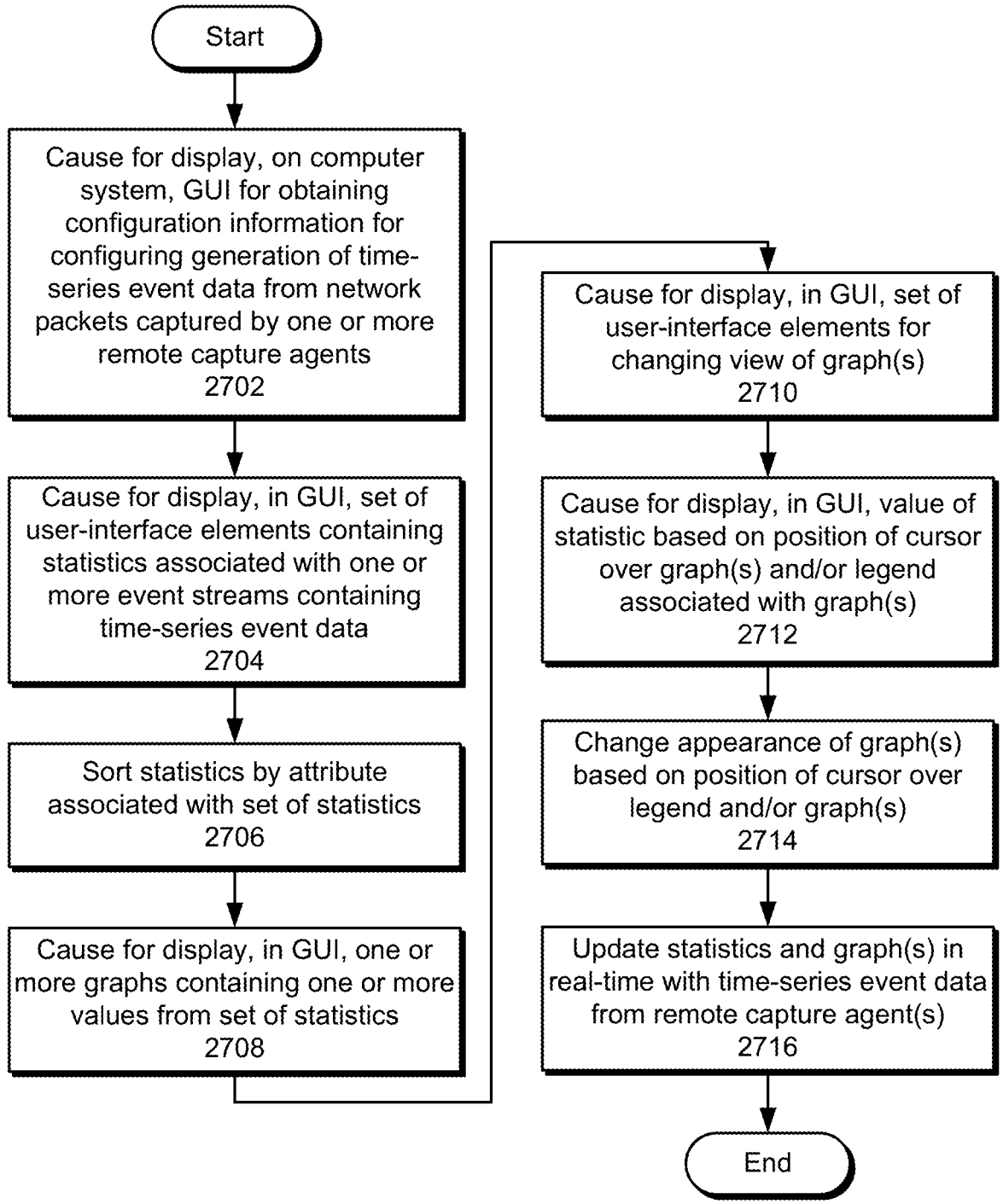
FIG. 27 shows a flowchart illustrating the process of facilitating the processing of network data in accordance with the disclosed embodiments.

FIG. 27 shows a flowchart illustrating the process of facilitating the processing of network data in accordance with the disclosed embodiments. More specifically, FIG. 27 shows a flowchart of providing visualizations of statistics associated with captured network data. In one or more embodiments, one or more of the steps may be omitted, repeated, and/or performed in a different order. Accordingly, the specific arrangement of steps shown in FIG. 27 should not be construed as limiting the scope of the embodiments.

First, a GUI for obtaining configuration information for configuring the generation of time-series event data from network packets captured by one or more remote capture agents is displayed on a computer system (operation 2702). Next, a set of user-interface elements containing statistics associated with one or more event streams containing the time-series event data is displayed in the GUI (operation 2704). For example, the statistics may be displayed in a list, table, and/or other formatted text within the GUI. The statistics are sorted by an attribute associated with the set of statistics (operation 2706). For example, rows in a table containing the statistics may be sorted by columns of that table that represent a name, a total number of events, a total incoming traffic, a total outgoing traffic, a total traffic, an index volume of the event streams, and/or the amount of storage of the event streams. Alternatively, rows in the table may reflect a different and/or random ordering of the event streams.

One or more graphs containing one or more values from the set of statistics is also displayed in the GUI (operation 2708), along with a set of user-interface elements for changing a view of the graph(s) (operation 2710). For example, the graph(s) may include a bar chart of index volumes of the event streams over time and/or a pie chart of index volume across the event streams. Bars in the bar chart may include segments representing the individual index volumes of event streams over given time intervals within a time range, and "slices" of the pie chart may represent the contributions of individual event streams to the total index volume over the time range. The bar and/or pie chart may be displayed with one or more user-interface elements for changing the scale, time range, and/or host associated with the statistics shown in the graph(s) and/or GUI.

The GUI further displays a value of a statistic and/or changes the appearance of the graph(s) based on a position of a cursor over the graph(s) and/or a legend associated with the graph(s) (operations 2712-2714). Continuing with the above example, the GUI may display one or more values (e.g., amount of data associated with index volume, percentage of total index volume, etc.) of an index volume for a segment of a bar chart and/or a slice of a pie chart over which the cursor is positioned. During display of the value of the statistic, the GUI may include the value of the statistic in a user-interface element of the GUI, include a name of the statistic in the user-interface element, include an identifier for the event stream in the user-interface element, and/or display the user-interface element next to the position of the cursor. The GUI may also highlight the segment and/or slice and dim other portions of the chart. If the cursor is positioned over a portion of a legend associated with the bar or pie chart, one or more segments in the bar or pie chart associated with the portion of the legend may be highlighted, and other parts of the bar or pie chart may be dimmed.

Finally, the statistics and graph(s) are updated in real-time with the time-series event data from the remote capture agent(s) (operation 2716). For example, bars in the bar chart and/or slices in the pie chart may be updated with different segments and/or slices as the time window spanned by the bar chart advances and additional time-series event data is collected within the time window. Similarly, the values of statistics shown based on the position of the cursor may be updated using the additional time-series event data.

Figure 28:
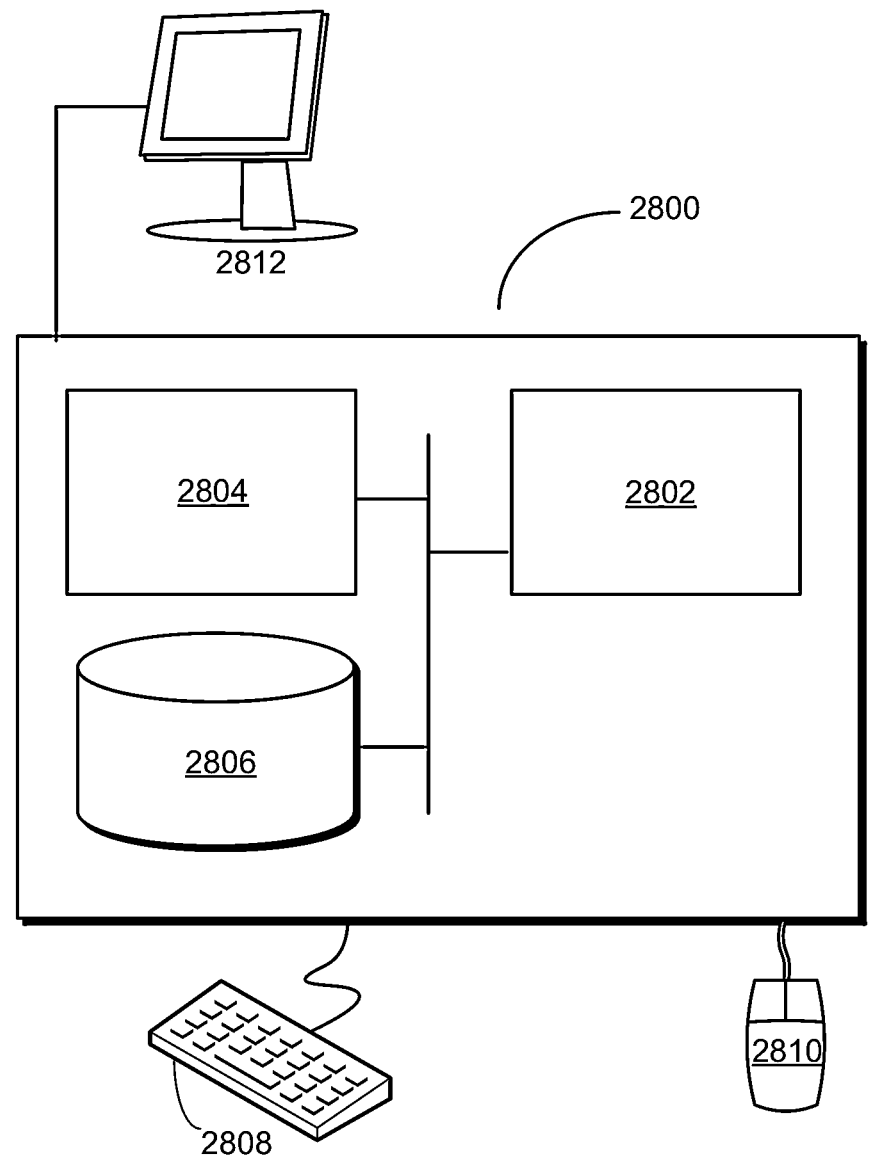
FIG. 28 shows a computer system in accordance with the disclosed embodiments.

FIG. 28 shows a computer system 2800 in accordance with the disclosed embodiments. Computer system 2800 includes a processor 2802, memory 2804, storage 2806, and/or other components found in electronic computing devices. Processor 2802 may support parallel processing and/or multi-threaded operation with other processors in computer system 2800. Computer system 2800 may also include input/output (I/O) devices such as a keyboard 2808, a mouse 2810, and a display 2812.

Computer system 2800 may include functionality to execute various components of the present embodiments. In particular, computer system 2800 may include an operating system (not shown) that coordinates the use of hardware and software resources on computer system 2800, as well as one or more applications that perform specialized tasks for the user. To perform tasks for the user, applications may obtain the use of hardware resources on computer system 2800 from the operating system, as well as interact with the user through a hardware and/or software framework provided by the operating system.

In one or more embodiments, computer system 2800 provides a system for facilitating the processing of network data. The system may include a configuration server. The configuration server may provide a GUI for obtaining configuration information for configuring the generation of time-series event data from network packets captured by a remote capture agent. The GUI may include a set of user-interface elements for managing one or more event streams containing the time-series event data, which includes enabling the generation of a set of statistics from an event stream without subsequently storing and processing the event stream by one or more components on a network. The GUI may also include the set of statistics and/or one or more graphs containing one or more values from the set of statistics. The statistics and/or graph(s) may be updated in real-time with time-series event data from the remote capture agent(s). Input received through the GUI may be used to update configuration information, which is provided over a network to the remote capture agent(s) and used to configure the generation of time-series event data at the remote capture agent(s) during runtime of the remote capture agent(s).

In addition, one or more components of computer system 2800 may be remotely located and connected to the other components over a network. Portions of the present embodiments (e.g., remote capture agent, configuration server, GUI, etc.) may also be located on different nodes of a distributed system that implements the embodiments. For example, the present embodiments may be implemented using a cloud computing system that manages the creation, update, and deletion of event streams at a set of distributed remote capture agents, as well as the generation of statistics from the event streams independently of subsequent processing and storage of the event streams by one or more components on the network.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method performed by a configuration server coupled to a network, the method comprising:
generating a graphical user interface (GUI) including at least one interface element used to define settings related to an event stream comprising timestamped event data, the event stream to be generated by at least one remote capture agent coupled to the network, the settings including at least one setting related to generation of at least one statistic;
generating configuration information based on input received via the at least one interface element;
receiving a first portion of the event stream from a remote capture agent;
generating, based on the configuration information, the at least one statistic based on the first portion of the event stream without subsequently storing and processing the first portion of the event stream;
determining, based on the at least one statistic and a storage limit, a percentage of a second portion of the event stream to store;
receiving the second portion of the event stream from the remote capture agent; and
causing the percentage of the second portion of the event stream to be stored.

2. The method of claim 1, the method further comprising:
sending the configuration information over the network to the at least one remote capture agent, wherein the configuration information is used by the at least one remote capture agent to generate the event stream.

3. The method of claim 1, further comprising generating the at least one statistic from a plurality of event streams received by the configuration server.

4. The method of claim 1, wherein the GUI includes at least one interface element displaying the at least one statistic generated based on the first portion of the event stream.

5. The method of claim 1, wherein the input is first input, and further comprising:
receiving, via the at least one interface element, second input defining settings related to storing the second portion of the event stream based on the at least one statistic; and
updating the configuration information based on the second input.

6. The method of claim 1, wherein the input is first input, and further comprising:
receiving, via the at least one interface element, second input defining settings related to storing the second portion of the event stream based on the at least one statistic;
updating the configuration information based on the second input to obtain updated configuration information; and
sending, based on the updated configuration, the percentage of the second portion of the event stream to another component on the network for subsequent processing and storage.

7. The method of claim 1, further comprising:
determining, based on the at least one statistic, an amount of storage associated with the event stream;
determining that the amount of storage associated with the event stream exceeds the storage limit; and
in response to determining that the amount of storage associated with the event stream exceeds a specified storage limit, sending the percentage of the second portion of the event stream to another component on the network for subsequent processing and storage.

8. The method of claim 1, wherein the input includes at least one setting related to an amount of storage of the event stream based on the at least one statistic and the storage limit; and
wherein the GUI includes at least one interface element that displays a suggestion for setting the amount of storage of the event stream based on the at least one statistic and the storage limit.

9. The method of claim 1, wherein the GUI includes at least one interface element used to adjust an amount of storage of the event stream based on the at least one statistic and the storage limit; and
wherein the GUI includes at least one interface element that displays a price associated with storing the event stream above the storage limit.

10. The method of claim 1, wherein the GUI further includes at least one interface element that displays:
event stream information for a plurality of event streams; and
a graph of a metric associated with the timestamped event data in the event stream.

11. The method of claim 1, wherein the GUI further includes at least one interface element that displays:
event stream information for a plurality of event streams including the event stream;
a first graph of a metric associated with the timestamped event data in the event stream; and
a second graph of an aggregated metric calculated based on the plurality of event streams.

12. The method of claim 1, wherein the GUI further includes at least one interface element used to define one or more event attributes to include in the timestamped event data of the event stream.

13. The method of claim 1, wherein the GUI further includes display of at least a portion of the timestamped event data.

14. The method of claim 1, wherein the settings further include settings related to at least one of: enabling the event stream, disabling the event stream, and deleting the event stream.

15. The method of claim 1, wherein the at least one statistic includes at least one of: a total number of events in the event stream, a total amount of incoming traffic, a total amount of outgoing traffic, a total amount of traffic, and an index volume associated with the event stream.

16. The method of claim 1, wherein the GUI further includes at least one interface element that displays the at least one statistic generated from the event stream, the method further comprising:
updating the at least one statistic in real-time based on additional timestamped event data received from the at least one remote capture agent to obtain an updated statistic; and
updating the GUI to reflect the updated statistic.

17. The method of claim 1, further comprising:
determining that a size of the event stream does not exceed the storage limit; and
in response to determining that the size of the event stream does not exceed the storage limit associated with the event stream, sending the event stream to another component on the network for subsequent storage and processing of the event stream.

18. The method of claim 1, further comprising:
determining an index volume of the event stream; and
in response to determining the index volume of the event stream, sending the percentage of the second portion of the event stream to another component on the network that subsequently processes and stores the percentage of the second portion of the event stream.

19. The method of claim 1, further comprising:
detecting, based on the at least one statistic, a high traffic volume associated with the event stream; and
in response to detecting the high traffic volume associated with the event stream, sending the percentage of the second portion of the event stream to another component on the network that subsequently processes and stores the percentage of the second portion of the event stream.

20. The method of claim 1, wherein the GUI includes display of the at least one statistic generated based on the event stream and further includes display of at least one additional statistic generated based on at least one additional event stream received by the configuration server.

21. The method of claim 1, wherein the GUI includes display of the at least one statistic generated based on the event stream and further includes display of at least one additional statistic generated based on at least one additional event stream received by the configuration server, and wherein the at least one additional event stream is not subsequently processed and stored by another component on the network.

22. The method of claim 1, wherein the GUI includes display of the at least one statistic generated based on the event stream and further includes display of at least one additional statistic generated based on at least one additional event stream received by the configuration server, and wherein the at least one additional event stream is sent to another component on the network for subsequent processing and storage.

23. The method of claim 1, further comprising:
determining, based on a remaining storage limit associated with the event stream, to send the second portion of the event stream to another component on the network for subsequent processing and storage; and
sending the second portion of the event stream to the another component on the network.

24. The method of claim 1, further comprising:
detecting a historical trend associated with the at least one statistic; and
in response to detecting the historical trend associated with the at least one statistic, sending the second portion of the event stream to another component on the network that subsequently processes and stores at least a portion of the event stream.

25. The method of claim 1, further comprising:
detecting a high traffic volume associated with the event stream; and
in response to detecting the high traffic volume associated with the event stream, sending the second portion of the event stream to another component on the network that subsequently processes and stores at the second portion of the event stream.

26. The method of claim 1, further comprising:
detecting a light traffic volume associated with the event stream; and
in response to detecting the light traffic volume associated with the event stream, sending the second portion of the event stream to another component on the network that subsequently processes and stores the second portion of the event stream.

27. The method of claim 1, further comprising:
generating a plurality of statistics based on a plurality of respective event streams; and
aggregating the plurality of statistics to obtain an aggregated statistic.

28. The method of claim 1, further comprising:
generating a plurality of statistics based on a plurality of respective event streams;
aggregating the plurality of statistics to obtain an aggregated statistic; and
generating a GUI including display of the aggregated statistic.

29. An apparatus, comprising:
one or more processors; and
memory storing instructions that, when executed by the one or more processors, cause the apparatus to:
generate a graphical user interface (GUI) including at least one interface element used to define settings related to an event stream comprising timestamped event data, the event stream to be generated by at least one remote capture agent coupled to a network, the settings including at least one setting related to generation of at least one statistic; and
generate configuration information based on input received via the at least one interface element;
receive a first portion of the event stream from a remote capture agent;
generate, based on the configuration information, the at least one statistic based on the first portion of the event stream without subsequently storing and processing the first portion of the event stream;
determine, based on the at least one statistic and a storage limit, a percentage of a second portion of the event stream to store;
receive the second portion of the event stream from the remote capture agent; and
cause the percentage of the second portion of the event stream to be stored, the percentage determined based on the at least one statistic.

30. A non-transitory computer-readable storage medium storing instructions which, when executed by a computer, cause a configuration server coupled to a network to perform operations comprising:
generating a graphical user interface (GUI) including at least one interface element used to define settings related to an event stream comprising timestamped event data, the event stream to be generated by at least one remote capture agent coupled to the network, the settings including at least one setting related to generation of at least one statistic based on the event stream without subsequently storing and processing at least a portion of the event stream;
generating configuration information based on input received via the at least one interface element;
receiving a first portion of the event stream from a remote capture agent;
generating, based on the configuration information, the at least one statistic based on the first portion of the event stream without subsequently storing and processing the first portion of the event stream;
determining, based on the at least one statistic and a storage limit, a percentage of a second portion of the event stream to store;
receiving the second portion of the event stream from the remote capture agent; and
causing the percentage of the second portion of the event stream to be stored, the percentage determined based on the at least one statistic.

* * * * *